United States Patent
Miller

(10) Patent No.: US 11,666,997 B1
(45) Date of Patent: Jun. 6, 2023

(54) PRECISION LOCATING FASTENING DEVICE

(71) Applicant: Elijah Tooling, Inc., Denton, TX (US)

(72) Inventor: Richard V. Miller, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 0 days.

(21) Appl. No.: 17/065,891

(22) Filed: Oct. 8, 2020

Related U.S. Application Data

(63) Continuation-in-part of application No. 16/828,706, filed on Mar. 24, 2020, which is a continuation-in-part of application No. 15/356,321, filed on Nov. 18, 2016, now Pat. No. 10,596,673.

(60) Provisional application No. 62/256,865, filed on Nov. 18, 2015.

(51) Int. Cl.
  *B23Q 3/06* (2006.01)
  *B23Q 17/00* (2006.01)

(52) U.S. Cl.
  CPC .................. *B23Q 3/066* (2013.01); *B23Q 17/005* (2013.01)

(58) Field of Classification Search
  CPC .......... B23Q 3/066; B23Q 17/005; B23Q 3/06
  USPC .................. 269/86, 242, 256, 280
  See application file for complete search history.

(56) References Cited

U.S. PATENT DOCUMENTS

| | | | |
|---|---|---|---|
| 1,256,706 A | 2/1918 | Lewis | |
| 1,842,724 A | 1/1932 | Langsner | |
| 2,341,619 A | 2/1944 | Huss | |
| 2,376,089 A | 5/1945 | Savageau | |
| 2,587,025 A | 2/1952 | Beck et al. | |
| 2,625,861 A | 1/1953 | Swanson | |
| 2,639,179 A | 5/1953 | Phelps | |
| 2,705,441 A | 4/1955 | Armstrong | |

(Continued)

OTHER PUBLICATIONS

Advisory Action Before the Filing of an Appeal Brief dated Jan. 28, 2014 in U.S. Appl. No. 12/540,318.
Amendment After Final dated Sep. 30, 2019 from corresponding U.S. Appl. No. 15/356,321.
Amendment After Final filed Jan. 7, 2014 in U.S. Appl. No. 12/540,318.
Amendment After Final filed Sep. 30, 2015 in U.S. Appl. No. 13/347,420.
Amendment dated Mar. 18, 2020 from related U.S. Appl. No. 15/883,991.

(Continued)

*Primary Examiner* — Lee D Wilson
*Assistant Examiner* — Shantese L McDonald
(74) *Attorney, Agent, or Firm* — James E. Walton

(57) ABSTRACT

A precision locating fastening device for securing a part. The device includes a drive screw, a base member, and a stop member. The drive screw has a gripping surface. The base member houses the drive screw and has a precision locating surface. The part is retained and located adjacent the precision locating surface relative to a fixture plate. The drive screw has one or more keyed ends. The stop member is replaceable to maintain precision and accuracy while locating and retaining the part. The device is incorporated in a system where a first keyed end of a first fastening device, a second key of the first fastening device, or the keyed end of a drive screw of a second fastening device is adjusted from either the first side of the fixture plate, the second side of fixture plate, or both to retain and locate the part on the fixture plate.

20 Claims, 43 Drawing Sheets

(56) References Cited

U.S. PATENT DOCUMENTS

| | | | |
|---|---|---|---|
| 2,919,736 | A | 1/1960 | Kann |
| 2,988,855 | A | 6/1961 | Asfour et al. |
| 2,992,685 | A | 7/1961 | Madsen |
| 3,124,190 | A | 3/1964 | Cornell |
| 3,250,559 | A | 5/1966 | Sommerfeld |
| 3,255,799 | A | 6/1966 | Heimovics |
| 3,418,869 | A | 12/1968 | Herpich |
| 3,424,212 | A | 1/1969 | Kemper |
| 3,455,198 | A | 7/1969 | Barrett |
| 3,510,922 | A | 5/1970 | Dzus et al. |
| 3,537,697 | A | 11/1970 | Davis |
| 3,578,799 | A | 5/1971 | Davis |
| 3,683,988 | A | 8/1972 | Carter et al. |
| 4,139,315 | A | 2/1979 | Levy et al. |
| 4,191,367 | A | 3/1980 | Speiser et al. |
| 4,275,983 | A | 6/1981 | Bergman |
| 4,299,377 | A | 11/1981 | Lenz |
| 4,396,327 | A | 8/1983 | Menke |
| 4,534,546 | A | 8/1985 | Cattani |
| 4,616,967 | A | 10/1986 | Molina |
| 4,723,881 | A | 2/1988 | Duran |
| 4,735,536 | A | 4/1988 | Duran |
| 4,738,438 | A | 4/1988 | Horie et al. |
| 4,747,738 | A | 5/1988 | Duran |
| 4,815,908 | A | 3/1989 | Duran et al. |
| 4,846,622 | A | 7/1989 | Lien |
| 4,850,771 | A | 7/1989 | Hurd |
| 4,863,326 | A | 9/1989 | Vickers |
| 4,865,500 | A | 9/1989 | Duran et al. |
| 4,884,930 | A | 12/1989 | Doebbeler |
| 4,915,557 | A | 4/1990 | Stafford |
| 4,934,888 | A | 6/1990 | Corsmeier et al. |
| 4,963,063 | A | 10/1990 | Gulistan |
| 5,338,139 | A | 8/1994 | Swanstrom |
| 5,462,395 | A | 10/1995 | Damm et al. |
| 5,611,654 | A | 3/1997 | Frattarola et al. |
| 6,022,009 | A | 2/2000 | Hill |
| 6,095,736 | A | 8/2000 | Miller et al. |
| 6,102,640 | A | 8/2000 | Yokohama, et al. |
| 6,220,803 | B1 | 4/2001 | Schellhase |
| 6,296,431 | B1 | 10/2001 | Miller |
| 6,312,185 | B1 | 11/2001 | Ernst |
| 6,931,969 | B2 | 8/2005 | Hsien |
| 7,004,699 | B2 | 2/2006 | Petrok et al. |
| 7,134,650 | B2* | 11/2006 | Trudel et al. ........ B25B 1/2468 269/43 |
| 8,087,861 | B2 | 1/2012 | Wang |
| 8,770,902 | B1 | 7/2014 | Miller |
| 8,939,691 | B2 | 1/2015 | Tseng |
| 9,004,472 | B2* | 4/2015 | Schmidt ............. B25B 1/2468 269/136 |
| 9,962,812 | B2* | 5/2018 | Schlüssel ............ B25B 1/2405 |
| 10,596,673 | B1 | 3/2020 | Miller et al. |
| 2009/0121405 | A1 | 5/2009 | Brown et al. |
| 2009/0202319 | A1 | 8/2009 | Wang et al. |
| 2010/0164159 | A1* | 7/2010 | Wuerthele .......... B25B 1/2489 269/280 |
| 2011/0045915 | A1 | 2/2011 | Wang |
| 2011/0070049 | A1 | 3/2011 | Wang |
| 2012/0224935 | A1 | 9/2012 | Chiu |

OTHER PUBLICATIONS

Amendment filed Dec. 16, 2008 in U.S. Appl. No. 11/473,274.
Amendment filed Jun. 1, 2015 in U.S. Appl. No. 13/347,420.
Amendment filed Oct. 2, 2013 in U.S. Appl. No. 12/540,318.
Applicant-Initiated Interview Summary dated Jan. 16, 2014 in U.S. Appl. No. 12/540,318.
Boeing drawing "Back-Bolt Assembly", Dec. 13, 1993.
Final Office Action dated Jul. 29, 2019 from corresponding U.S. Appl. No. 15/356,321.
Jergens Catalog - Ball Lock Mounting System catalogue, last accessed on Aug. 12, 2009.
Notice of Allowance and Examiner's Amendment dated Feb. 27, 2014 in U.S. Appl. No. 12/540,318.
Notice of Allowance and Examiner's Amendment dated Oct. 19, 2015 in U.S. Appl. No. 13/347,420.
Notice of Allowance dated Apr. 8, 2020 from related U.S. Appl. No. 15/883,991.
Notice of Allowance dated Nov. 15, 2019 from corresponding U.S. Appl. No. 15/356,321.
Notice of Incomplete Reply dated Mar. 24, 2020 from related U.S. Appl. No. 16/747,079.
Notice of Omitted Items dated Feb. 7, 2020 from related U.S. Appl. No. 16/747,079.
Notice to File Corrected Application Papers dated Aug. 27, 2009 in U.S. Appl. No. 12/540,318.
Office Action dated Apr. 21, 2008 in U.S. Appl. No. 11/473,274.
Office Action dated Dec. 26, 2014 in U.S. Appl. No. 13/347,420.
Office Action dated Feb. 3, 2020 from corresponding U.S. Appl. No. 15/883,991.
Office Action dated Feb. 12, 2013 in U.S. Appl. No. 12/540,318.
Office Action dated Feb. 3, 2020 from related U.S. Appl. No. 15/883,991.
Office Action dated Jul. 2, 2013 in U.S. Appl. No. 12/540,318.
Office Action dated Mar. 12, 2009 in U.S. Appl. No. 11/473,274.
Office Action dated May 5, 2015 in U.S. Appl. No. 13/347,420.
Office Action dated Nov. 14, 2017 from corresponding U.S. Appl. No. 15/356,321.
Office Action dated Nov. 7, 2013 in U.S. Appl. No. 12/540,318.
Office Action dated Sep. 26, 2008 in U.S. Appl. No. 11/473,274.
Office Action dated Sep. 9, 2015 in U.S. Appl. No. 13/347,420.
Petition to Revive and Amendment dated Oct. 22, 2008 from corresponding U.S. Appl. No. 15/356,321.
Response to Notice of Incomplete Reply dated Apr. 2, 2020 from related U.S. Appl. No. 16/747,079.
Response to Notice of Omitted Items dated Mar. 18, 2020 from related U.S. Appl. No. 16/747,079.
Response to Notice to File Corrected Application Papers filed Oct. 26, 2009 in U.S. Appl. No. 12/540,318.
Response to Restriction Requirement filed Jan. 15, 2015 in U.S. Appl. No. 13/347,420.
Response to Restriction Requirement filed Jun. 19, 2008 in U.S. Appl. No. 11/473,274.
Response to Restriction Requirement filed Mar. 13, 2013 in U.S. Appl. No. 12/540,318.
Schunk - Workholding Solutions, Automation Components, Toolholding Components. Printed from www.schunk.com website, Aug. 6, 2009.
Vought Aircraft Company drawing, Jan. 4, 1994, maybe earlier.
Vought drawing, date unknown.

* cited by examiner

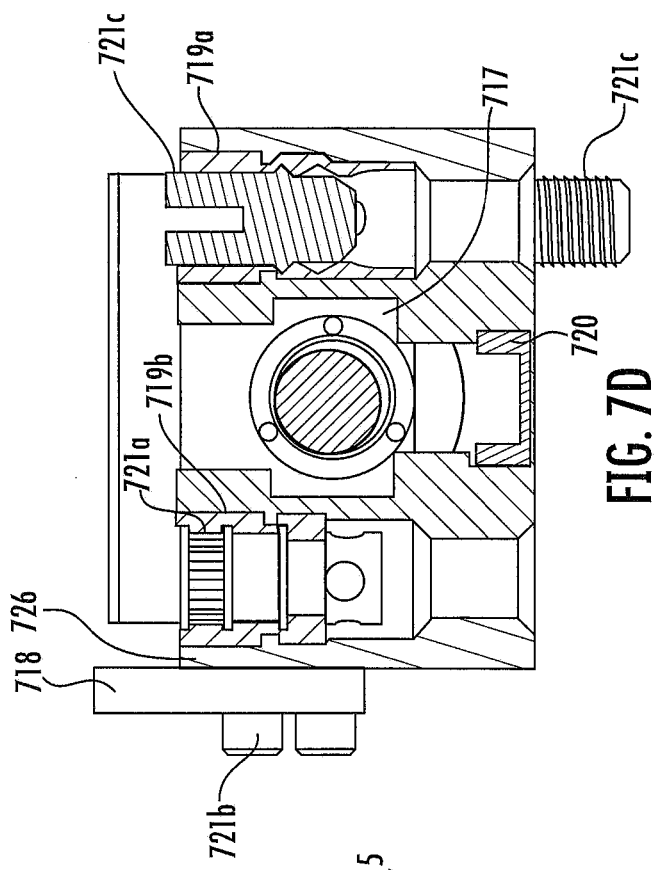
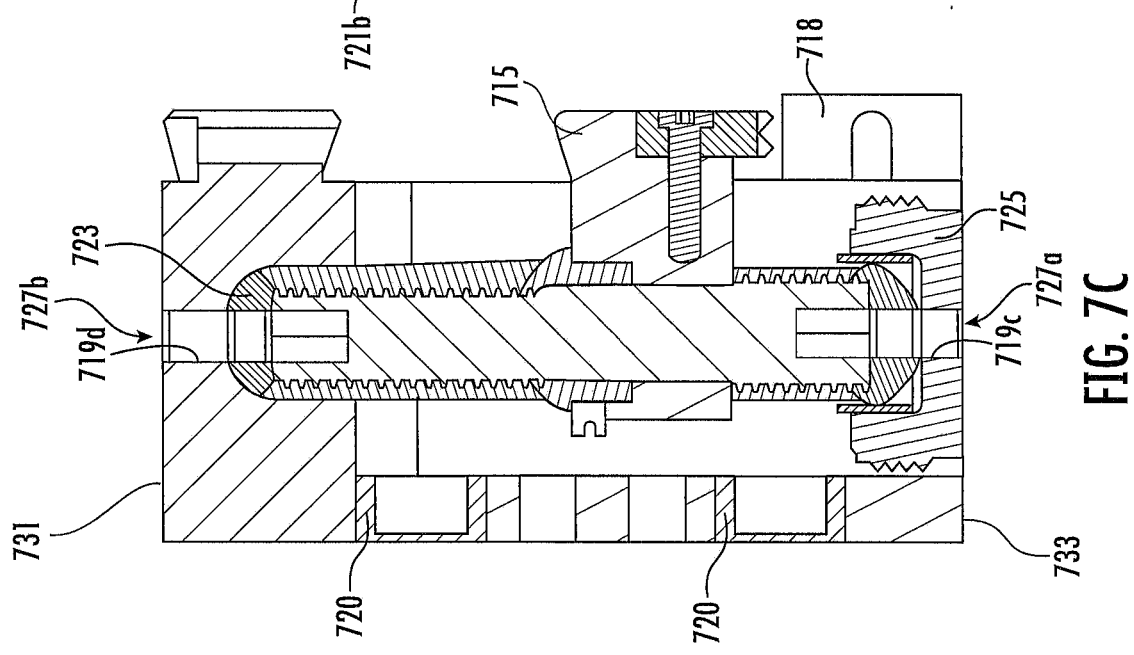
FIG. 7D
FIG. 7C

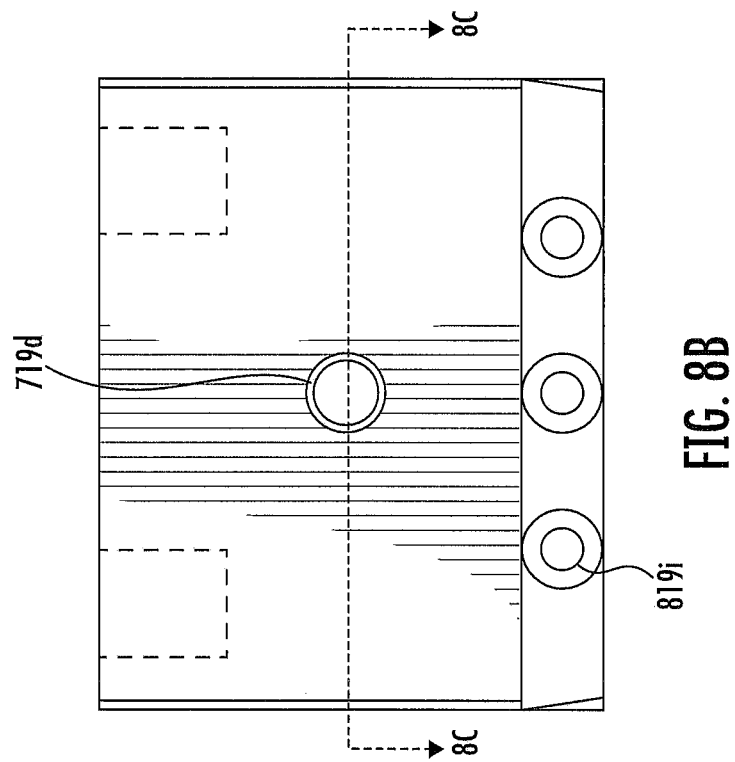
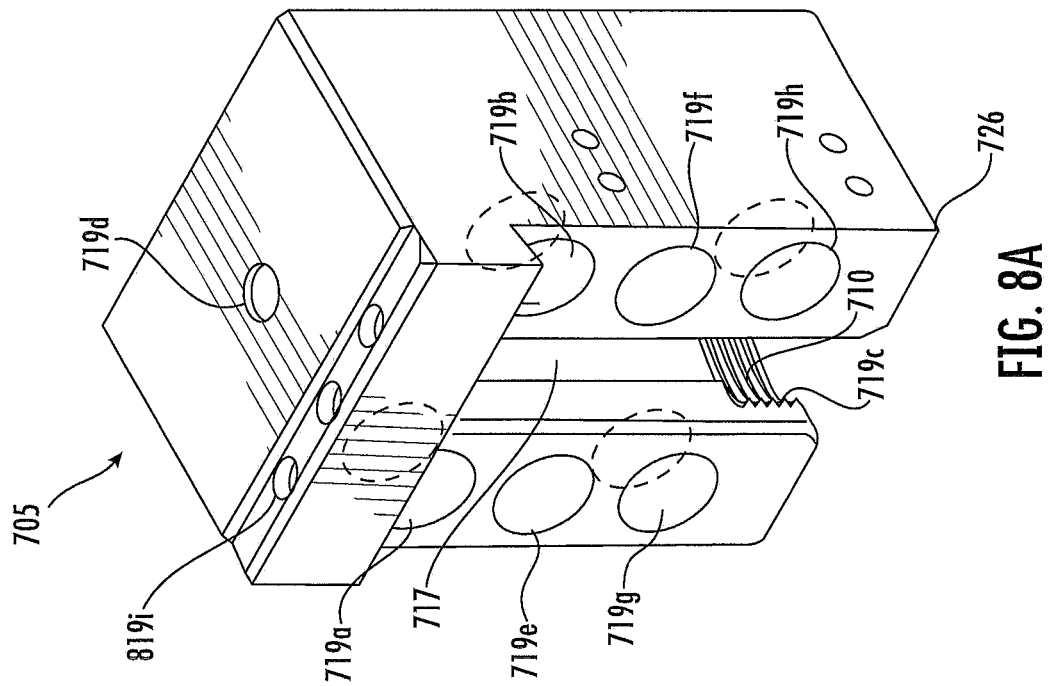

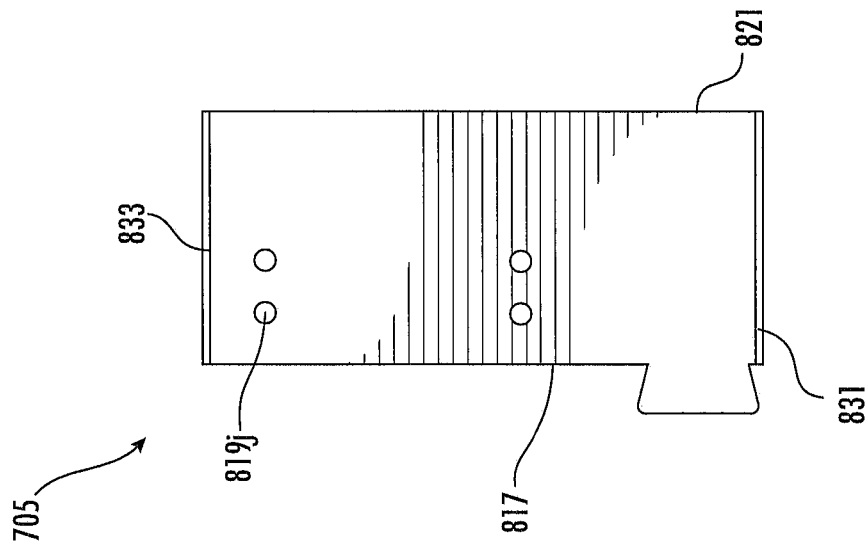
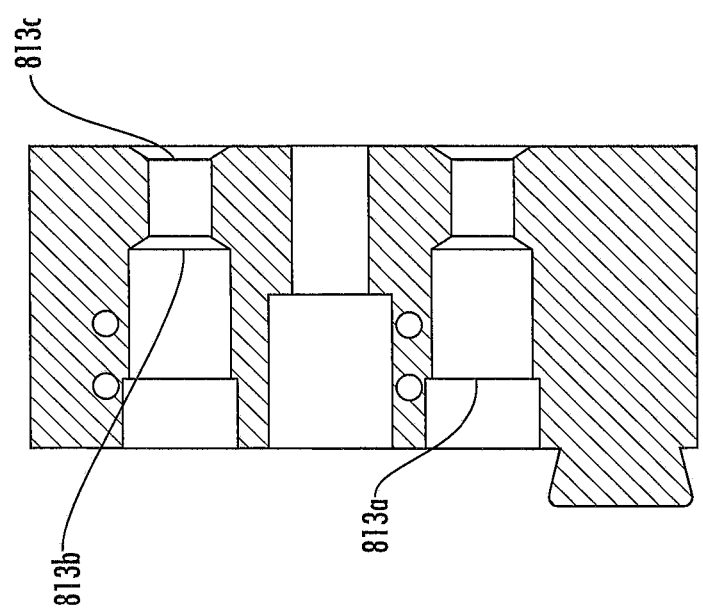
FIG. 8F
FIG. 8E

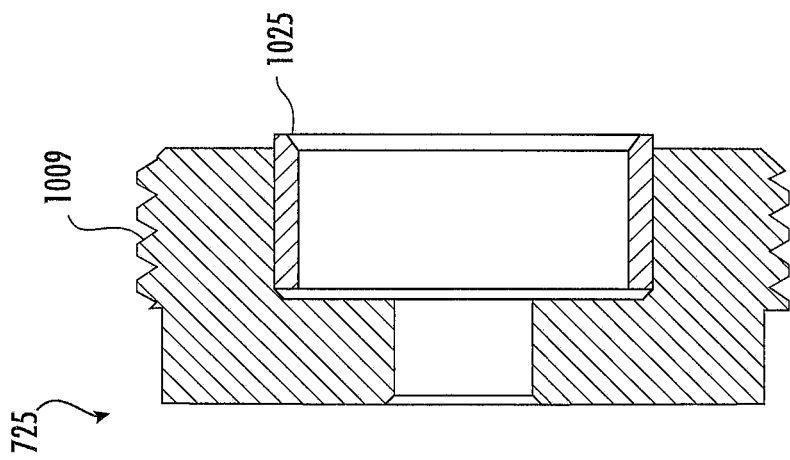
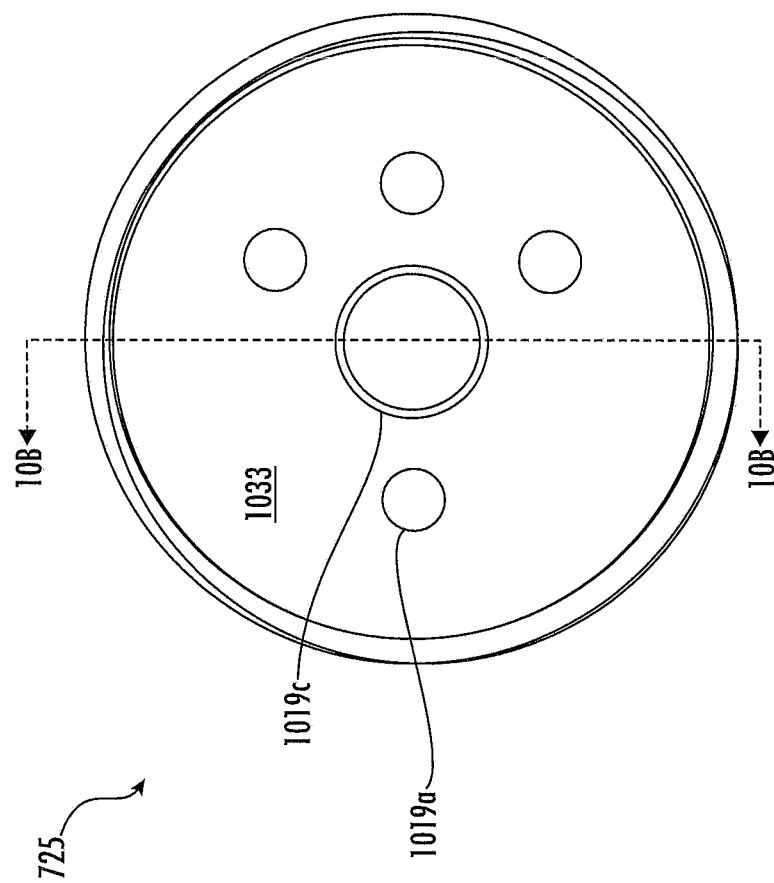

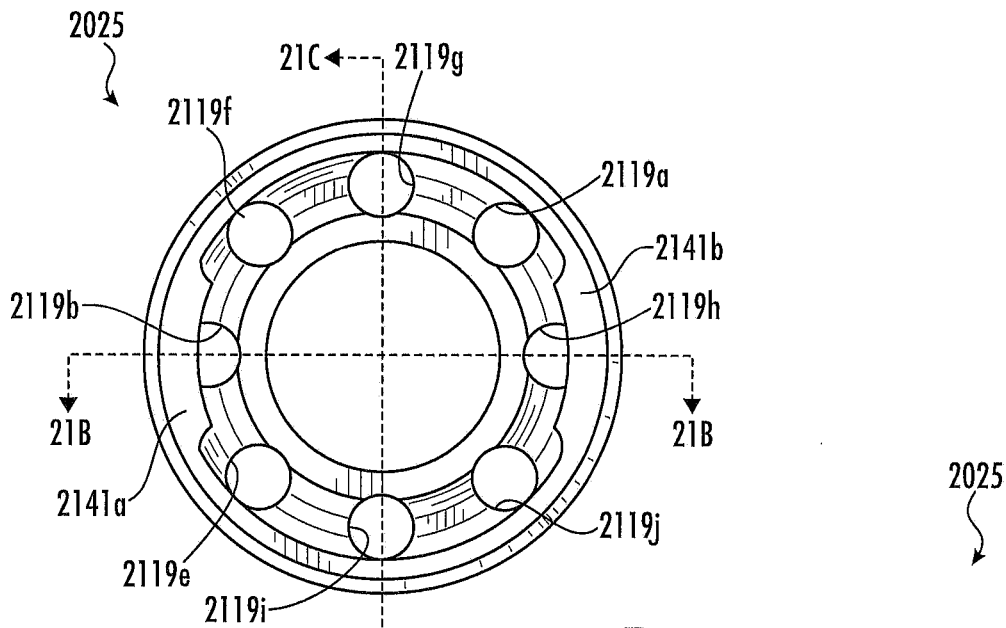
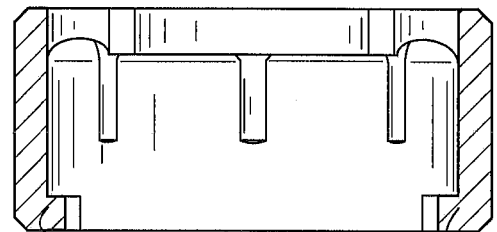
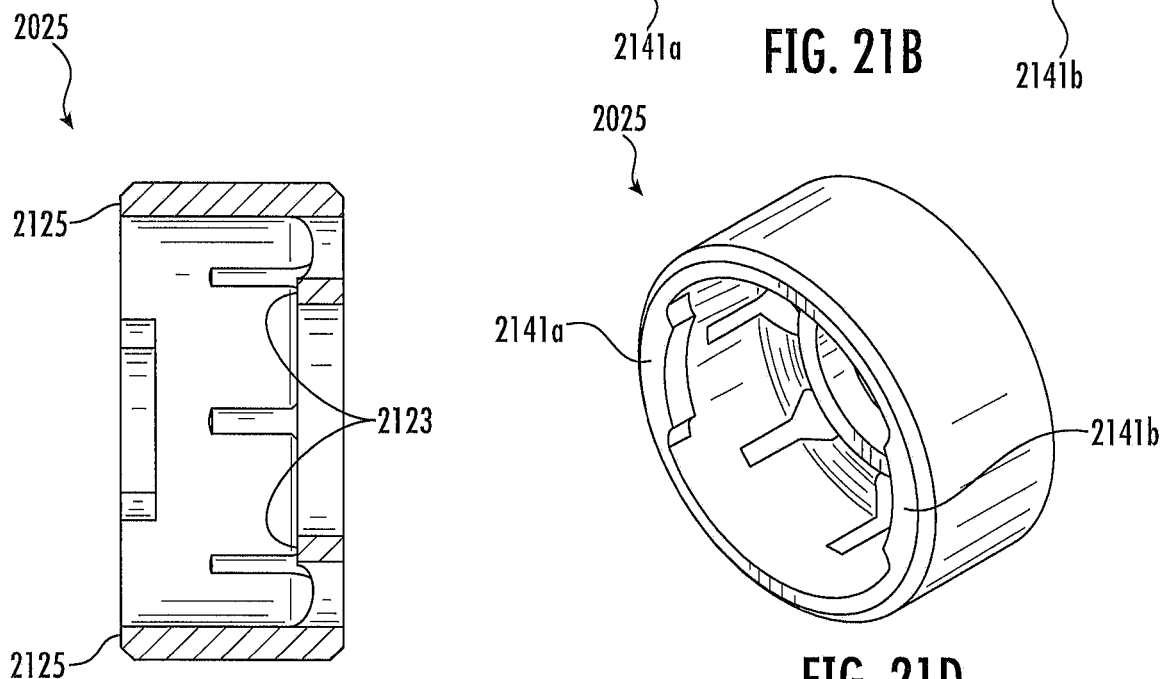

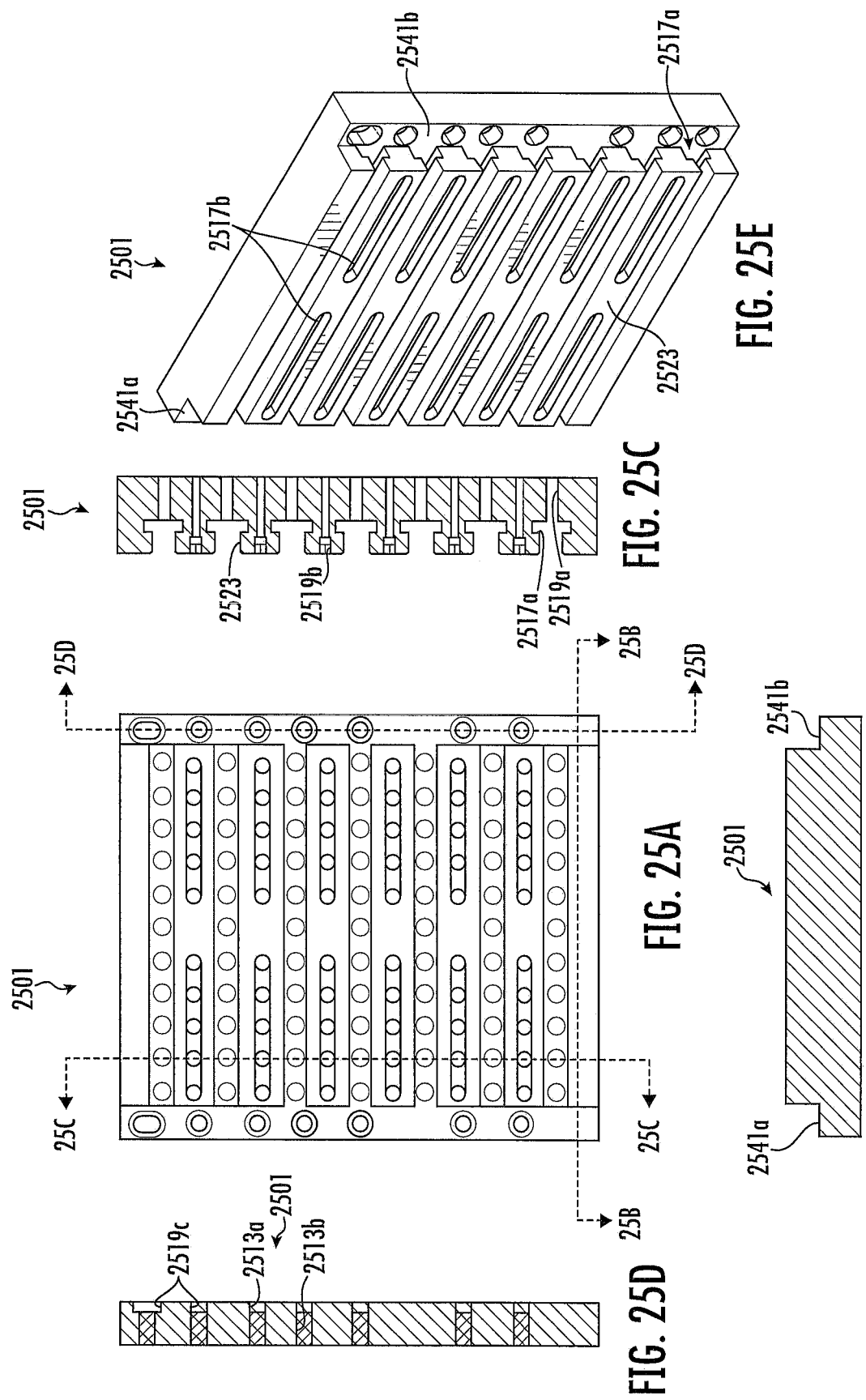

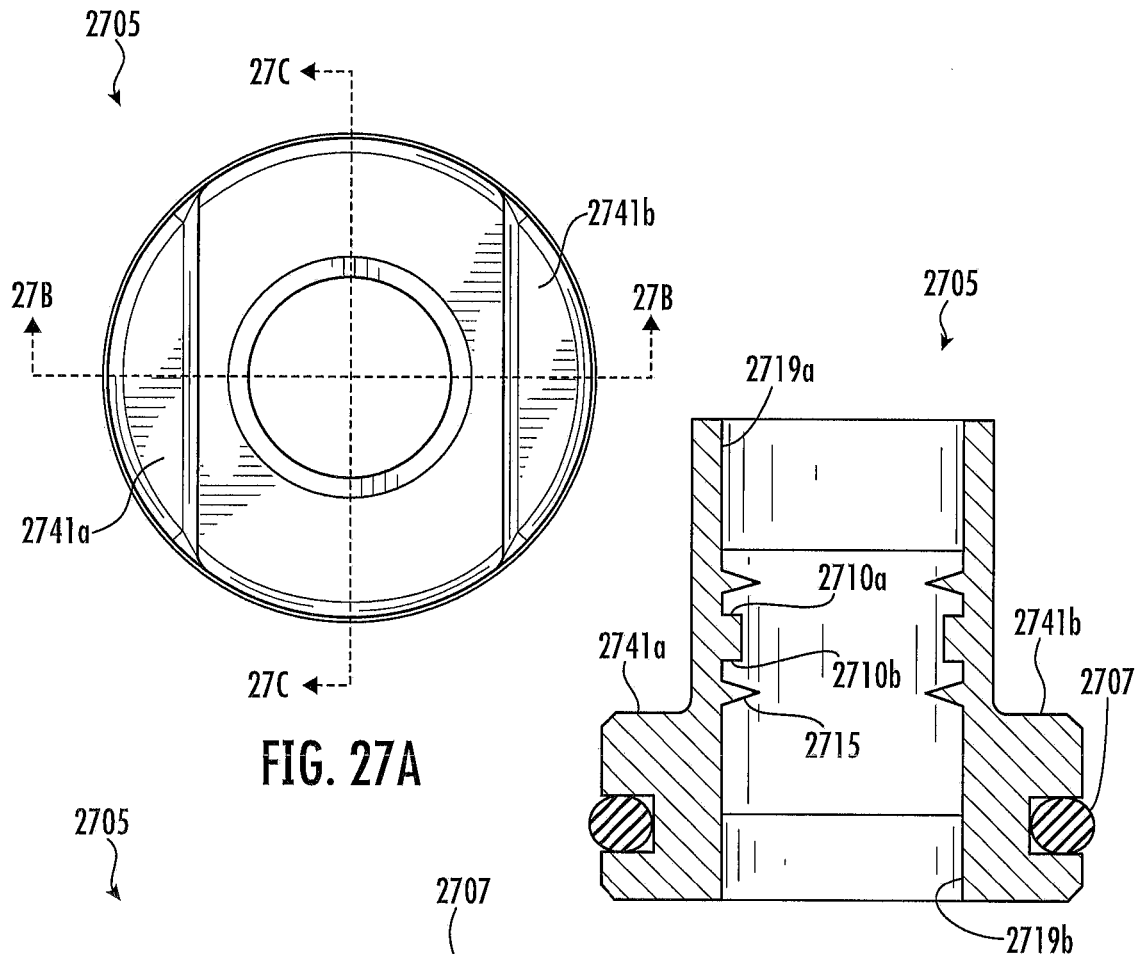
FIG. 27A
FIG. 27B
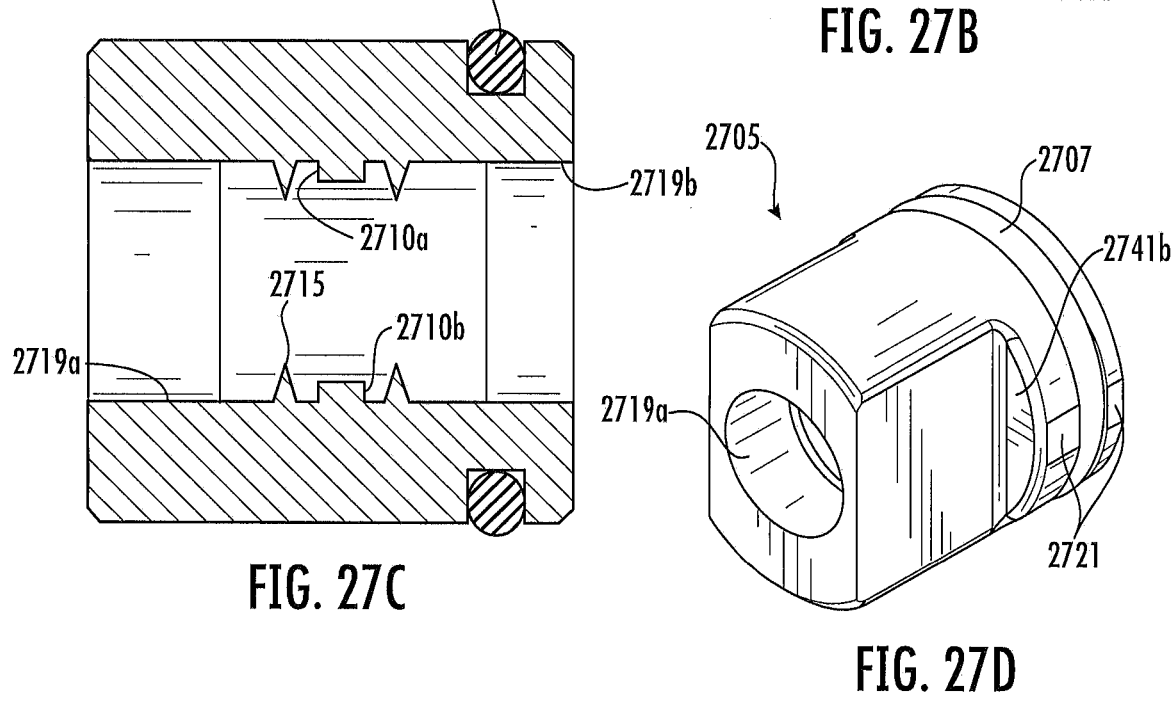
FIG. 27C
FIG. 27D

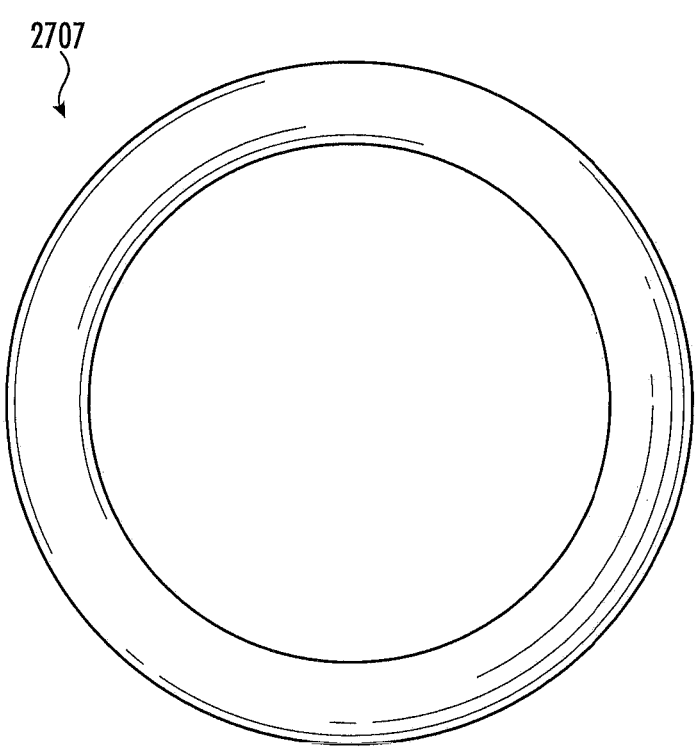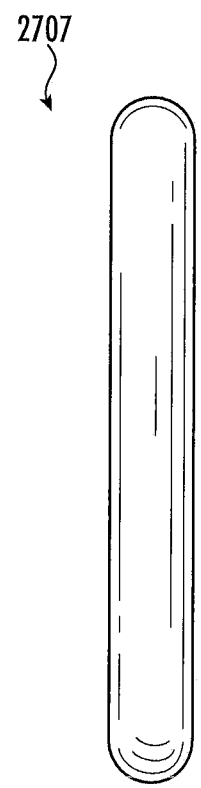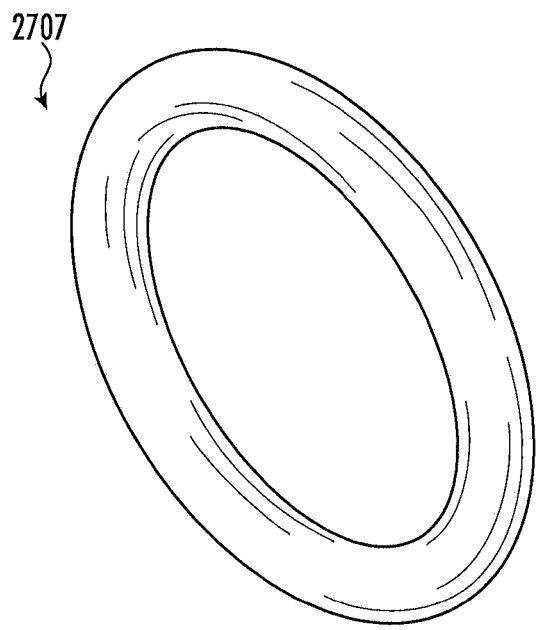
FIG. 28A
FIG. 28B
FIG. 28C

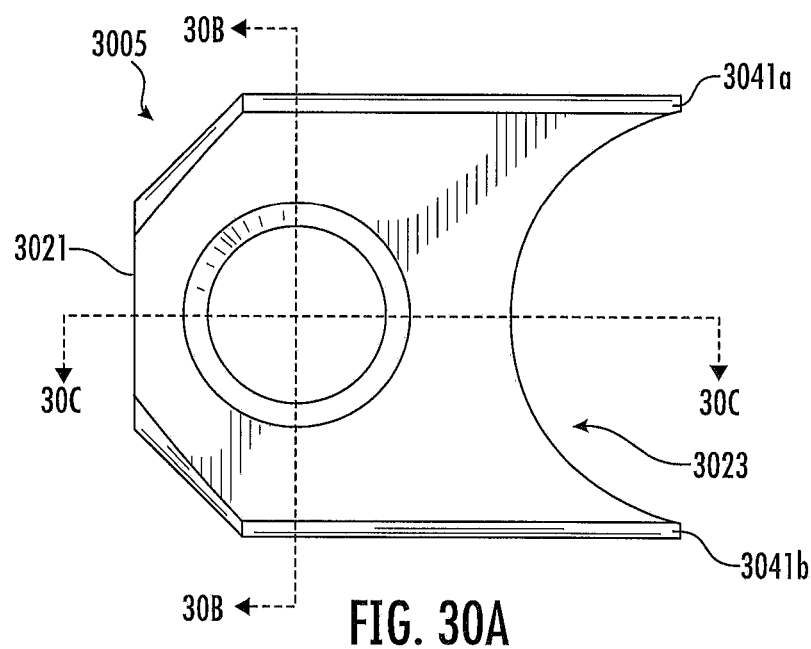
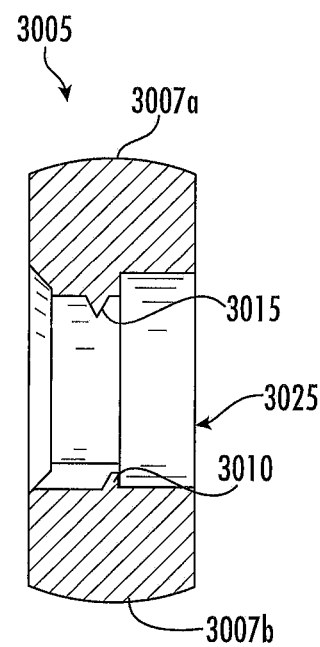
FIG. 30A
FIG. 30B
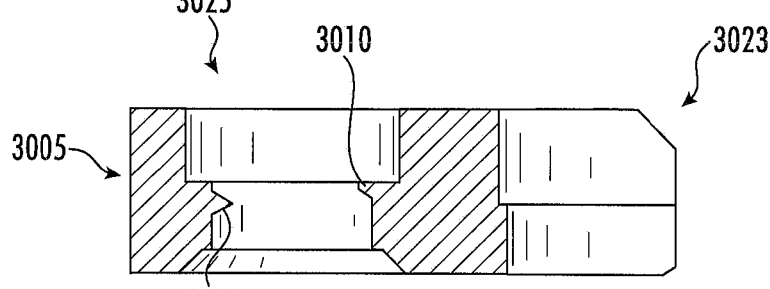
FIG. 30C
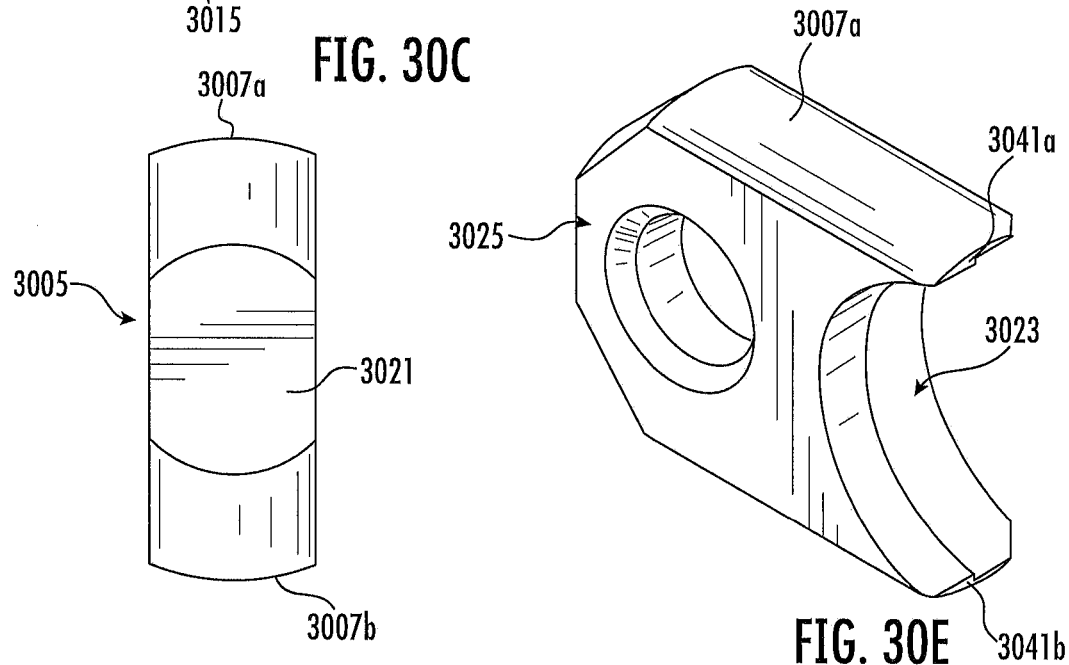
FIG. 30D
FIG. 30E

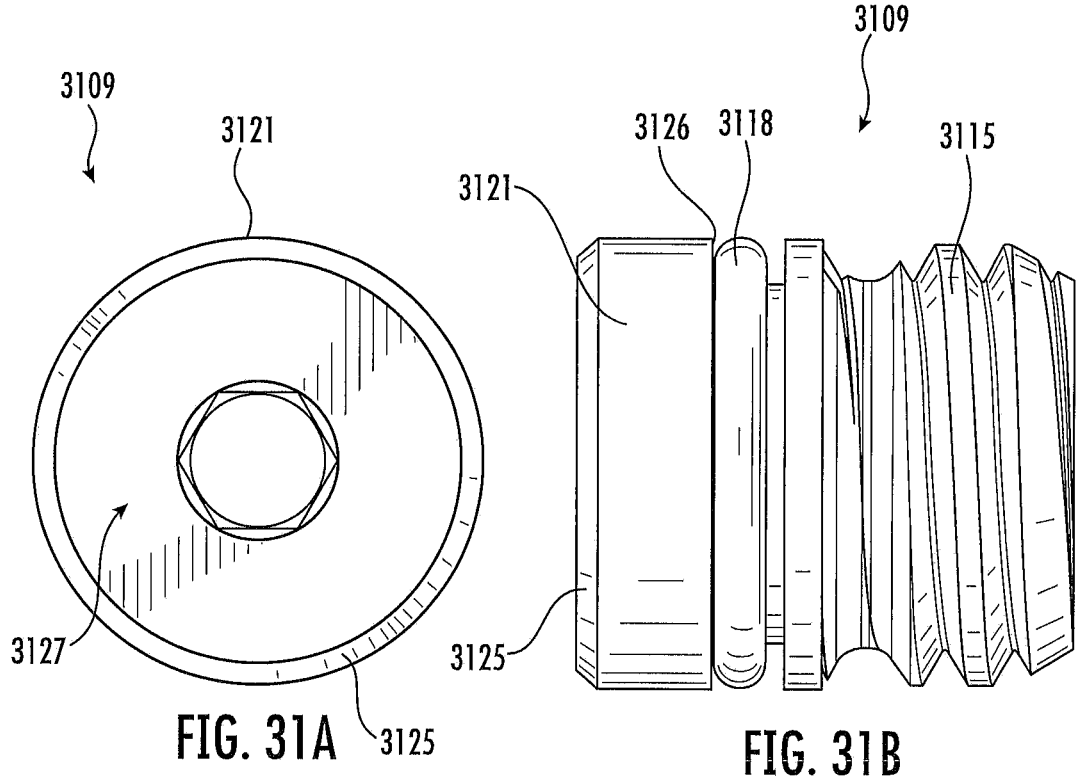
FIG. 31A
FIG. 31B
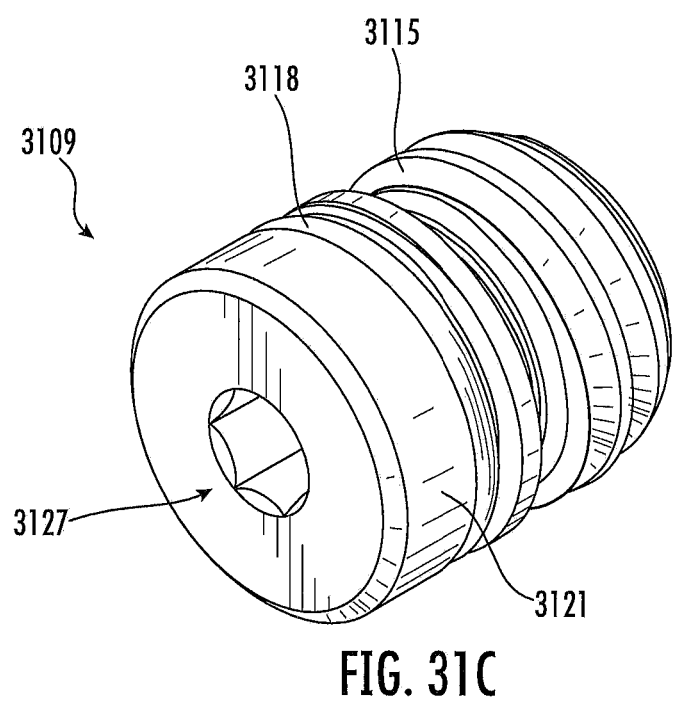
FIG. 31C

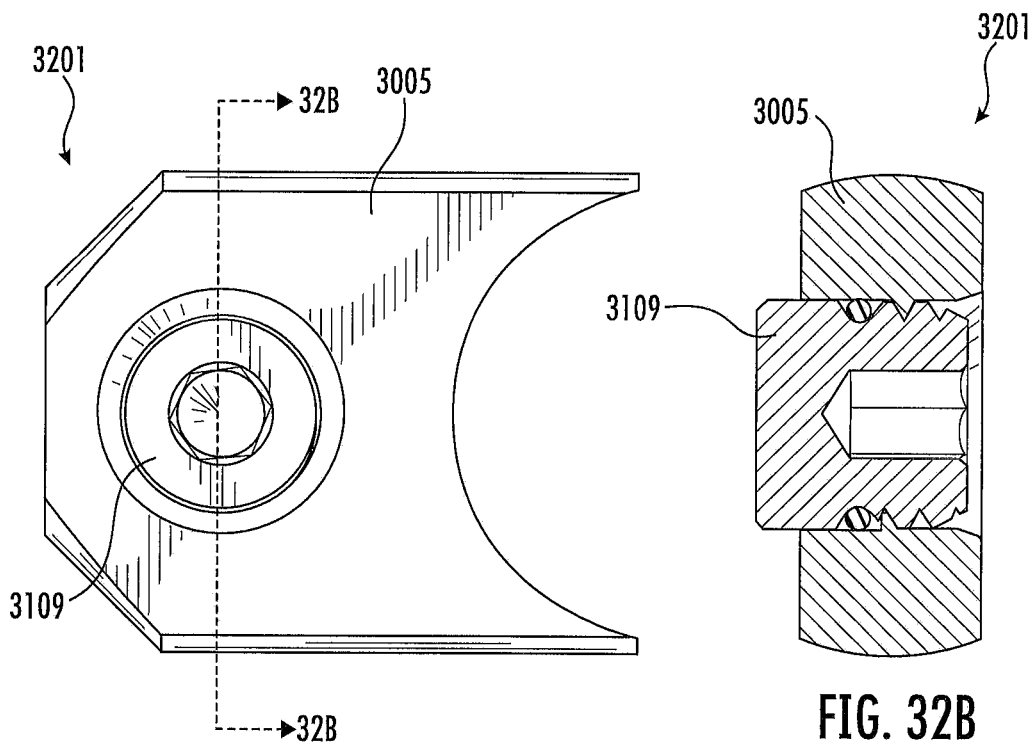
FIG. 32A
FIG. 32B
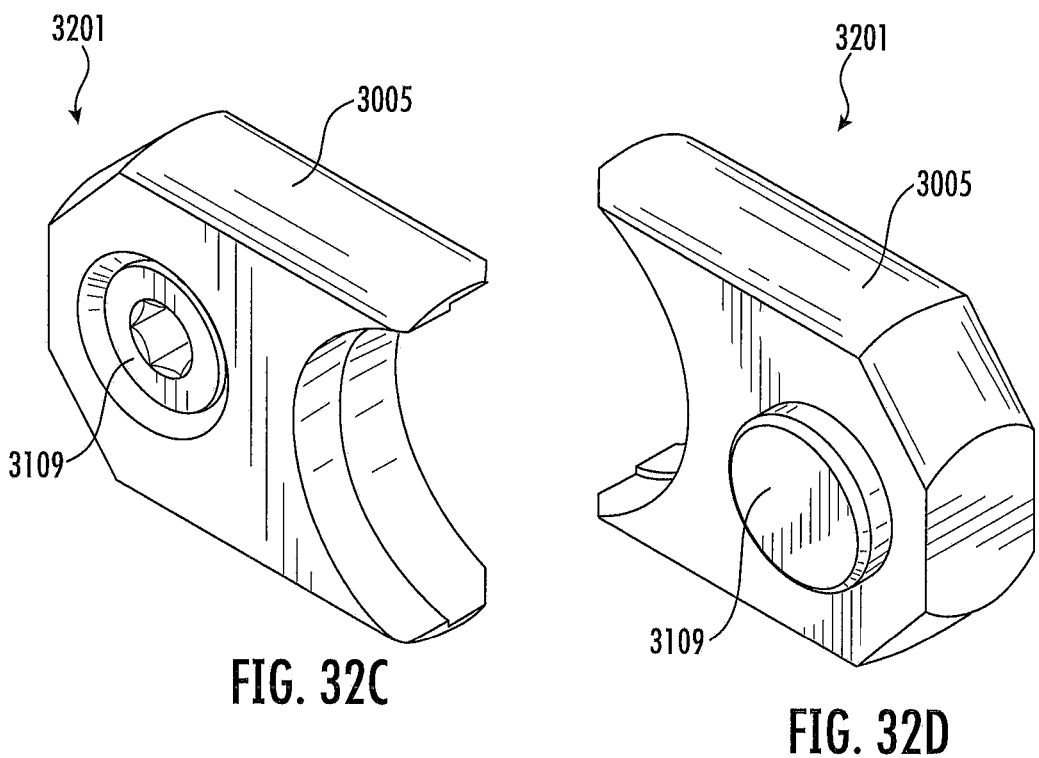
FIG. 32C
FIG. 32D

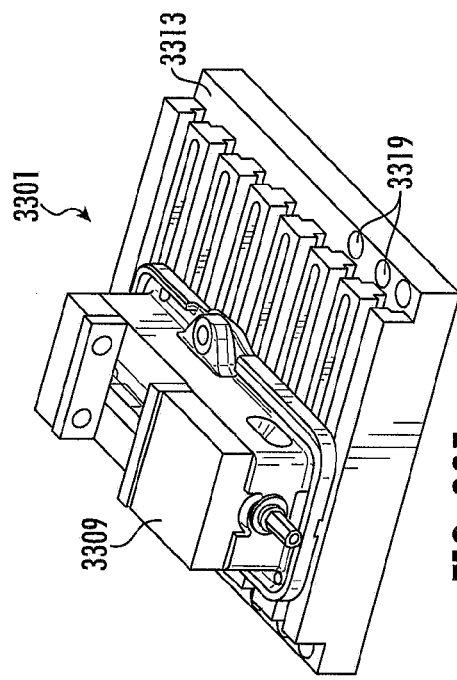
FIG. 33F
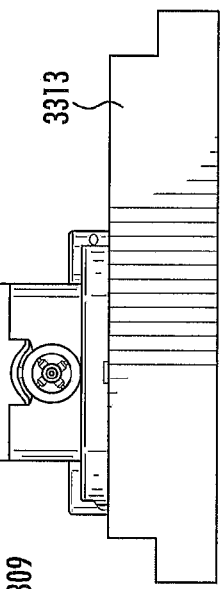
FIG. 33B
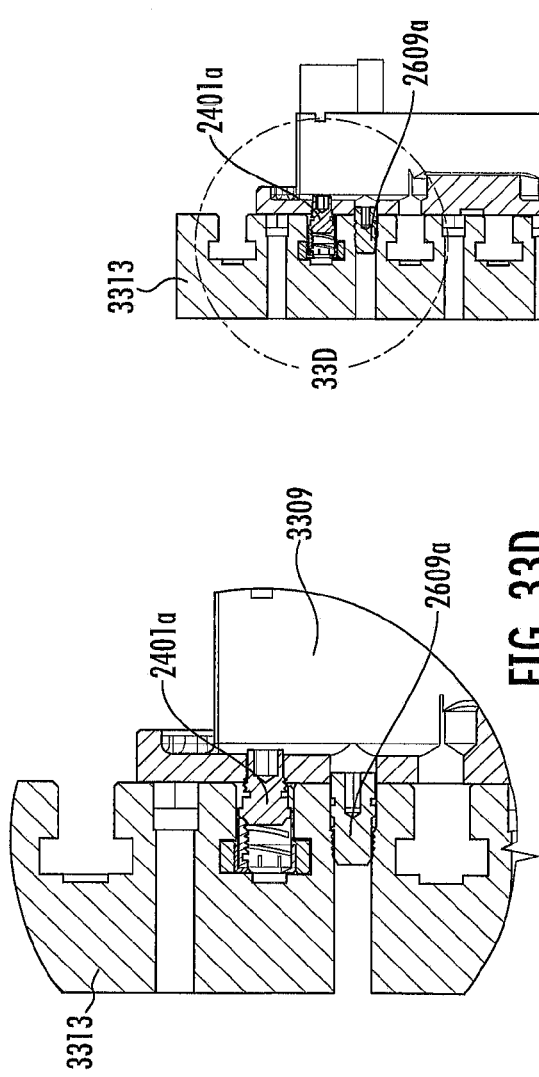
FIG. 33C
FIG. 33D
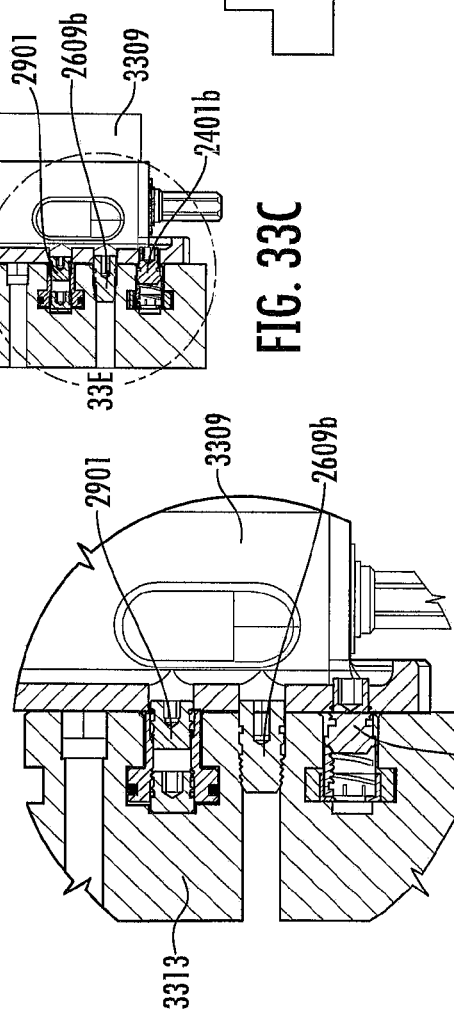
FIG. 33E ature, provide diagnostic information into a display to quickly identify the corresponding figure.

PRECISION LOCATING FASTENING DEVICE

CROSS REFERENCE TO RELATED APPLICATIONS

This application is a continuation-in-part of U.S. Pat. Application Serial No. 16/828,706, filed 24 Mar. 2020, titled "Modular Vise," which is a continuation-in-part of U.S. Pat. Application Serial No. 15/356,321, filed 18 Nov. 2016, titled "Modular Pressure Application System," which issued as U.S. Pat. No. 10,596,673 on 24 Mar. 2020, which claims the benefit of U.S. Provisional Application No. 62/256,865, filed 18 Nov. 2015, titled "Precision Locating Fastening System," all of which are hereby incorporated by reference for all purposes as if fully set forth herein.

BACKGROUND

Field of the Invention

The present invention relates in general to fastening devices, such as modular vises, and, in particular, to modular vises that provide digital feedback regarding applied force. Conventional vises have a fixed opening and do not provide feedback to the user. Therefore the user is likely to over apply force to a working material while holding it in a vise. Materials that have been retained in a vise under too much stress require additional work to accommodate the effects of the overstress. Furthermore, because the opening on conventional vises are fixed, larger pieces of working material cannot be retained if they are bigger than the throw of a conventional vise.

There are many designs of vises well known in the art. However, considerable shortcomings remain.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 7C is a section view of an adjustable vise taken along Line 7C-7C in accordance with a preferred embodiment of the present application.

FIG. 7D is a section view of an adjustable vise taken along Line 7D-7D in accordance with a preferred embodiment of the present application.

FIG. 8A is a perspective view of an adjustable vise member in accordance with a preferred embodiment of the present application.

FIG. 8B is a back view of an adjustable vise member in accordance with a preferred embodiment of the present application.

FIG. 8E is a section view of an adjustable vise member taken along Line 8E-8E in accordance with a preferred embodiment of the present application.

FIG. 8F is an end view of an adjustable vise member in accordance with a preferred embodiment of the present application.

FIG. 10A is a front view of a keeper assembly in accordance with a preferred embodiment of the present application.

FIG. 10B is a section view of a keeper assembly taken along Line 10B-10B in accordance with a preferred embodiment of the present application.

FIGS. 12A-18D depict a fastening device used to releasably fasten a first object and a second object in accordance with the present application.

FIG. 12A is a top view of a housing of the fastening device in accordance with the present application.

FIG. 18D is a trimetric view of the assembled fastening device in accordance with the present application.

FIGS. 19A-24D depict an alternative fastening device used to releasably fasten a first object and a second object in accordance with the present application.

FIG. 19A is a top view of a housing of an alternative fastening device in accordance with the present application.

FIG. 21A is a top view of a capture inset of an alternative fastening device in accordance with the present application.

FIG. 21B is a section view of the capture inset of an alternative fastening device taken along Line 21B-21B in accordance with the present application.

FIG. 21C is a section view of the capture inset of an alternative fastening device taken along Line 21C-21C in accordance with the present application.

FIG. 21D is a trimetric view of the capture inset of an alternative fastening device in accordance with the present application.

FIG. 24D is a trimetric view of the assembled alternative fastening device of FIGS. 19A-23C.

FIG. 25A is a top view of a modular T-Slot fixture in accordance with the present application.

FIG. 25B is a section view of the modular T-Slot fixture taken along Line 25B-25B in accordance with the present application.

FIG. 25C is a section view of the modular T-Slot fixture taken along Line 25C-25C in accordance with the present application.

FIG. 25D is a section view of the modular T-Slot fixture taken along Line 25D-25D in accordance with the present application.

FIG. 25E is a trimetric view of the modular T-Slot fixture in accordance with the present application.

FIGS. 26A-29D depict an alternative fastening device used to releasably fasten a first object and a second object in accordance with the present application.

FIG. 26A is a top view of a dowel pin of an alternative fastening device in accordance with the present application.

FIG. 27A is a top view of a housing of an alternative fastening device in accordance with the present application.

FIG. 27B is a section view of the housing of an alternative fastening device taken along Line 27B-27B in accordance with the present application.

FIG. 27C is a section view of the housing of an alternative fastening device taken along Line 27C-27C in accordance with the present application.

FIG. 27D is a trimetric view of the housing of an alternative fastening device in accordance with the present application.

FIG. 28A is a top view of an O-ring of an alternative fastening device in accordance with the present application.

FIG. 28B is an end view of the O-ring of an alternative fastening device in accordance with the present application.

FIG. 28C is a trimetric view of the O-ring of an alternative fastening device in accordance with the present application.

FIG. 29D is a trimetric view of the assembled T-slot locator fastening device of FIGS. 26A-28C.

FIGS. 30A-32D depict an alternative fastening device used to releasably fasten a first object and a second object in accordance with the present application.

FIG. 30A is a top view of a biasing member of an alternative fastening device in accordance with the present application.

FIG. 30B is a section view of the biasing member of an alternative fastening device taken along Line 30B-30B in accordance with the present application.

FIG. 30C is a section view of the biasing member of an alternative fastening device taken along Line 30C-30C in accordance with the present application.

FIG. 30D is an end view of the biasing member of an alternative fastening device in accordance with the present application.

FIG. 30E is a trimetric view of the biasing member of an alternative fastening device in accordance with the present application.

FIG. 31A is a top view of a retractable dowel pin of an alternative fastening device in accordance with the present application.

FIG. 31B is an end view of the retractable dowel pin of an alternative fastening device in accordance with the present application.

FIG. 31C is a trimetric view of the retractable dowel pin of an alternative fastening device in accordance with the present application.

FIG. 32A is a top view of the assembled T-slot locator fastening device of FIGS. 30A-31C.

FIG. 32B is a section view of the assembled T-slot locator fastening device of FIGS. 30A-31C taken along Line 32B-32B.

FIG. 32C is a downward trimetric view of the assembled T-slot locator fastening device of FIGS. 30A-31C.

FIG. 32D is an upward trimetric view of the assembled T-slot locator fastening device of FIGS. 30A-31C.

FIG. 33B is a front view of the assembled T-slot locator application in accordance with the present application.

FIG. 33C is a section view of the assembled T-slot locator application taken along Line 33C-33C in accordance with the present application.

FIG. 33D is an exploded section view of the assembled T-slot locator application taken along Line 33D in accordance with the present application.

FIG. 33E is an exploded section view of the assembled T-slot locator application taken along Line 33E in accordance with the present application.

FIG. 33F is a trimetric view of the assembled T-slot locator application in accordance with the present application.

FIG. 34B is a front view of an alternative embodiment of the assembled T-slot locator application in accordance with the present application.

FIG. 34C is a section view of an alternative embodiment of the assembled T-slot locator application taken along Line 34C-34C in accordance with the present application.

FIG. 34D is a trimetric view of an alternative embodiment of the assembled T-slot locator application in accordance with the present application.

Figure 1:
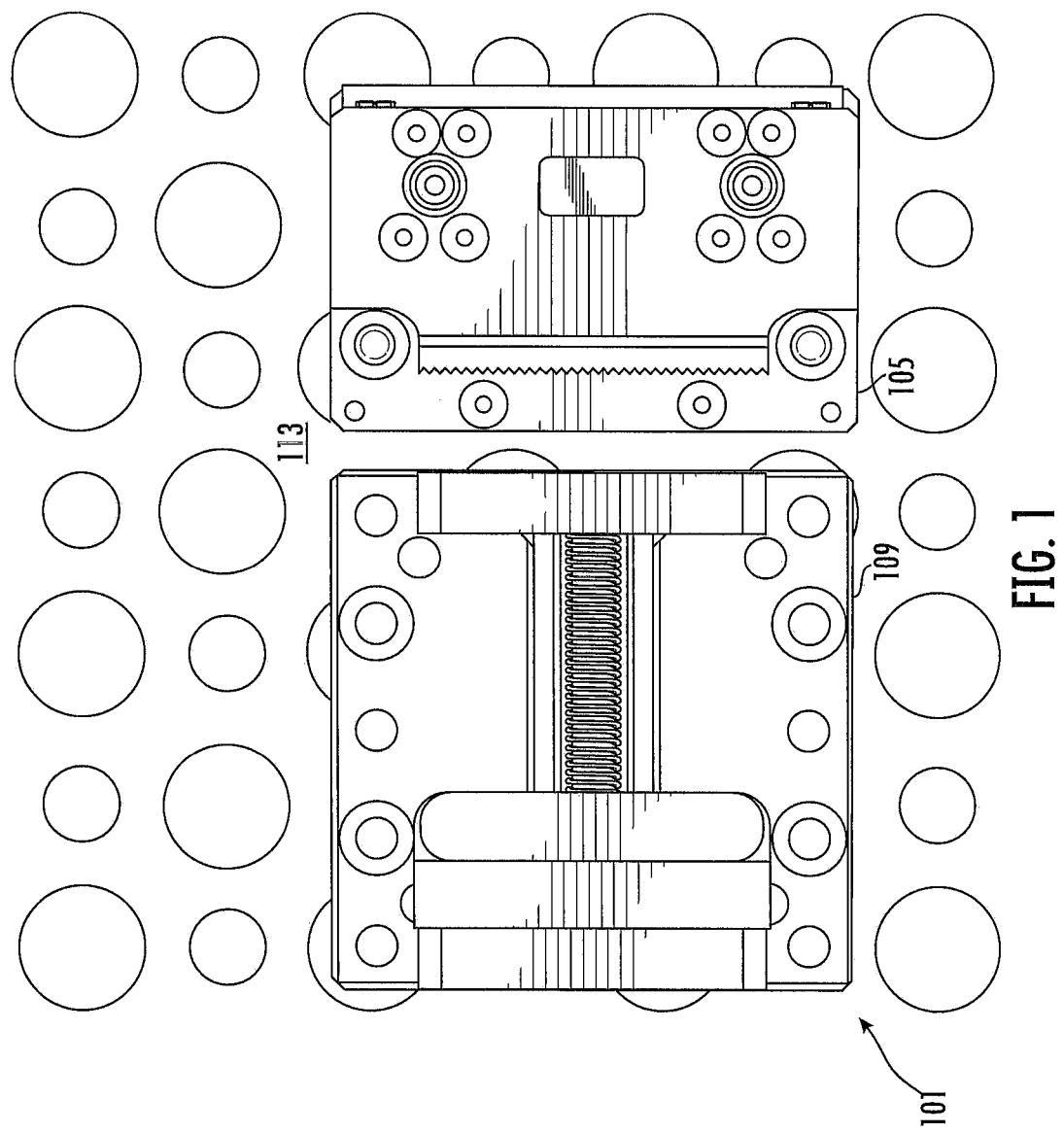
FIG. 1 is a top view of an improved vise system in accordance with an embodiment of the present application.
Figure 2A:
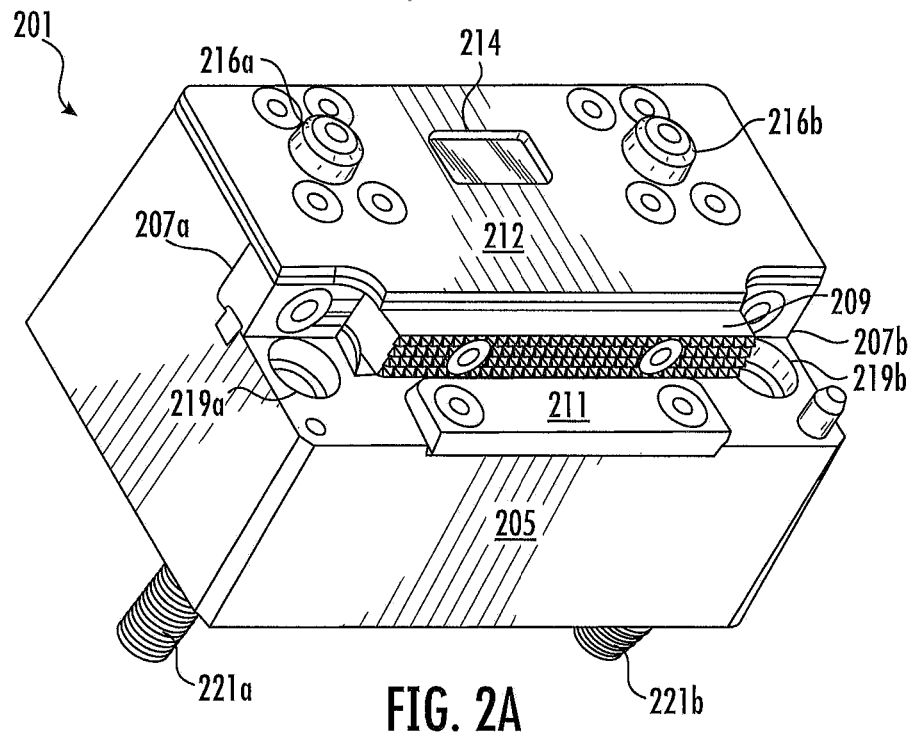
FIG. 2A is a perspective view of a fixed vise in accordance with an embodiment of the present application.
Figure 2B:
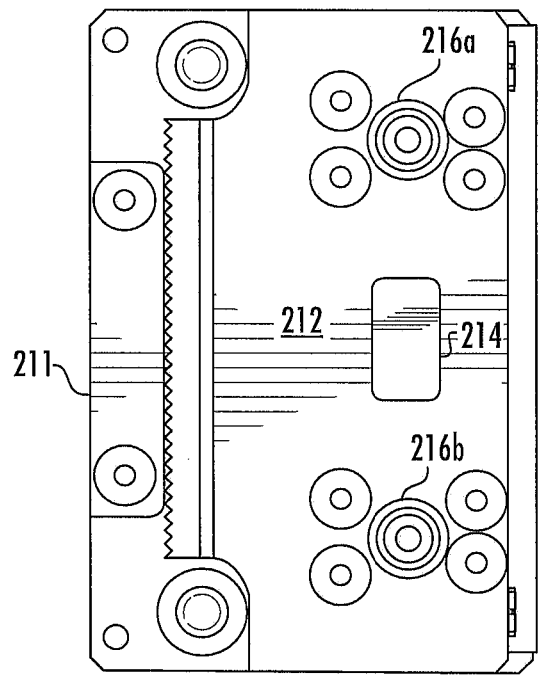
FIG. 2B is a top view of a fixed vise in accordance with an embodiment of the present application.
Figure 2C:
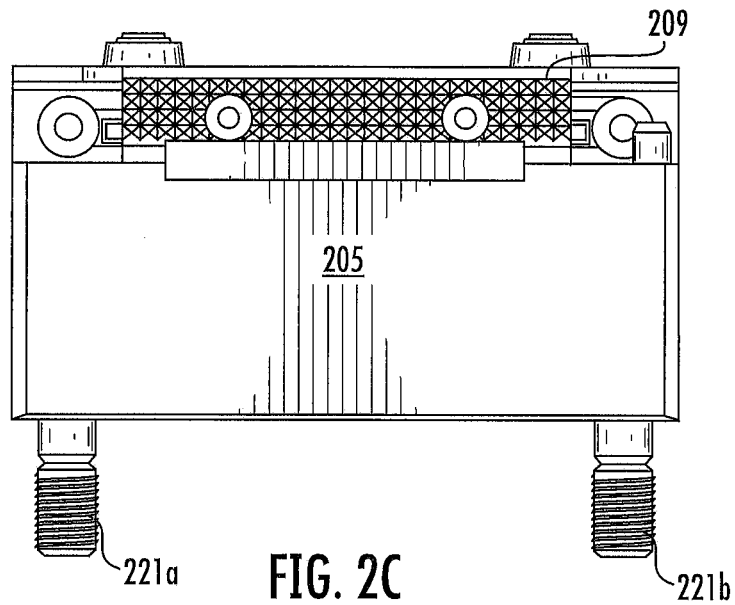
FIG. 2C is a front view of a fixed vise in accordance with an embodiment of the present application.
Figure 2D:
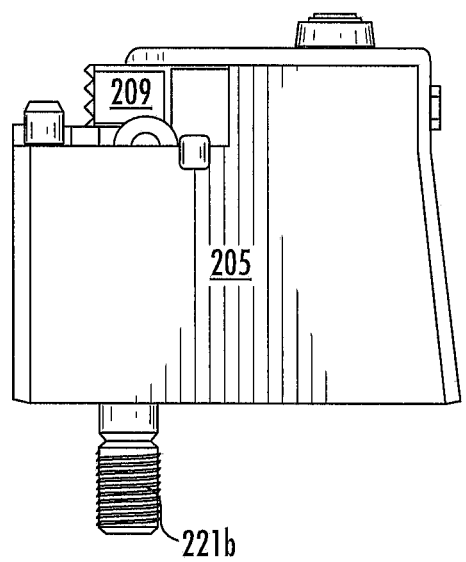
FIG. 2D is an end view of a fixed vise in accordance with an embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

An improved vise system described herein provides digital feedback to the user through the use of sensors configured to measure the clamping force provided between a fixed base and an adjustable base. The fixed base utilizes strain gages to measure an amplitude of forces applied to the fixed base through a working member from the adjustable base. The adjustable base utilizes a bi directional worm screw to apply a linear force to the working member relative to the fixed base. Each element in the system is positive located. "Positively locating" is defined as locating the element, such as an adjustable vise, in all three axes. A whole vise is created by pairing an adjustable base vise with a fixed base vise so that a distance between the grippers of the adjustable base vise and fixed base vise can be adjusted by moving part of the adjustable base vise.

The terms "precision location" and "precision locating" are used herein. Precision location combines the concepts of accuracy and precision to indicate a situation in which something is reliably located repeatedly. These terms refer to the ability to locate something accurately, in such a way that features that are to be made based upon that location can be depended upon to be in that location over and over again (repeatedly). Accuracy refers to the positional tolerance when compared to theoretical exact positions. The closer the positional tolerance is to theoretical exact positions, the more accurately the piece is located. The more frequently a piece is placed in that position of accuracy indicates its preciseness. The tooling products disclosed herein are used to accurately and precisely change pieces, tools, plates, objects rapidly and repeatedly. This precision location is necessitated by the tolerances required for modern products. It is noted that although tooling and machining are discussed throughout the present application, the vise members, fixture plates, fasteners, and other aspects are applicable to any number of systems and uses involving linear forces, such as in woodworking, metalworking, vacuum vises, plumbing, die making, tool sharpening, jewelry, tying flies, blacksmith vise, rigging, and combinations thereof.

The improved system is modular and allows users to move various elements in the system to accommodate working materials without having a fixed opening. Referring now to FIG. 1, a top view of the improved vise system is illustrated. System 101 is comprised of a fixed vise 105, and an adjustable vise 109, both retained on a fixture plate 113. The fixed vise 105 can be moved relative to the adjustable vise 109 on the fixture plate 113 to hold parts or working materials as large as the fixture plate. Additionally supports can be utilized as needed between the fixed vise and the adjustable vise to support large spans. While illustrated as a fixed vise and an adjustable vise, it should be apparent that the system may be comprised of a pair of adjustable vises or some other combination of fixed and adjustable vises as needed to retain the object.

It is important to note, that an advantage of the components and their assembly include the combination of parts without conventional fasteners. For example, some components of the fastening devices and vises disclosed herein are held in place by expansion, after the component has been placed in cryogenic temperatures and allowed to equilibrate. The expanded state of the component holds the component part in place. In some embodiments, fixture plates are configured to receive conventional fasteners. So, various combinations of fastening devices, conventional fasteners, and vises are encompassed herein.

Referring now also to FIGS. 2A-2D, various views of a fixed vise 201 are illustrated. Fixed vise 201 is comprised of a housing base 205, a pair of spring blocks 207a, 207b a gripper 209, a wear pad 211, a cover plate 212, a screen 214 or display wired to and for a microcontroller located underneath the cover plate, a power supply (not shown), and a pair of input devises 216a, 216b. Housing base 205 has a plurality of surfaces some parallel and some orthogonal to the plane of the fixture plate. Housing base 205 is configured to be mounted to a fixture plate and is comprised of a plurality of openings, including at least openings 219a and 219b. Some of openings 219 are configured for one or more fasteners, such as fastener 221a and 221b (FIG. 2C) going from the top of the base through to screw into the fixture plate. Some of openings are configured for a fastener going from the fixture plate to be screwed into housing base 205. Each of the spring blocks 207 has a first end fastened to housing base 205 and a second end fastened to gripper 209. As a force is applied to gripper 209 the spring blocks are placed under strain.

Microcontroller is wired to a pair of strain gages located on one of spring blocks 207 thereby forming a half bridge circuit capable of measuring force from tightening the adjustable vise relative to the fixed vise. A first strain gage is located on a first surface of the spring block and a second strain gage is located on a second surface of the spring block opposite the first surface. In an alternative embodiment each spring block uses a pair of strain gages wired to the microcontroller as a full bridge between the two spring blocks. Screen 214 preferably displays the force measured by the strain gages and features a preset system. The preset system allows users to input a certain force, such as one hundred pounds, and as the strain gages measure the preset force of one hundred pounds an alert is issued to the user. The alert preferably is a flashing screen, but may be a light emitting diode, a change in color in the screen, and/or an audible alarm. Furthermore, the output of the strain gage and or the output of the microcontroller may be used in a control loop to control a motorized screw drive system. For example, the user may set the system to apply only twenty-five pounds of force to retain a block and the motorized screw system would start tightening until the microcontroller measured the twenty-five pounds.

Preferably input devises 216a, 216b are a first and second push button switch. The input devises provide control to the microcontroller by the user. For example power to the microcontroller from the power supply can be turned off and on. The user can adjust alerts, limits, units, and calibration data by actuation of the switch. Furthermore, the system further comprises a wired or a wireless link such that the microcontroller can be coupled to a remote controller and or datalogger. Recording with a datalogger the forces applied to working materials or parts over time generates a log for quality control. For example, a smartphone can be used as a remote viewing devise to provide an additional screen in addition to screen 214 and can also be used to record the forces measured over time.

Figure 3B:
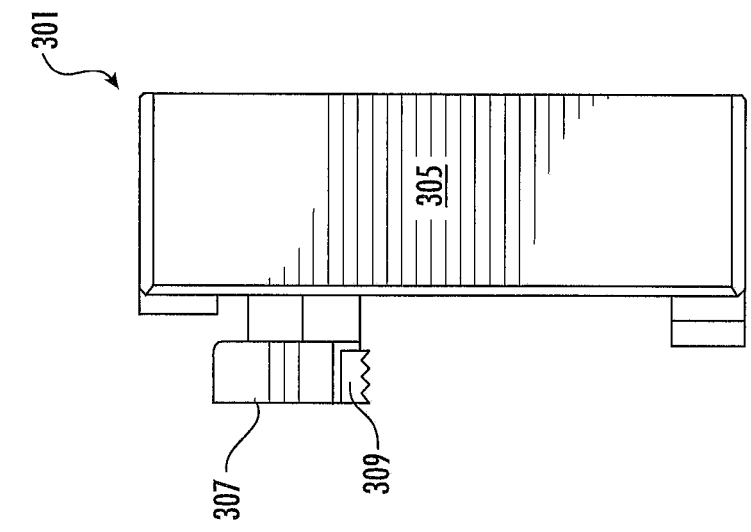
FIG. 3B is an end view of an adjustable vise in accordance with an embodiment of the present application.
Figure 3A:
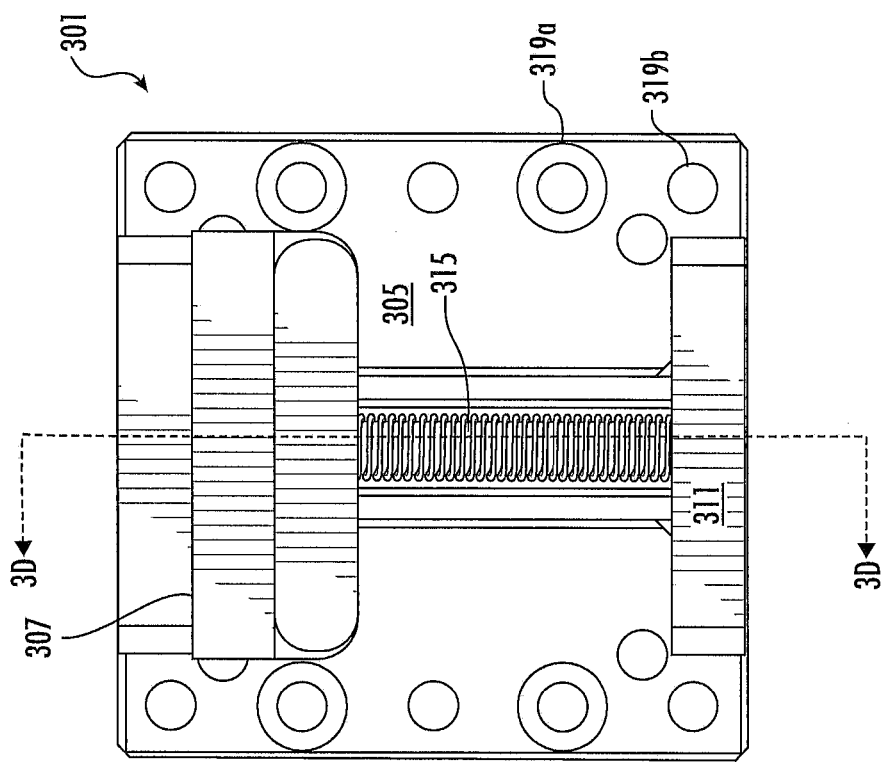
FIG. 3A is a top view of an adjustable vise in accordance with an embodiment of the present application.
Figure 3D:
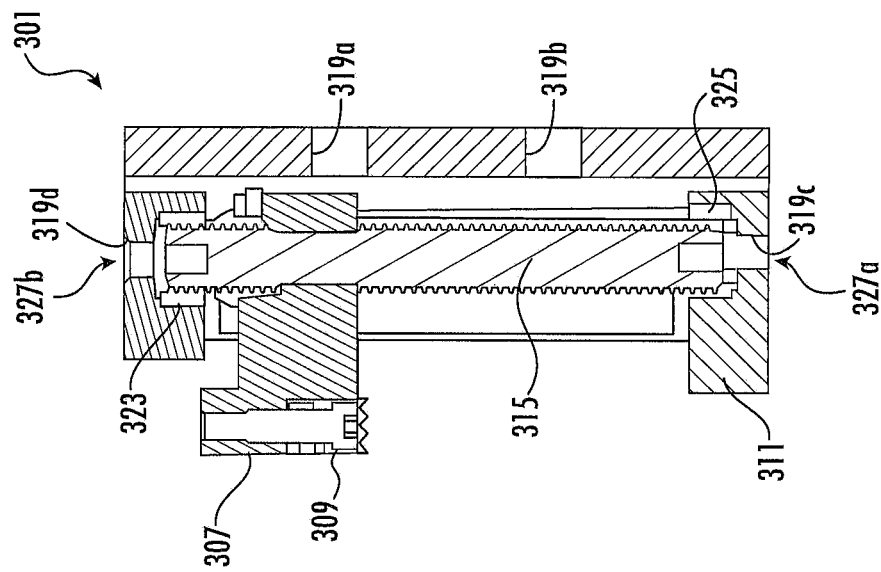
FIG. 3D is a section view of an adjustable vise taken along Line 3D-3D in accordance with an embodiment of the present application.
Figure 3C:
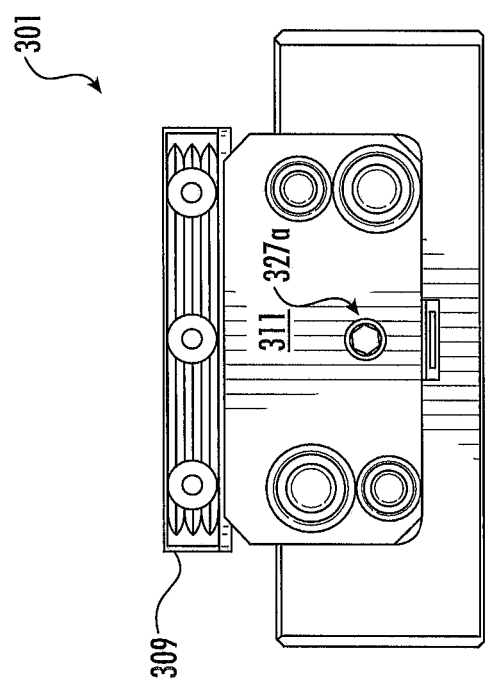
FIG. 3C is a front view of an adjustable vise in accordance with an embodiment of the present application.

Referring now also to FIGS. 3A-3D, various views of an adjustable vise 301 are illustrated. Adjustable vise 301 is comprised of a base 305, a pusher 307, a gripper 309 (FIG. 3C), a wear pad 311, and a drive screw assembly 315. Base 305 is configured to be mounted to a fixture plate and is comprised of a plurality of openings, including at least 319a, 319b, 319c (FIG. 3D), and 319d (FIG. 3D). Openings 319a and 319b are configured to receive fasteners, such as a threaded bushing having a 10-point keyed end or a retractable dowel pin. Openings 319c and 319d are respectively adjacent a receiving inset 323 and a capture inset 325. At least one of the receiving inset 323 and the capture inset 325 are removably inset into base 305, and preferably both are removable. At least one of openings 319c and 319d are configured as a through-hole opening, providing access to a keyed end 327a or 327b of the drive screw. Preferably, both ends 327a and 327b of the drive screw have hex-key ends, although other key types, such as a 5-point key, are encompassed herein.

Base 305 has a plurality of surfaces some parallel and some orthogonal to the plane of the fixture plate. Some of openings 319 are configured for a fastener going from the top of the base through to screw into the fixture plate. Some of openings 319 are configured for a fastener going from the fixture plate to be screwed into the base 305. The openings 319a and 319b are configured to allow the base 305 to be mounted to at least 2 different tables having varied hole patterns in the table. Opening 319a may be configured for a bushing, while opening 319b is configured for a retractable dowel pin.

Preferably, pusher 307 is angled and located in a t-slot of the base, the t-slot is cut at a downward angle relative to the rest of the base, typically one degree (1°) relative to the fixture plate, as clearly shown in the section view 3D. Therefore the pusher translates in a non-parallel plane relative to the fixture plate. Alternatively, pusher 307 is disposed within the t-slot at no angle (i.e., parallel with the bottom surface of the base). Pusher 307 is rotationally coupled to the drive screw assembly so that as the drive screw assembly is rotated by the user the pusher move along an axis defined by the t-slot. The drive screw assembly typically is rotated by insertion of a hex key in either end of drive screw assembly and turning the hex key. Wear pad 311 is held to the base by fasteners and is replaceable. Wear pad 311 is the preferred location on the adjustable vise to support the part to be retained. The gripper 309 is held to the pusher by a set of fasteners. Gripper 309 is reversible and has a side with grooves as shown and a smooth side not shown.

During use of the modular pressure application system the user couples at least one of the vises to the fixture plate. Typically the fixed vise is coupled to the fixture plate first. Then the user couples the adjustable vise a distance away from the fixed vise. The distance away is calculated to allow for the securement of the item to be held.

The part is placed on the wear pads of both vises. The user then rotates the drive screw to apply pressure to the item being held between the adjustable vise and the fixed vise. As a force is applied to the gripper of the fixed vise the gripper applies strains to the spring blocks coupled to the gripper of the fixed vise. The strain gages located on the spring blocks then measure the strains in at least one of the spring blocks. The output of the strain gage is indicated to the user, typically on a screen, such that the user can measure the force applied to the item being held as the drive screw is being turned. It is important to note that although a single wear pad may be depicted on a vise in the figures, multiple wear pads may be attached at different locations, such as at different locations on the base member of a vise, to provide different precision locating surfaces.

Figure 4:
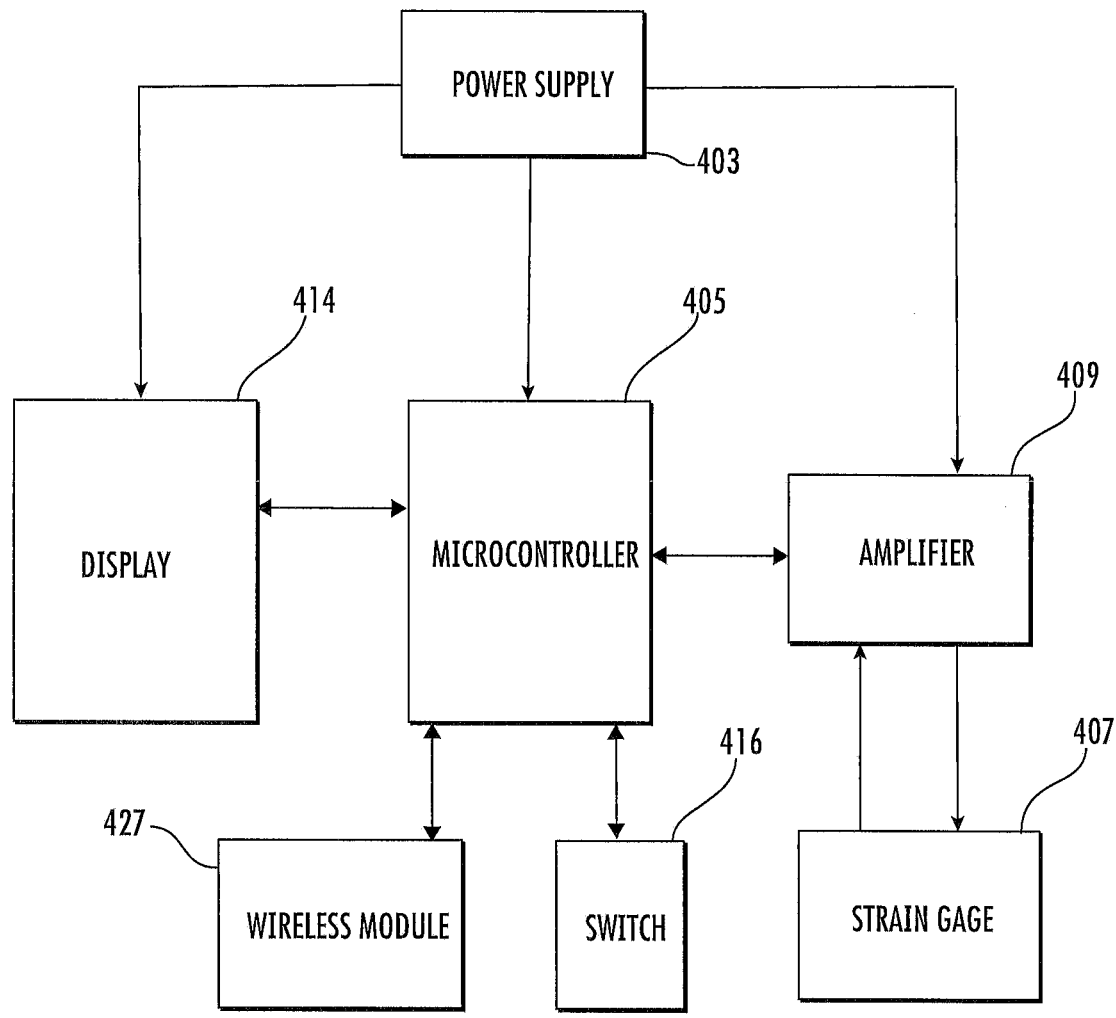
FIG. 4 is a schematic of a modular pressure application system in accordance with an embodiment of the present application.

Referring now also to FIG. 4 a schematic of a Modular Pressure Application System 401 is illustrated. System 401 is comprised of power supply 403, a microcontroller 405, a strain gage 407, an amplifier 409, a display 414, a switch 416, and a wireless module 427. Power supply 403 is typically a direct current power source, such as a nine volt battery, and provides power for display 414, microcontroller 405, and amplifier 409. Power supply 403 also provides power for the wireless module in those embodiments with a wireless module. Wireless module 427 may be located on or towards an end of a device to reduce interference, and may utilize amplitude-shift keying (ASK), frequency-shift keying (FSK), or phase-shift keying (PSK). Amplifier 409 provides a supply voltage to strain gage 407 and amplifies the resulting output voltage from the strain gage. Microcontroller 405 measures the amplified output voltage from the amplifier and creates a visual indicator on display 414. Visual indicator is preferably textual but may be a bar chart or other indication of force applied. Switch 416 is coupled to the microcontroller and allows the user to select menus and zero the system as needed. Microcontroller 405 generates the digital display for the user on display 414 by converting the analog output of the strain gage into a digital measurement configured for a liquid crystal screen such as display 414.

Figure 5:
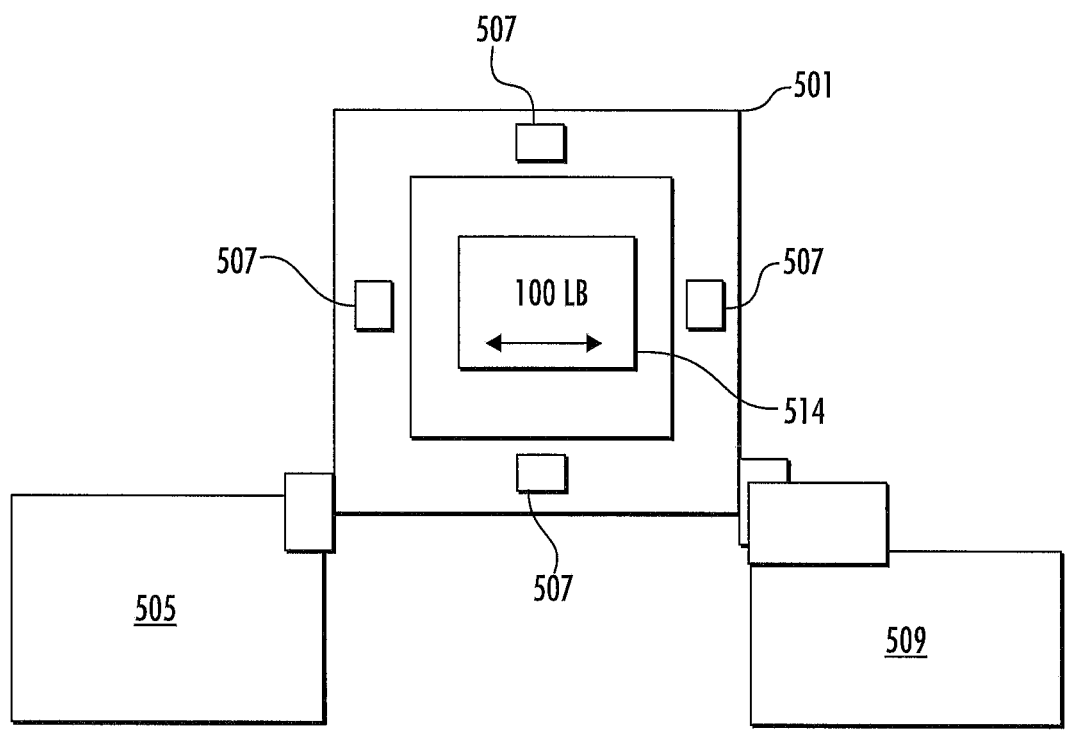
FIG. 5 is a block diagram of a calibration block in accordance with an embodiment of the present application.

Referring now also to FIG. 5 a side view of a calibration block of the Modular Pressure Application System is illustrated. Calibration block 501 is secured between a fixed vise 505 and an adjustable vise 509. Calibration block 501 is comprised of a calibrated system of strain gages 507, a power supply, a controller, and a display 514. Calibration block is remotely calibrated in a lab so that the display accurately indicates the applied forces. The user places the calibration block in the modular pressure application system and engages adjustable vise 509 and then compares display 514 of the calibration block to the display of the fixed vise to determine the offset of the fixed vise. Therefore the fixed vise does not have to be returned to a calibration lab as the calibration can be done in the field.

Figure 6A:
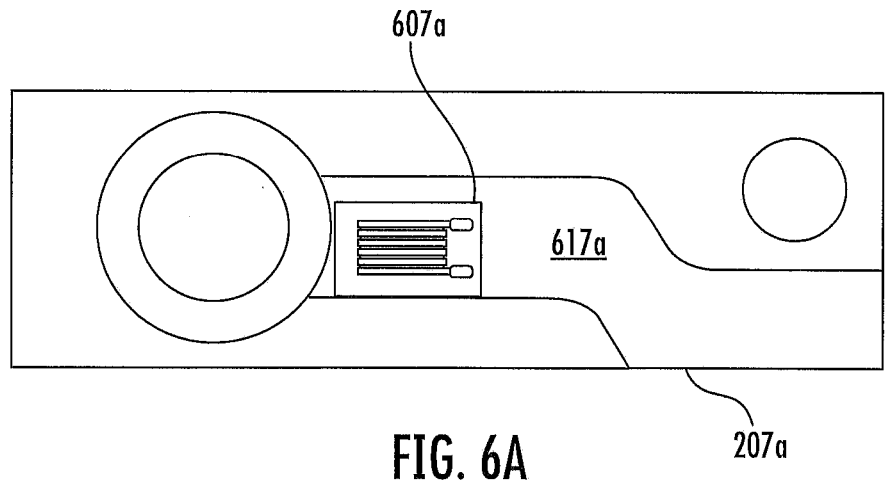
FIG. 6A is a front view of a spring block in accordance with an embodiment of the present application.
Figure 6B:
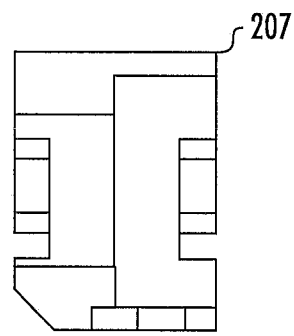
FIG. 6B is an end view of a spring block in accordance with an embodiment of the present application.
Figure 6C:
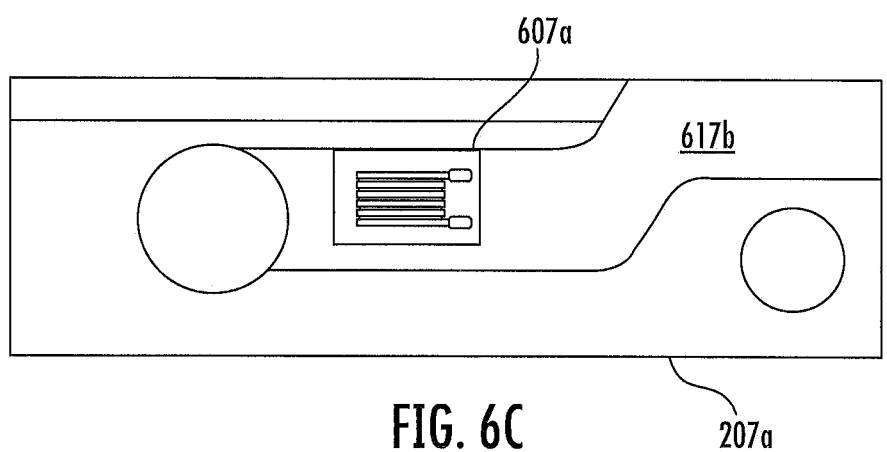
FIG. 6C is a back view of a spring block in accordance with an embodiment of the present application.

Referring now also to FIG. 6 various views of a spring block 207 of the Modular Pressure Application System is illustrated. Spring block 207a is comprised of a first surface 617a and a second surface 617b. Spring block 207a further comprises a first strain gage 607a located on first surface 617a and a second strain gage 607b located on second surface 617b. Both first 617a and second surfaces 617b are formed by creating two channels in the spring block 207a. The channels provide a recessed location for the strain gage and the wiring connecting the strain gages.

The improved modular vise system standardizes the forces that are applies to the working material for the specific purpose of managing the internal stress applied to the material or part being held.

Referring now also to FIGS. 7A-7F in the drawings, a perspective view of an adjustable vise 701 is illustrated. In a preferred embodiment, the adjustable vise 701 is comprised of a housing base member 705, a pusher assembly 715, a retention pin 708 (FIG. 7E), a gripper 709, a shoulder stop member 718, a plurality of openings 719, a plurality of fasteners 721, a receiving ball cup 723 (FIG. 7C), a keeper assembly 725, a shoulder 726, a first hex-key end 727a, a second hex-key end 727b, a distal end 731 (FIG. 7C), and a proximal end 733. Base member 705 has a plurality of surfaces some parallel and some orthogonal to the plane of a fixture plate. Adjustable vise member 701, alone, together with another adjustable vise member, or together with a fixed vise member is/are removably connected and precisely located on a fixture plate. In other embodiments, adjustable vise member(s) 701 and/or the fixed vise member(s) are used with a conventional base plate (not shown) and/or a modular base plate, such as a base plate without T-slots and elongated slots that includes openings for threaded screws, bolts, and/or other conventional fasteners.

It is important to note that although pusher assembly 715 is depicted as being a single pusher assembly mounted on a vise base member 705. In other embodiments a vise base member is configured to have multiple pusher assemblies mounted to the vise base member.

In a preferred embodiment, adjustable vise member 701 is adjusted to secure a machineable part between it and another vise member. The adjustment occurs using either end of a rotationally attached, keyed drive screw. Preferably, one or more machineable parts are secured between the pusher and a dovetail ledge of the same vise and/or between the pusher and another dovetail ledge of another vise member to prevent movement along three axes during machining of the part.

In a preferred embodiment, base member 705 is configured to be mounted to the fixture plate, or to another vise member via stacking, and is comprised of plurality of openings 719. At least openings 719*a*, 719*b*, 719*e*, 719*f*, 719*g*, and 719*h* are configured for one or more locators going from the base member 705 through to screw into the fixture plate. Some of openings 719 are configured for a locator going from the fixture plate to be screwed into the base member 705. Openings 719*c* and 719*d* are configured as through-hole openings to provide access to the hex-key ends 727*a* and 727*b*.

Figure 7B:
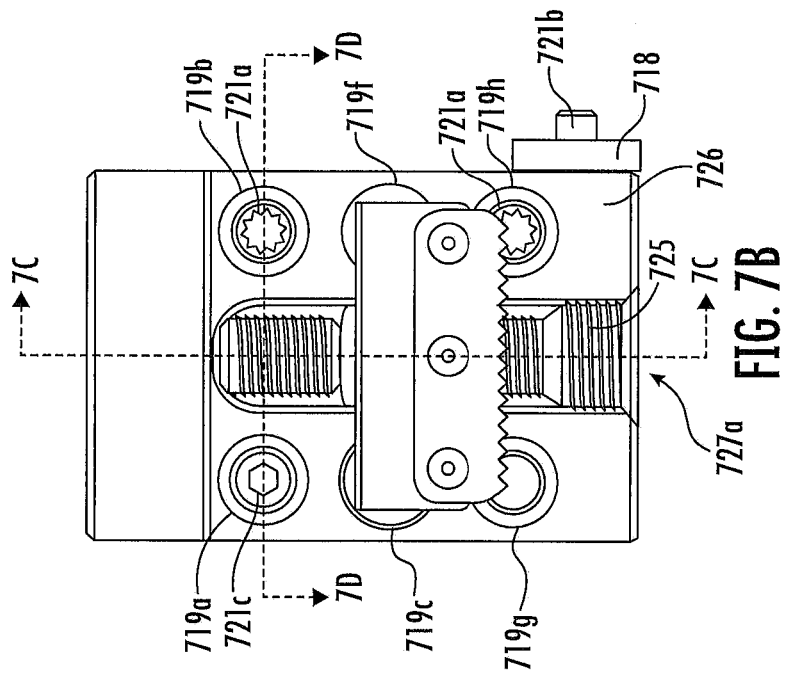
FIG. 7B is a top view of an adjustable vise in accordance with a preferred embodiment of the present application.
Figure 7A:
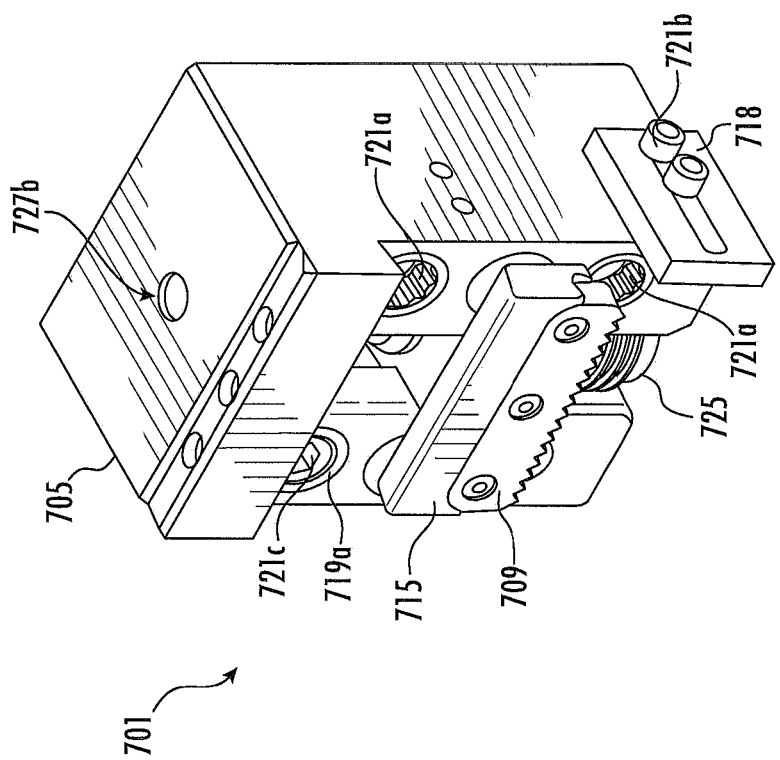
FIG. 7A is a perspective view of an adjustable vise in accordance with a preferred embodiment of the present application.
Figure 7F:
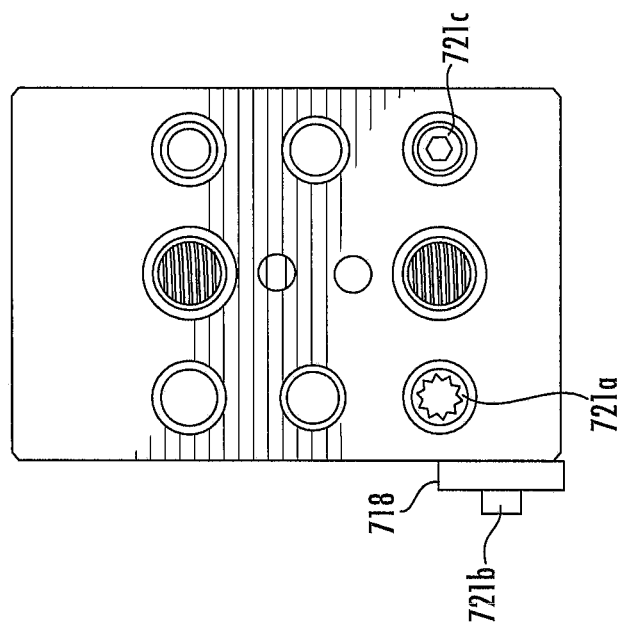
FIG. 7F is a bottom view of an adjustable vise in accordance with a preferred embodiment of the present application.
Figure 7E:
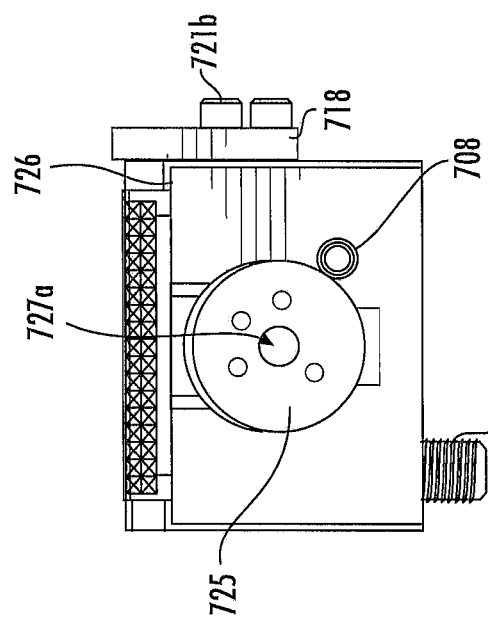
FIG. 7E is a front view of an adjustable vise in accordance with a preferred embodiment of the present application.
Figure 8D:
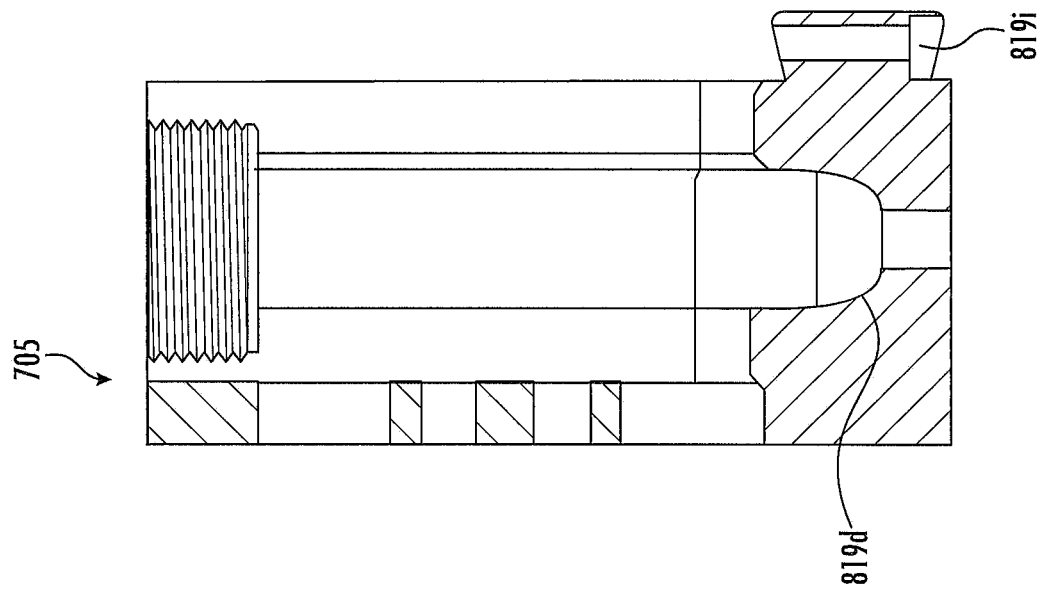
FIG. 8D is a section view of an adjustable vise member taken along Line 8D-8D in accordance with a preferred embodiment of the present application.
Figure 8C:
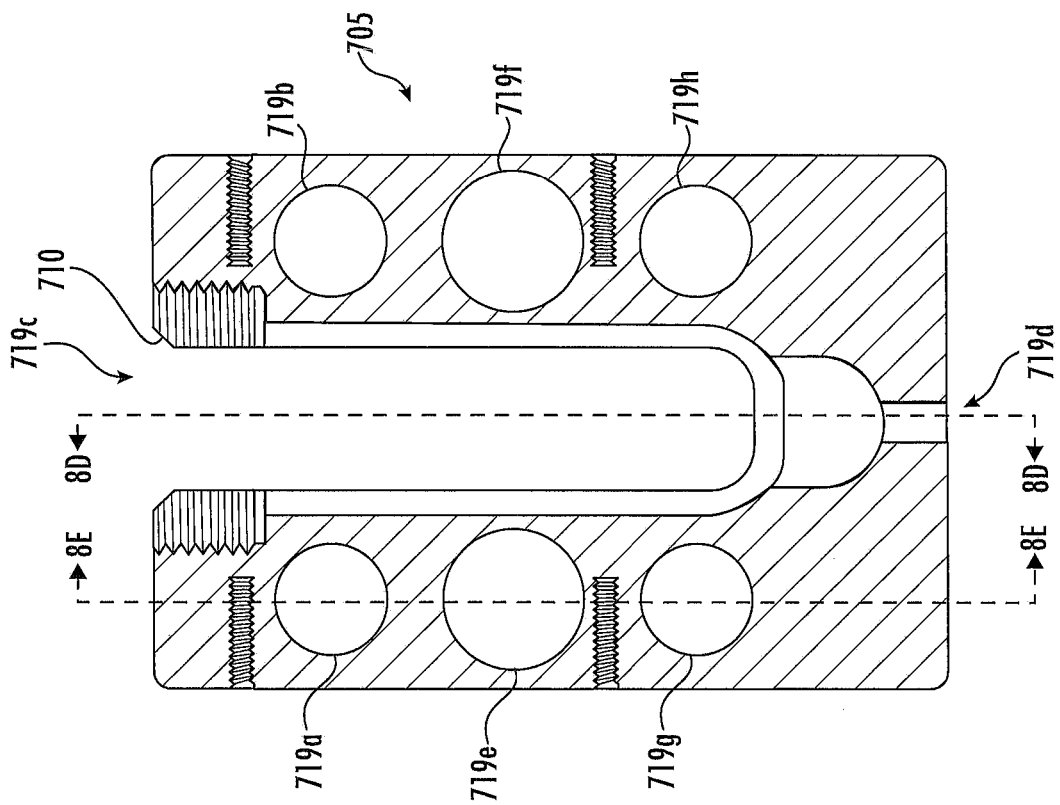
FIG. 8C is a section view of an adjustable vise member taken along Line 8C-8C in accordance with a preferred embodiment of the present application.

Preferably, the openings 719 are configured to retain or receive a plurality of locators comprising a plurality of locating dowel pins and/or a plurality of threaded bushings. For example, a threaded 10-point bushing 721*a* may be housed within an opening 719 in the base 705. By way of another example, a stop member pin 721*b* may be used to locate shoulder stop member 718 and connect it to shoulder 726. By way of yet another example, a retractable dowel pin 721*c* may be housed within a fixture plate beneath the adjustable vise 701, such that when opening 719*g* is above the retractable dowel pin a hex tool, a ten-point driver tool, an Allen wrench, or a screw driver is used to rotate the retractable dowel pin 721*c*, raising it up from the fixture plate and into the opening 719*g*, as depicted in FIGS. 7D and 7E. The retractable dowel pin 721*c* thereby prevents movement of the adjustable vise 701 along at least two axes, such as the x- and y- axes. The openings 719 of the adjustable vise 701 may also be configured for conventional fasteners, such as a conventional dowel, bolt, or screw. When a fastener with a threaded head is used, movement in all three axes is prevented.

In a preferred embodiment, adjustable vise 701 has at least six openings 719, with at least two openings 719*a* and 719*g* configured for retractable dowel pins 721*c*, and at least two openings 719*b* and 719*h* configured for threaded bushings 721*a*. Other fastener and opening arrangements are encompassed herein. For example, the adjustable vise could have four dowel pin openings 719 and two bushing openings 719; or, the adjustable vise could have three openings for dowel pins and three openings for threaded bushings. Multiple opening 719 arrangements and locations relative to the base 705, a fixture plate, a work piece, or another vise are envisioned and encompassed herein. Also, the number, dimensions, and texture (e.g., smooth vs. threaded) of the openings 719 may also change based on the dimensions of adjustable vise 701 and/or the part it will be securing for machining.

In at least one embodiment, two fasteners are within a single opening 719 for securing from both the top and the bottom of the adjustable vise 701. For example, referring now to FIG. 7D in the drawings, a first fastener 721*c* comprises a retractable bushing or dowel pin extending from a bottom of the adjustable vise 701, or extendably housed in a fixture plate. Another retractable dowel pin 721*c* may be housed within base 705 above the first dowel pin, and is configured to be rotated up to locate a part or another vise on top of base 705 as depicted in FIG. 7D. Dowel pin 721*c* includes a cylindrical housing having an outer circumference and a first-end corresponding to the operating surface of the fixture plate. In FIG. 7A, threaded bushing 721*a* has threads formed on the outer circumference of the housing to threadably restrain the adjustable vise 701 to another part, such as a fixture plate. A hex-key or ten-point key cavity is formed within at least the fixture plate end of the cylindrical housing to rotate it up into the vise. Alternatively, both ends of fastener 721*a* have a hex-key or ten-point driver cavity formed within them.

Referring now to FIGS. 7C and 7D in the drawings, one or more smooth bushings 720 are shaped and dimensioned to receive the smooth head of a retractable dowel pin (see FIGS. 26A-26C below). The vise is prevented from moving along at least two axes through the use of a smooth dowel pin. However, in some embodiments, smooth bushings 720 are replaced with threaded bushings (not shown), which receive the threaded heads of a threaded retractable dowel pin (not shown). By replacing the smooth head with a threaded head, the threads prevent movement along the third axis, or z-axis.

In at least one embodiment, bushing fastener 721*a* includes a stud assembly for use in securing a workpiece or another vise to the top surface of the adjustable vise 701. Bushing of fastener 721*a* comprises a cylindrical housing having an outer circumference and a first-end corresponding to opening 719*h* within the top surface of the adjustable vise 701. Threads are formed on the outer circumference of the bushing. A stud cavity is formed within the cylindrical bushing housing with a first lower portion being threaded and a second upper portion of the cavity being configured as a stud passage. A stud or dowel pin having a first threaded end is passed through the stud passage and threadably retained in the lower portion of the stud cavity. Although fastener 721*a* is depicted without a bias system, other embodiments include a bias system, such as a spring, disposed below the stud and the bushing housing. The bias system is operable to bias the threaded portion through the stud passage, and extend the stud above the surface of adjustable vise 701, or a fixture plate, upon receiving rotation, such as a ¼ turn rotation. Additionally, the stud of fastener 721*a* may have a top end that is smooth, or alternatively, the stud may have a top end that is threaded.

Preferably, fastener 721*c* extending from adjustable vise 701 is adjusted from the top surface of adjustable vise 701, through opening 719*g*. Alternatively, fastener 721*c* is adjusted from a bottom or underside of the fixture plate by rotating the fastener through a hole or opening formed in the fixture plate. Preferably, the fastener extending from or out of the top surface of the adjustable vise 701 (FIG. 7D is adjusted from the top of vise 701. Alternatively, a through-passage (not shown) is formed in the uppermost fastener 721*c*, enabling an adjusting access to the top end of lowermost fastener 721*c* through the passage formed in the uppermost fastener. Holes may be formed in the machineable part for securing the part to vise 701 by way of an uppermost fastener or a gripper. Preferably, at least four fasteners are used to retain the part, and at least four fasteners are used to retain the vise, with at least two of the fasteners using threads and/or bushings. Openings 719 are configured to allow base member 705 to be mounted to at least two different tables having varied hole patterns in the table.

Shoulder stop member 718 is retained by one or more threaded fasteners 721*b* (FIGS. 7A and 7E). Preferably, two threaded fasteners 721*b* retain stop member 718 and are configured to sit within an elongated channel formed in stop member 718 to enable dimensional adjustments to stop member 718. The dimensional adjustments include adjusting a height of stop member 718 that protrudes above or below a horizontal surface of adjustable vise 701. Alternatively, the dimensional adjustments include adjusting a length of stop member 718 extending horizontally from a side of adjustable vise 701.

Preferably, pusher assembly 715 is located or partially housed within a t-slot 717 formed or cut in base member 705. Therefore, depending on the orientation of adjustable vise 701, the pusher of pusher assembly 715 translates at a slight angle (e.g., one or two degrees), orthogonally, or parallel to the t-slots formed in the fixture plate. The translation is from distal end 731 to proximal end 733, or visa-versa.

Referring now also to FIGS. 8A-8F in the drawings, a body of adjustable vise base member 705 is illustrated. Base member 705 has a unitary body, formed from a single piece of material, such as hardened tool steel. A length of opening 719g formed in the base member 705 is substantially orthogonal (e.g., variance of one to two degrees) to a length of t-slot 717 formed in base member 705. A distal end of base member 705 includes an access opening 719d for adjusting the drive screw of pusher assembly 715 from the distal end. A ratio of the diameter of opening 719d to the outer diameter of the drive screw is approximately 0.5 to 0.8, thereby providing sufficient grip and torque to the hex-tool used to rotate the drive screw.

Preferably, openings 819i are formed in a dovetail ledge of the base member 705 for passing through the dovetail ledge to the workpiece being held, to further anchor the workpiece. Alternatively, openings 819i are threaded and are used for attaching a grooved or serrated surface to the dovetail ledge.

Circular, threaded opening 719c is formed in base member 705 at the proximal end of t-slot 717. Opening 719c includes threads or a second gripping surface 710 for securing keeper assembly 725 to base member 705. A rounded or beveled opening 819d (FIG. 8D) is formed in the distal end of base member 705, adjacent opening 719d, for a rotatable housing of the drive screw of pusher assembly 715.

Preferably, openings 719 have at least a first diameter and depth 813a and a second diameter and depth 813b (FIG. 8E). Preferably, at least two openings 719 have a third diameter and depth 813c. The diameter and depths of the openings 719 are formed or cut to accommodate conventional fasteners, such as a ¼ inch hex-bolt, as well as the retractable dowel pin and bushing and stud assemblies described herein.

Preferably, base member 705 includes openings 819j for retaining stop member pins. In a preferred embodiment, openings 819j are threaded pairs of openings; however, smooth openings may also be used together with pins having a ball detent or other releasable retention means to secure shoulder stop member 718 to base member 705 in a manner that allows for adjusting shoulder stop member 718 relative to top surface 817, bottom surface 821, rear surface 831, and/or front surface 833 of base member 705.

Figure 9:
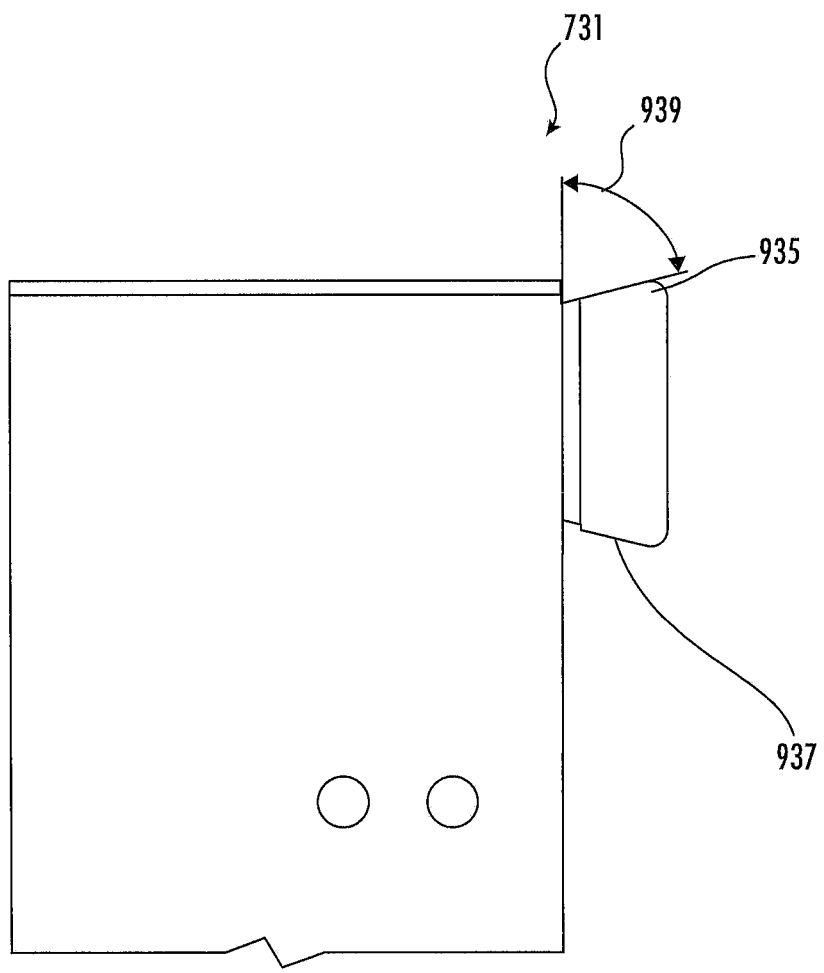
FIG. 9 is an exploded end view of an adjustable vise member in accordance with a preferred embodiment of the present application.

Referring now also to FIG. 9 in the drawings, an exploded view of the distal end 731 of adjustable vise 701 is illustrated. Distal end 731 of adjustable vise 701 includes two dovetail ledges, enabling adjustable vise 701 to act as both a modular adjustable vise and a modular fixed vise. First dovetail ledge 935 is disposed along a top, distal edge of adjustable vise 701 in a plane that is collinear with the pressure application surfaces of the pusher and gripper. Second dovetail ledge 937 is disposed along a top, forward or proximal facing edge of adjustable vise 701 such that ledge 937 opposes a surface of the pusher (FIG. 11 below) for retaining a part between the opposing surfaces. An angle 939 of the dovetail ledge is about a 65° to 85° angle. A second adjustable vise, having the same features as adjustable vise 701, is positioned behind or in front of adjustable vise 701, where a dovetail surface of a pusher of the second adjustable vise may be used for retaining a part between it and dovetail ledge 935 or a dovetail ledge of another gripper (not shown) that replaces gripper 709 (below). The location of dovetail ledge 935, and the drive screw being rotatable from either end of the vise, enables gripping and securing machineable parts of any dimension and/or orientation. It is noted that machineable parts often have a dovetail formed in the base of the part to further ensure a secure retention of the part during machining.

Preferably, distal ledge 935 of the adjustable vise is a dovetail ledge, as depicted. Due to the arrangement of dovetail distal ledge 935, the vise may be tightened on a part in a first proximal direction, securing a part between the pusher of vise and a dovetail ledge of a second adjustable vise. The arrangement further enables tightening the vise to a part in a second distal direction, securing a second part between the pusher and a proximal ledge 937 of the adjustable vise. Although distal ledge 935 and proximal ledge 937 are preferably dovetail ledges, alternatively distal ledge 935 and/or proximal ledge 937 is/are straight, grooved, serrated, or combinations thereof.

Referring now also to FIGS. 10A-10B in the drawings, keeper assembly 725 is illustrated. Keeper assembly 725 includes an access opening 1019c for accessing and rotating the drive screw of the pusher assembly 715 and a plurality of torque openings 1019a for receiving a torque application tool, such as a wrench, a head of torque-limiting pneumatic tool, or a similar device. Keeper assembly 725 further includes a threaded surface 1009 and a keeper inset 1025, such as a smooth bushing or Delrin® Washer. Preferably, keeper inset 1025 is cooled to the temperature of liquid nitrogen, placed into the corresponding opening in keeper assembly 725, and allowed to equilibrate its temperature so as to keep the inset within the keeper assembly. Alternatively, keeper inset 1025 is adhered, welded, brazed, or otherwise rigidly attached to a counter bore formed in an interior distal end of keeper assembly 725. In at least one embodiment, the inset is dimensioned to house a rounded cap end of the drive screw of the pusher assembly 715. A front surface 1033 of keeper assembly 725 is flush with a surface at a proximal end 733 of adjustable vise 701. It is important to note that the fastening devices discussed below (e.g., FIGS. 12D-18D) have openings similar to torque openings 1019a. The openings in the fastening devices discussed below are preferably configured to receive pins with a hex opening for securing components of the fastening devices within the respective housings. Alternatively, the openings in the fastening devices are configured to receive a torque application tool to secure a fastening device to a fixture plate.

Figure 11B:
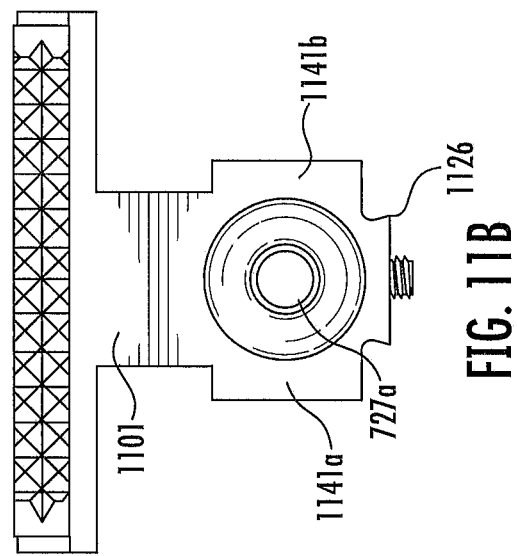
FIG. 11B is a front view of the pusher assembly in accordance with a preferred embodiment of the present application.
Figure 11A:
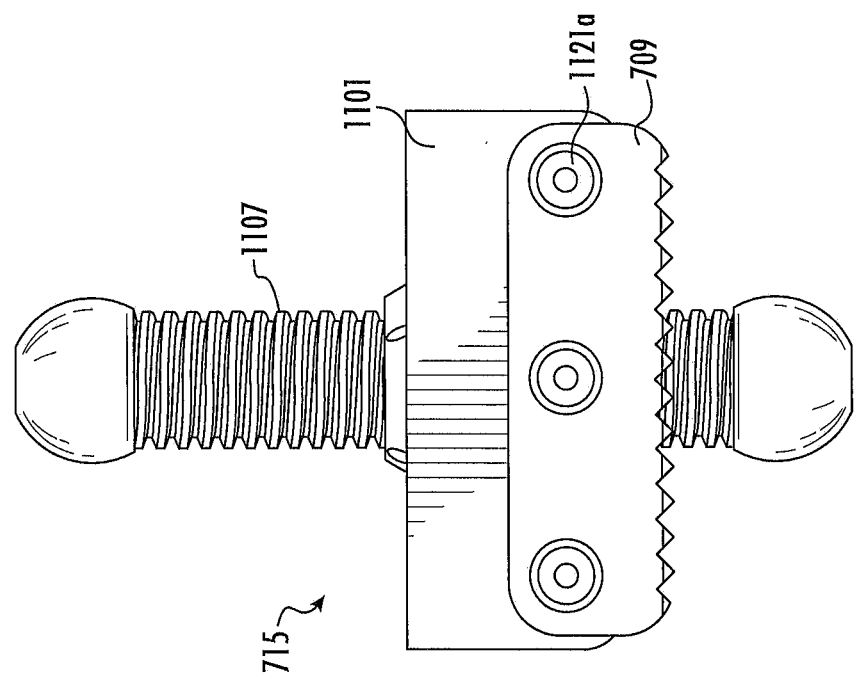
FIG. 11A is a top view of a pusher assembly in accordance with a preferred embodiment of the present application.
Figure 11C:
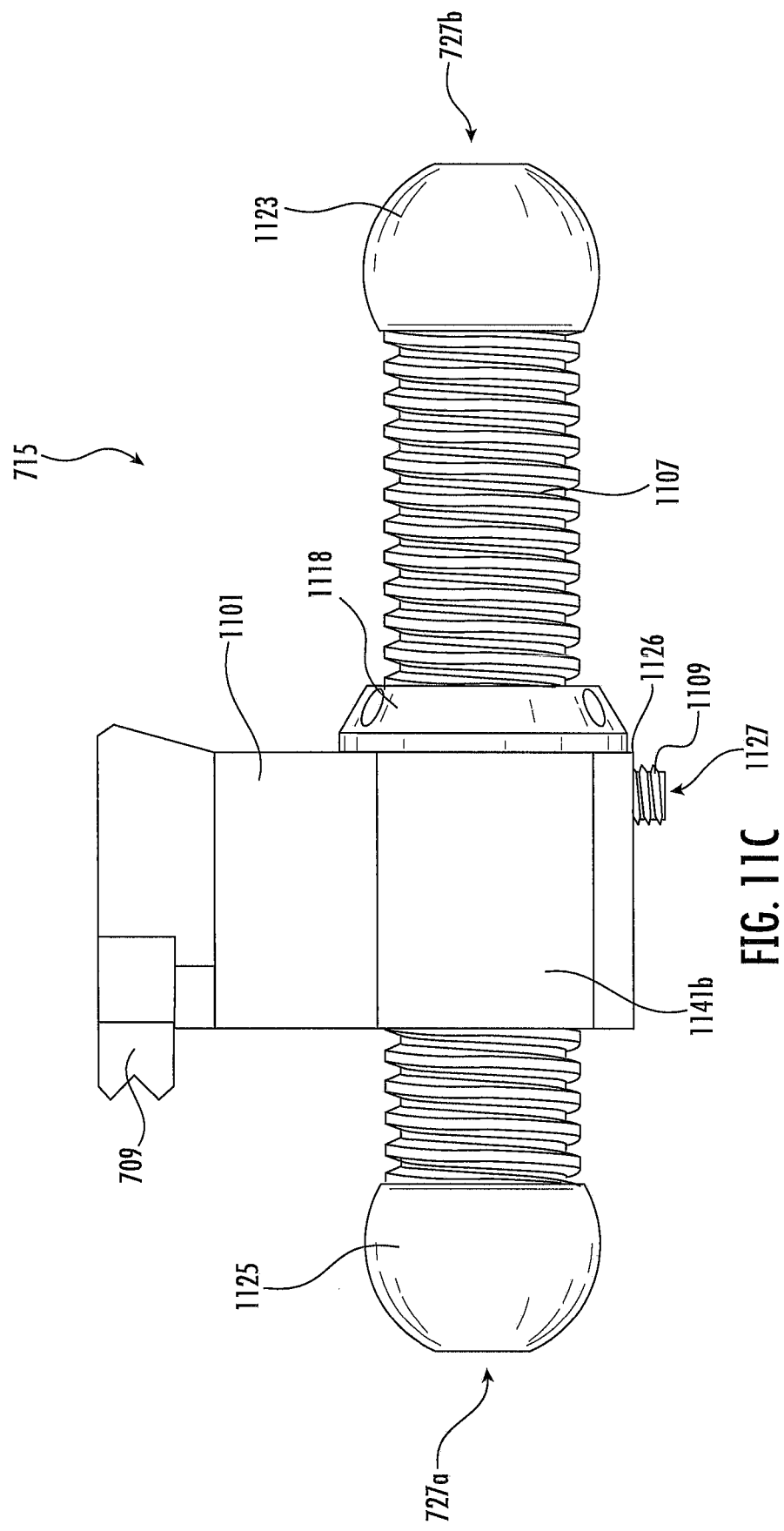
FIG. 11C is an end view of the pusher assembly in accordance with a preferred embodiment of the present application.

Referring now also to FIGS. 11A-11C in the drawings, pusher assembly 715 is illustrated. Pusher assembly 715 includes a t-shaped pusher body 1101, a drive screw 1107, gripper 709, attached to pusher 1101 by fasteners 1121a. Preferably, fasteners 1121a are socket head cap screws; however, flat or conventional screws are used in other embodiments. Pusher body 1101 is rotationally mounted to drive screw 1107 using the adjustable anti-backlash nut 1118 and set screw 1109. Anti-backlash nut 1118 is attached adjacent a shoulder portion 1126 of the pusher body. Although it is not depicted, set screw 1109 includes a hex-key or another key formed in end 1127.

Preferably, the distal end of drive screw 1107 rotationally contacts the rounded opening 819d of base member 705 using a ¼-inch ball cup 1123. The proximal end of drive screw 1107 also includes a ¼-inch ball cup 1125 to rotationally contact bushing inset 1025 of keeper assembly 725. Ball cups 1123 and 1125 are secured to either end of the drive screw by temperature differentials due to the use of liquid nitrogen, or another cryogenic fluid. Alternatively, they are secured by way of welding, brazing, adhesive, bolt and washer, or combinations thereof. Alternatively, instead of the round to flat surface minimal contact provided by ball cup and bushing of the keeper assembly, other rotational attachments may also be used such as a Delrin® washer, ball end, ball bearings, a rotational flange joint, a bearing flange joint, or combinations thereof.

Pusher 1101 is rotationally coupled to drive screw 1107 so that a keyed-end 727 of the drive screw is rotated by the user, enabling pusher 1101 to move along an axis defined by t-slot 717 of base member 705. Pusher 1101 includes tabs or tangs 1141a, 1141b to retain pusher in t-slot 717. Drive screw 1107 typically is rotated by insertion of a hex key in either end 727 of drive screw 1107 and turning the hex key. Gripper 709 is held to pusher 1101 by threaded fasteners 1121, such that gripper 709 is replaceable and/or interchangeable with a gripper having a different smooth edge, grooved edge, serrated edge, or dovetail ledge. Gripper 709 and dovetail ledges 935 and 937 are the preferred locations on adjustable vise 701 to secure the part retained. Drive screw 1107 is preferably positioned within the base of adjustable vise 701 parallel to a level surface of the vise. Alternatively, drive screw 1107 is positioned at a slight angle (e.g., 1°, 2°, 3°, or more depending on the intended use and the work object being held).

Referring now to FIGS. 12A-18D a fastening device 1801 (assembled in FIGS. 18A-18D) used to releasably fasten a first object and a second object is depicted. The fastening device is preferably housed within a fixture plate, such as a t-slot fixture plate, to releasably secure a stud incorporated into the housing, such that upon placing a vise or another object adjacent fastening device 1801, the stud is released, such as with a quarter turn of the stud to release the device tangs so that the stud may be rotated to secure the object to the fixture plate.

Figure 12A:
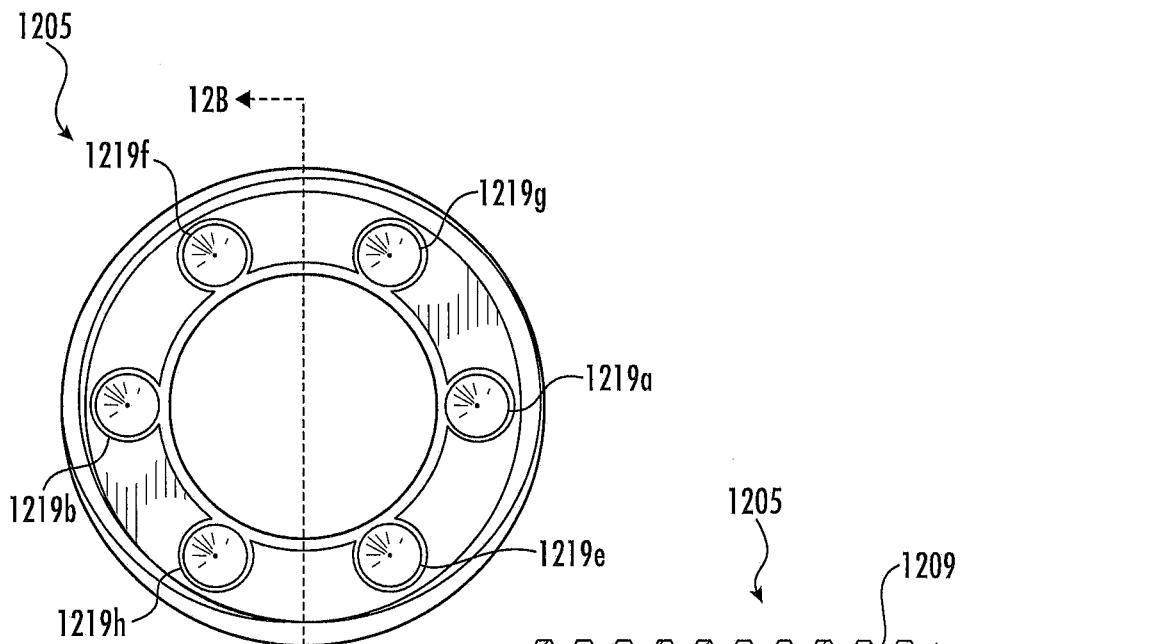
Figure 12B:
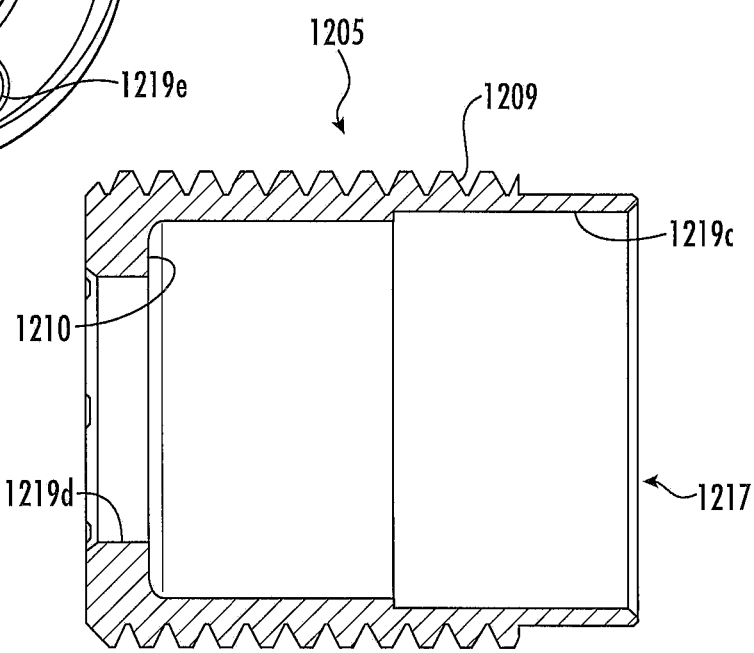
FIG. 12B is a section view of the housing of the fastening device taken along Line 12B-12B in accordance with the present application.

Referring now to FIGS. 12A-12B, a housing 1205 of fastening device 1801 includes holes 1219 in the face of the housing, which are used to screw or drive housing 1205 into the first object. Although drive holes 1219a, 1219b, 1219e, 1219f, 1219g, and 1219h are the preferred embodiment, there are other options available for installing housing 1205, including but not limited to keyed formations used together with a keyed torque tool, protruding socket heads used together with a pneumatic socket tool, differing numbers and arrangement of holes, and combinations thereof. Housing openings 1219c and 1219d form a through-hole in the housing, allowing for a keyed torque tool to access the ends of a stud placed therein, as further discussed below.

Figure 12C:
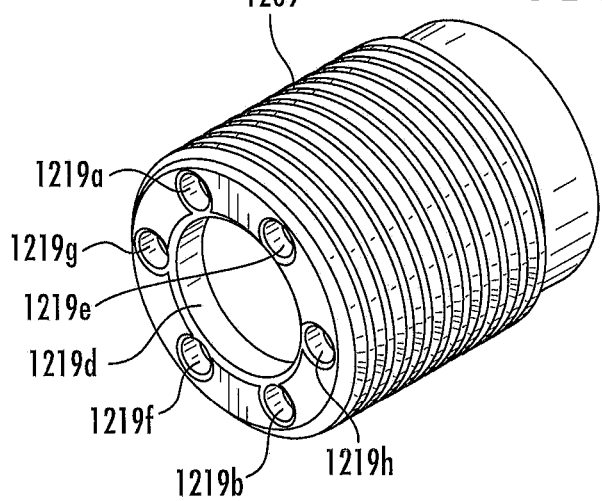
FIG. 12C is a trimetric view of the housing of the fastening device in accordance with the present application.

Referring now to FIGS. 12B and 12C, housing 1205 includes outer threads 1209, an inner compartment 1217, and a shoulder 1210. Shoulder 1210 may be formed as a ledge, a ridge, or a similar stopping feature. Outer threads 1209 mate with a fixture plate, another vise, or another locating surface. Preferably, threads 1209 fit together with the threads of a fixture plate. Inner compartment 1217 houses the stud, spring, and release inset (FIGS. 13A-16C) of fastening device 1801. Shoulder 1210 captures an inset (FIGS. 14A-14C) of fastening device 1801. The inset interacts with the stud and stops it or prevents it from exiting housing 1205 when engaged.

Figure 13A:
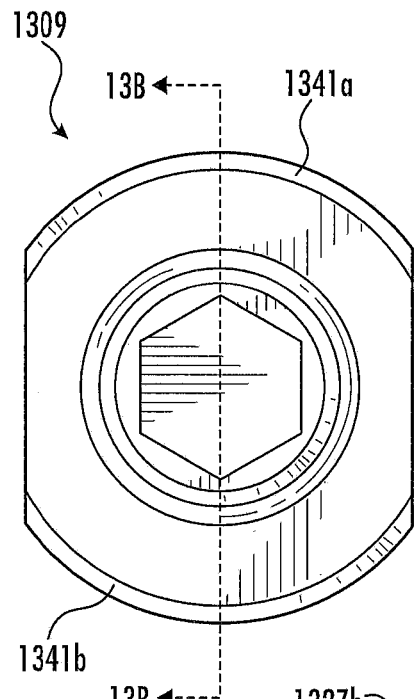
FIG. 13A is a top view of a stud of the fastening device in accordance with the present application.
Figure 13B:
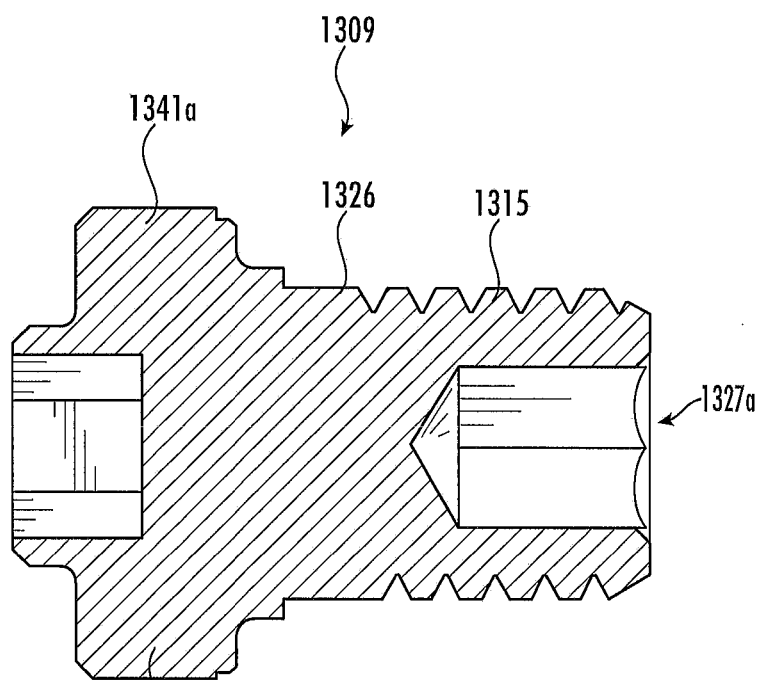
FIG. 13B is a section view of the stud of the fastening device taken along Line 13B-13B in accordance with the present application.
Figure 13C:
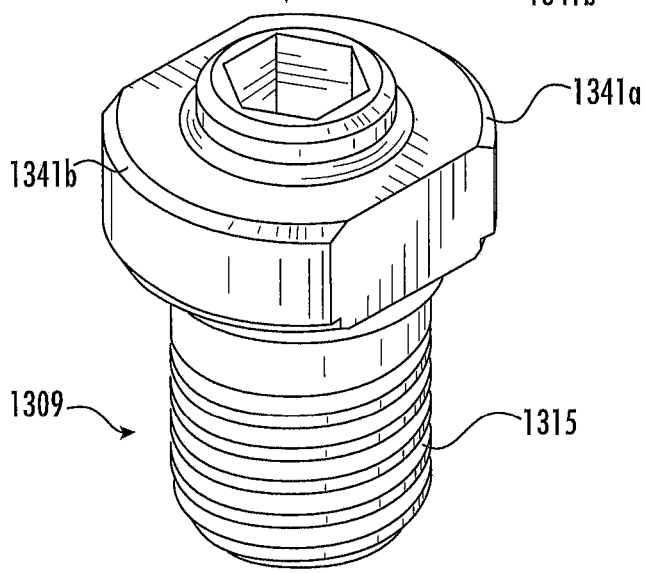
FIG. 13C is a trimetric view of the stud of the fastening device in accordance with the present application.

Referring now to FIGS. 13A-13C, a stud 1309 for interfacing with fastening device 1205 is depicted. Stud 1309 includes a unitary body, retaining threads 1315, shoulder 1326, hex-key ends 1327a, 1327b, and shoulder tangs 1341a and 1341b. Although the hex shown is a preferred embodiment, there are other methods available to drive it. Also, the hex can be incorporated in one end, both ends, or the other end.

Referring now to FIG. 13B in the drawings, a section view of stud 1309 is depicted. The section view shows tangs 1341a and 1341b that engage/dis-engage the release inset 1723 (FIGS. 17A-17C) as well as shoulder 1710 which is stopped by housing shoulder 1210. Retaining threads 1315 are used to fasten the second object. Although the threads are the preferred embodiment, there are other methods by which the stud can engage/hold the second object, including but not limited to, tangs, rotational lock tabs, detents, and other similar methods.

Referring now to FIGS. 14A-14D in the drawings, capture inset 1425 is depicted in various views. Tangs 1441a, 1441b engage tangs 1341 of stud 1309 and also release the stud, based upon the stud's position. A plurality of holes 1419a, 1419b, 1419e, 1419f, 1419g, 1419h, 1419i, and 1419j in the base of capture inset 1425 facilitate the flow of liquids/debris through the fastening device.

Figure 14A:
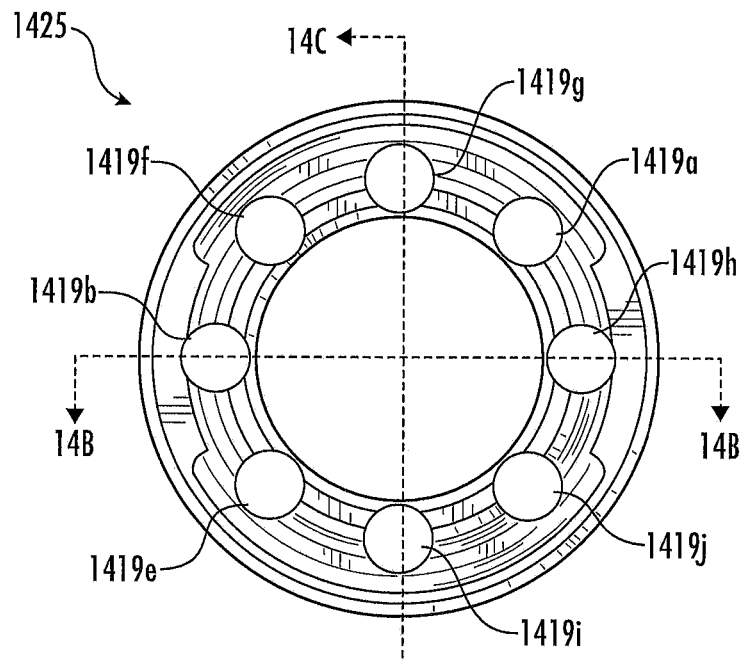
FIG. 14A is a top view of a capture inset of the fastening device in accordance with the present application.
Figure 14B:
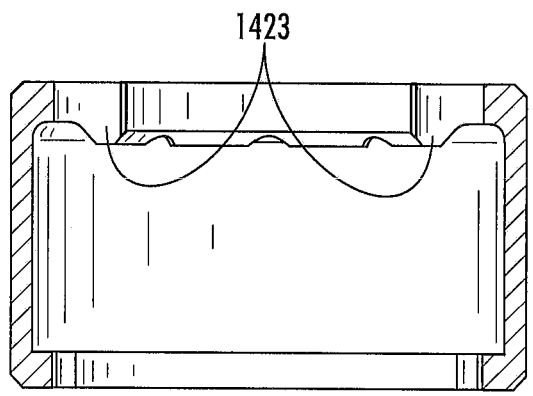
FIG. 14B is a section view of the capture inset of the fastening device taken along Line 14B-14B in accordance with the present application.
Figure 14C:
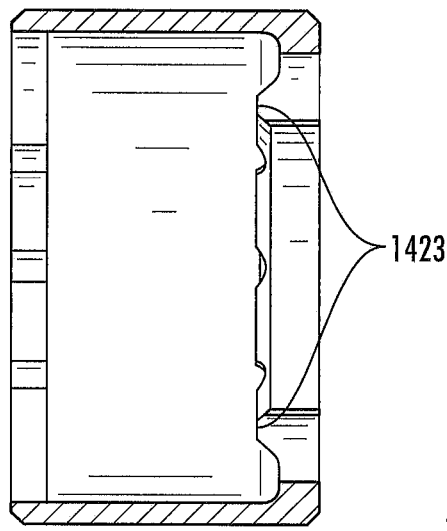
FIG. 14C is a section view of the capture inset of the fastening device taken along Line 14C-14C in accordance with the present application.
Figure 14D:
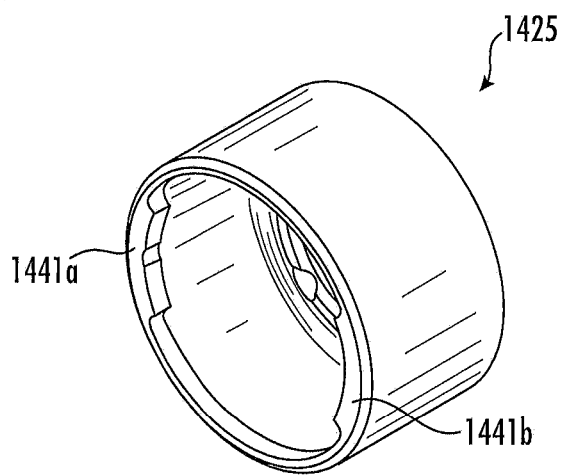
FIG. 14D is a trimetric view of the capture inset in accordance with the present application.
Figure 16A:
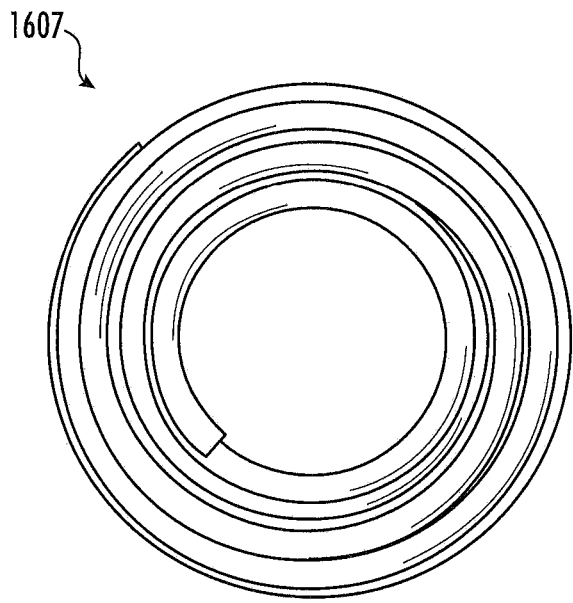
FIG. 16A is a top view of a spring of the fastening device in accordance with the present application.
Figure 16B:
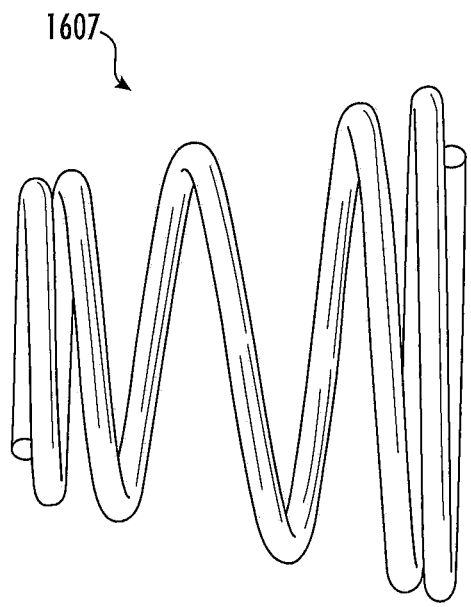
FIG. 16B is an end view of the spring of the fastening device in accordance with the present application.
Figure 16C:
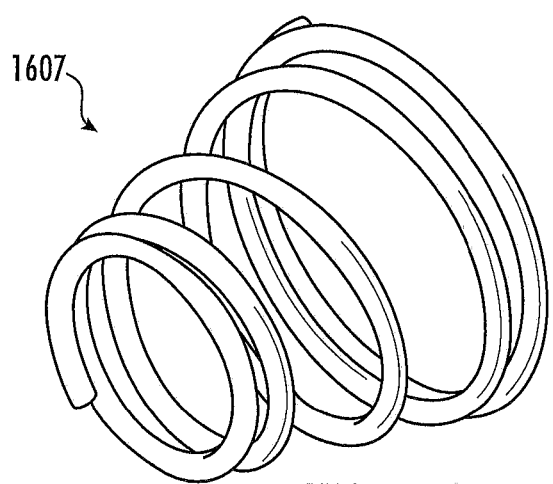
FIG. 16C is a trimetric view of the spring of the fastening device in accordance with the present application.

Referring now to FIGS. 14B and 14C in the drawings, the capture inset is depicted in section view. The capture inset includes a raised area 1423 that captures spring 1607 (FIGS. 16A-16C). Although preferred, raised area 1423 is optional. Although the walls and floor of the capture inset 1425 are shown as thin, they can be any width that facilitates the function of the fastening device.

In at least one embodiment, capture inset 1425 is installed in the housing after having reached cryogenic temperatures, such as for example, by being placed in liquid nitrogen. The expansion of the capture inset, after equilibrating, within the housing enables the capture inset to remain in place without fasteners. Alternatively, a weld, a pin, an adhesive, or other fastening means is used to retain capture inset 1425 within the housing.

Figure 15A:
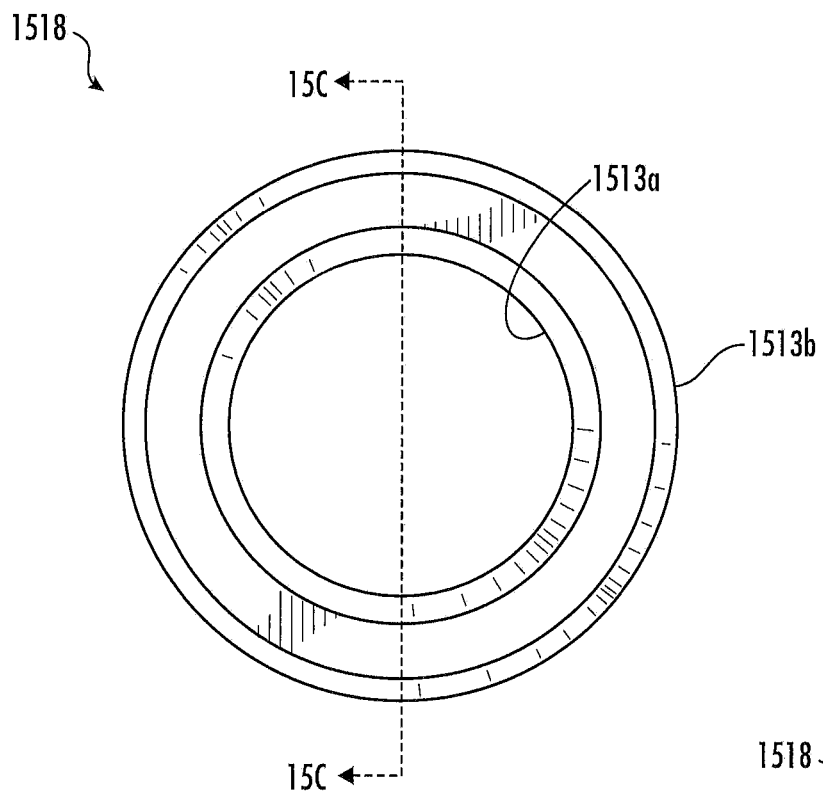
FIG. 15A is a top view of a wiper of the fastening device in accordance with the present application.
Figure 15B:
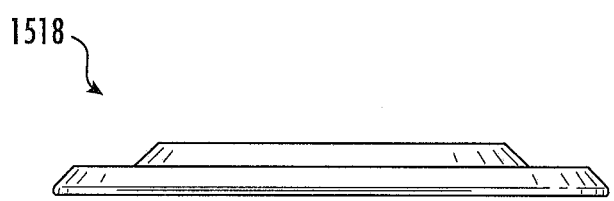
FIG. 15B is an end view of the wiper in accordance with the present application.
Figure 15C:
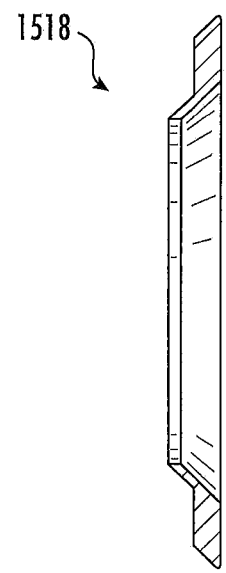
FIG. 15C is a section view of the wiper of the fastening device taken along Line 15C-15C in accordance with the present application.

Referring now to FIG. 15A a wiper 1518 is depicted in top view. Wiper 1518 is a rigid or semi-rigid device, made of metal or durable plastic, which works to prevent debris entering into the fastening device. In a first position, an inner diameter 1513a of wiper 1518 is adjacent a surface of shoulder 1326 of stud 1309. In one or more second positions, such as when the stud is adjusted, inner diameter 1513a of wiper 1518 almost touches threads 1315 of stud 1309, acting as a device that wipes the stud. The outer diameter 1513b of the wiper fits the inner diameter of the housing. Wiper 1518 is held in place by release inset 1723. The use of the wiper is a preferred embodiment, alternatively, the wiper is optionally omitted from use in the fastening device.

Referring now to FIGS. 16A-16C, various views of spring 1607 are depicted. Spring 1607 is the preferred embodiment since it compresses to an almost flat condition, and is used to bias stud 1309 up and out of the housing. Other spring configurations can also be used, depending upon the configuration of capture inset 1425, housing 1205, and stud 1309.

Figure 17A:
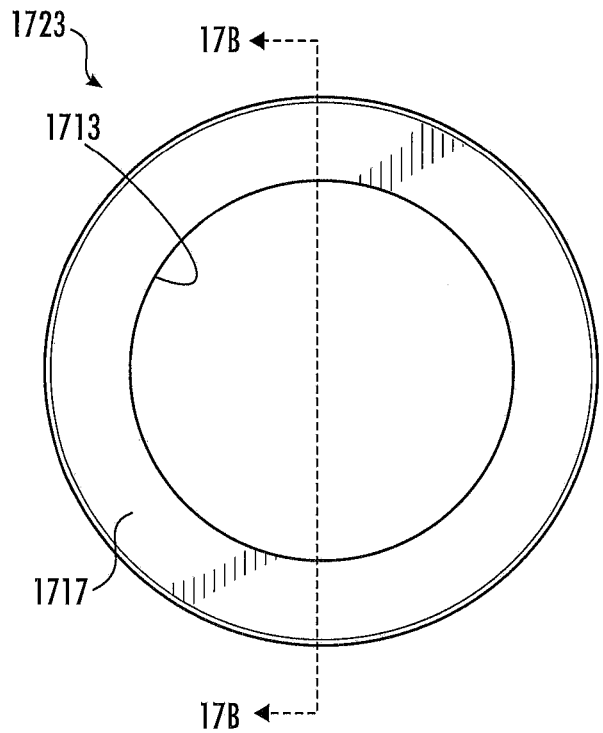
FIG. 17A is a top view of a release inset of the fastening device in accordance with the present application.
Figure 17B:
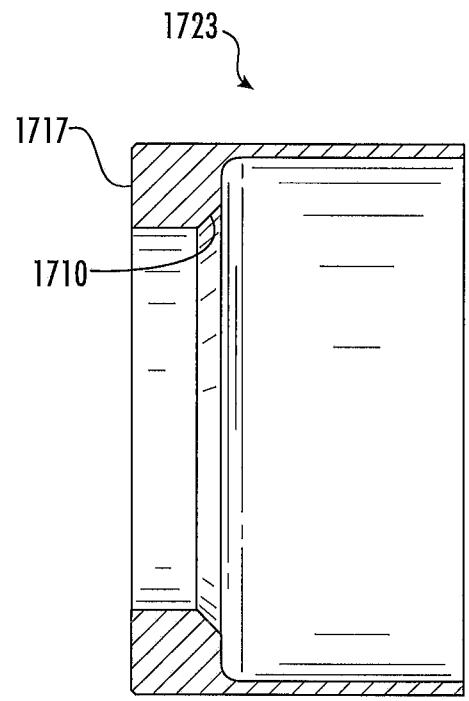
FIG. 17B is a section view of the release inset of the fastening device taken along Line 17B-17B in accordance with the present application.
Figure 17C:
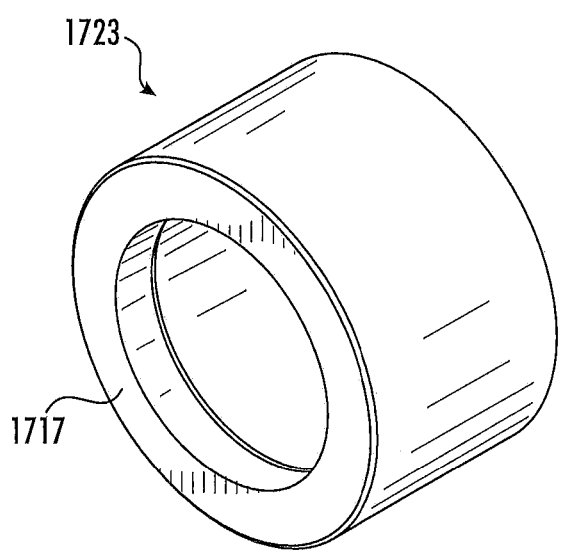
FIG. 17C is a trimetric view of the release inset of the fastening device in accordance with the present application.

Referring now to FIGS. 17A-17C, release inset 1723 is depicted in various views. Release inset 1723 includes shoulder 1710 to interface with surfaces of tangs 1341 of stud 1309. A portion of the inside diameter 1713 of release inset 1723 serves as the shoulder that prevents stud 1309 from exiting housing 1205. The top face 1717 of release inset 1723 presses against wiper 1518, holding it in place.

Figure 18A:
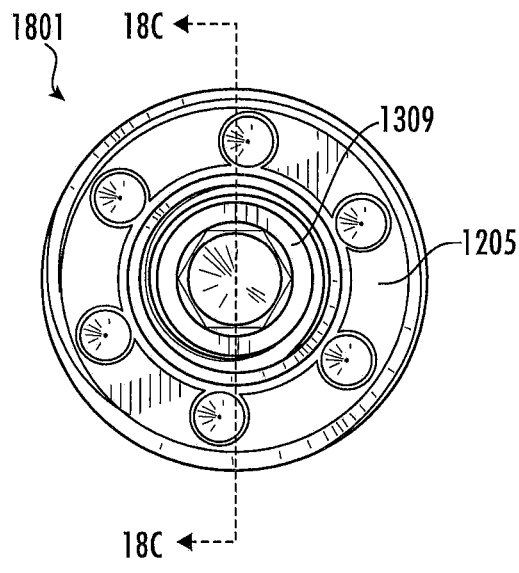
FIG. 18A is a top view of the assembled fastening device of FIGS. 12A-17C.
Figure 18B:
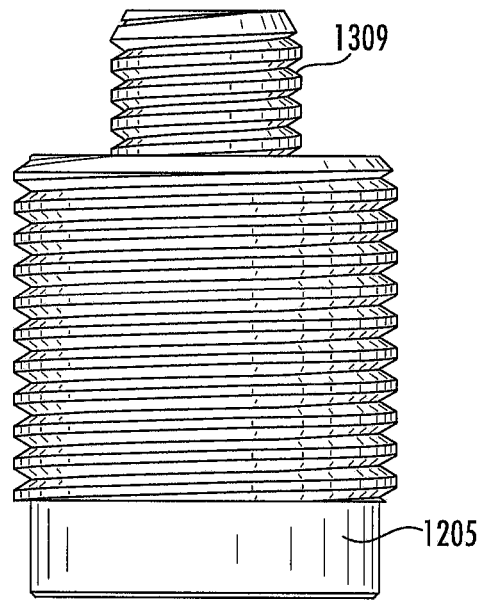
FIG. 18B is an end view of the assembled fastening device of FIGS. 12A-17C.
Figure 18C:
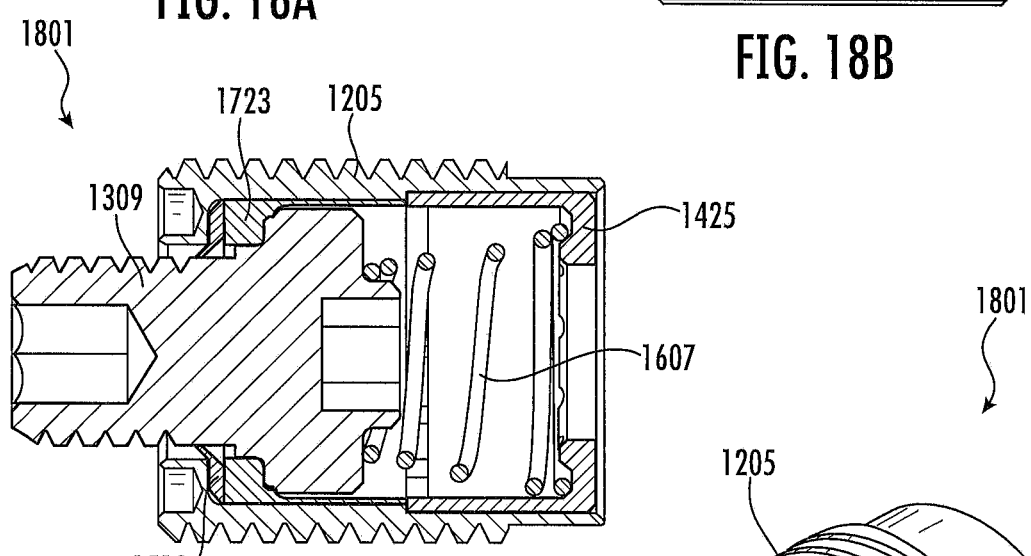
FIG. 18C is a section view of the assembled fastening device of FIGS. 12A-17C taken along Line 18C-18C.
Figure 18D:
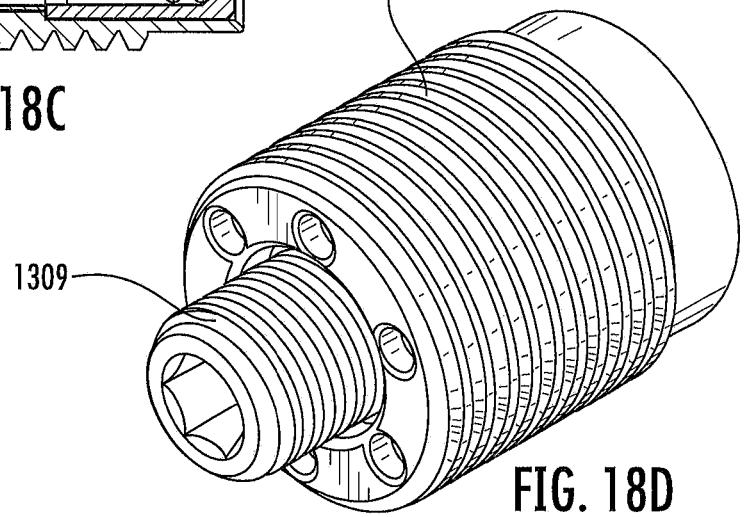

Referring now to FIGS. 18A-18D in the drawings, various views of assembled fastening device 1801 are depicted. In FIG. 18C, housing 1205 is connected to, having a portion thereof adjacent respectively to, each of wiper 1518, capture inset 1425, and release inset 1723. Spring 1607 is adjacent each of stud 1309 and capture inset 1425.

Figure 19A:
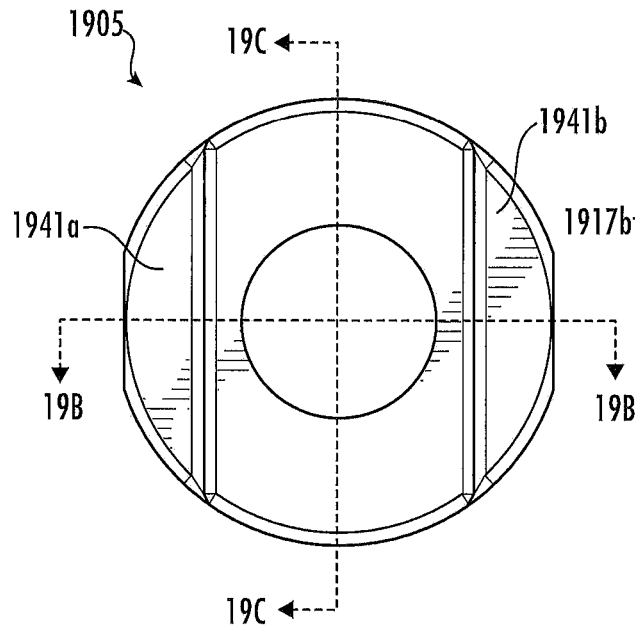
Figure 19B:
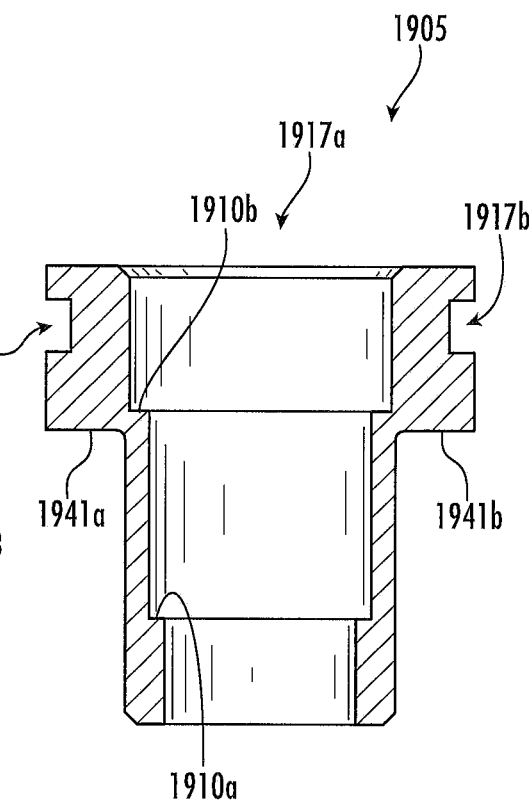
FIG. 19B is a section view of the housing of an alternative fastening device taken along Line 19B-19B in accordance with the present application.
Figure 19C:
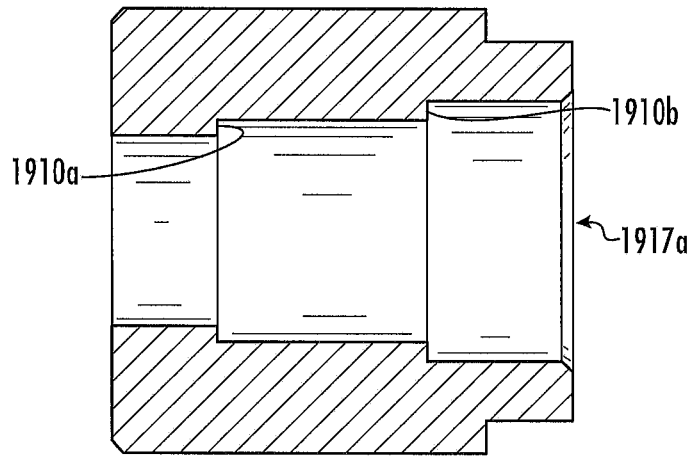
FIG. 19C is a section view of the housing of an alternative fastening device taken along Line 19C-19C in accordance with the present application.
Figure 19D:
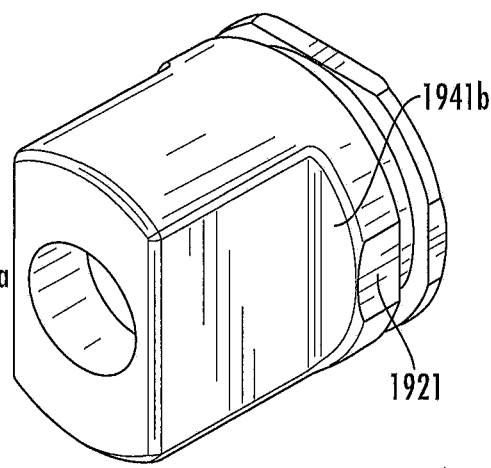
FIG. 19D is a trimetric view of the housing of an alternative fastening device in accordance with the present application.

Referring now to FIGS. 19A-19C, housing 1905 includes an inner compartment 1917a, a first shoulder 1910a, and a second shoulder 1910b. Housing 1905 is a component of another embodiment of a fastening device 2401 (assembled in FIGS. 24A-24D). Fastening device 2401 is an embodiment of a T-Slot fastener, having components described by FIGS. 19A-24D. Preferably, housing 1905 does not include outer threads. Rather, housing 1905 includes tabs or tangs 1941a and 1941b, providing fastening device 2401 with an ability to be used together with a first object comprising a T-slot and a second object comprising a vise. For example, tabs 1941a and 1941b mate with a T-slot in a fixture plate, in another vise, or in another locating surface. Housing 1905 is similar to housing 1205, in that it includes inner compartment 1917a that houses the stud, spring, and capture inset (FIGS. 20A-23C) of fastening device 2401. However, housing 1905 additionally includes a grooved slot 1917b for receiving an O-ring. Shoulder 1910a captures tabs or tangs of a stud (FIGS. 20A-20C), while shoulder 1910b captures a capture inset (FIGS. 21A-21D) of fastening device 2401. The inset interacts with the spring and an end of the stud, thereby preventing the spring and dowel pin from exiting housing 1905 in at least one positon assumed by the stud.

Preferably, housing 1905 includes one or more flats 1921. Flat(s) 1921 are adjacent, or mate with, sides of a T-slot. Flats 1921 also aid in removing the O-ring from the housing.

Preferably, housing 1905 incorporates a circular outside diameter. Alternatively, other shapes, such as rectangular or square shapes, may be used. The housing sectional shape (FIG. 19B) conforms, male to female, to the shape of the T-slot.

Figure 20A:
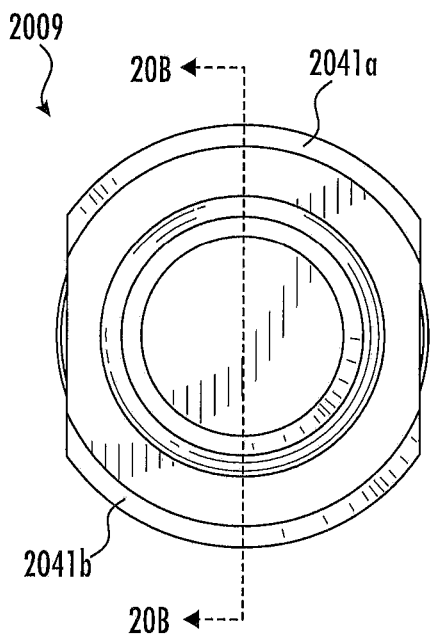
FIG. 20A is a top view of a stud of an alternative fastening device in accordance with the present application.
Figure 20B:
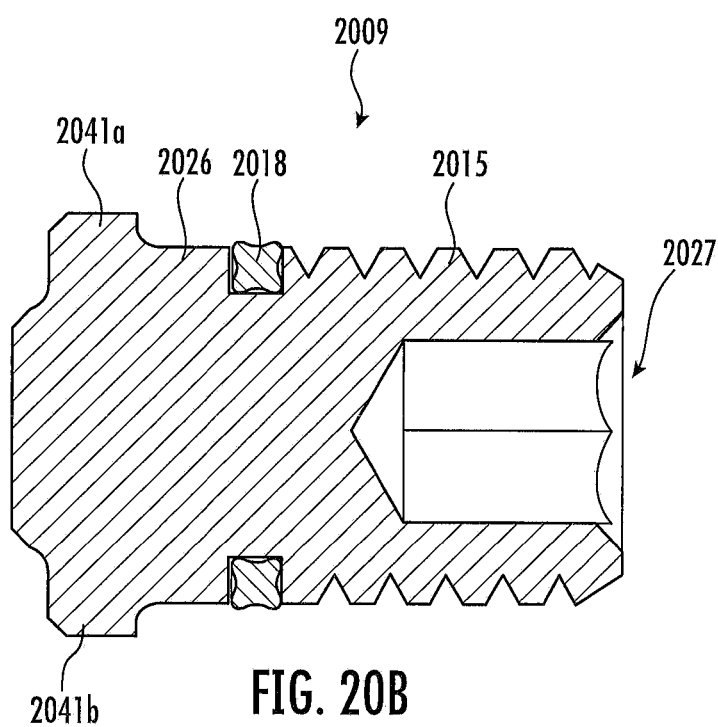
FIG. 20B is a section view of the stud of an alternative fastening device taken along Line 20B-20B in accordance with the present application.
Figure 20C:
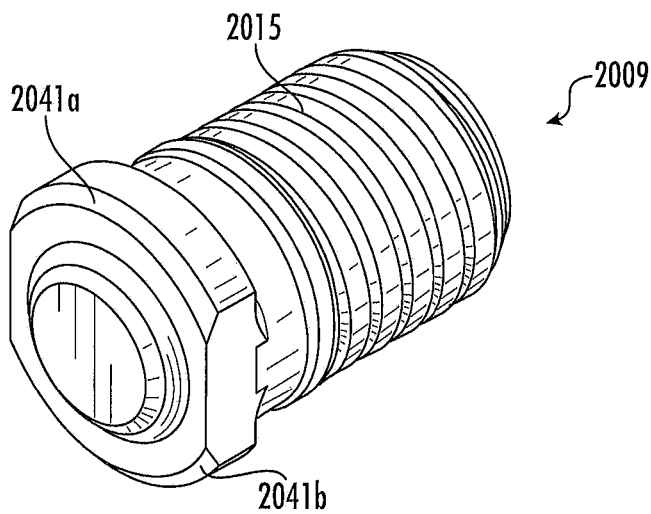
FIG. 20C is a trimetric view of the stud of an alternative fastening device in accordance with the present application.

Referring now to FIGS. 20A-20C, a stud 2009 that interacts with shoulder 1910a of housing 1905 is depicted. Stud 2009 includes a unitary body, retaining threads 2015, an O-ring 2018, a shoulder 2026, hex-key end 2027, and shoulder tabs or tangs 2041a and 2041b. Although the hex-key shown is a preferred embodiment, there are other methods available to drive it, including Philips-key, a five-point-key, a ten-point-key, and others. Also, the hex can be incorporated in one end, both ends, or the other end.

Referring now to FIG. 20B in the drawings, a section view of stud 2009 is depicted. The section view shows tangs 2041a and 2041b that engage/dis-engage the capture inset 2025 (FIGS. 21A-21D). Retaining threads 2015 are used to fasten the second object, such as a vise. Although threads 2015 are the preferred embodiment, there are other methods by which the stud can engage/hold the second object, including but not limited to, tangs, rotational lock tabs, detents, and other similar methods. It can also be observed in this view that there is a square O-ring 2007 that is used to prevent debris from entering housing 1905. The shape of O-ring 2007 and its very usage are preferred embodiments but can be optional or different.

Referring now to FIGS. 21A-21D in the drawings, capture inset 2025 is depicted in various views. Tangs 2141a, 2141b engage tangs 2041 of stud 2009 and also release the stud, based upon the stud's position. A plurality of holes 2119a, 2119b, 2119e, 2119f, 2119g, 2119h, 2119i, and 2119j in the base of capture inset 2025 facilitate the flow of liquids/debris through the fastening device.

Figure 23A:
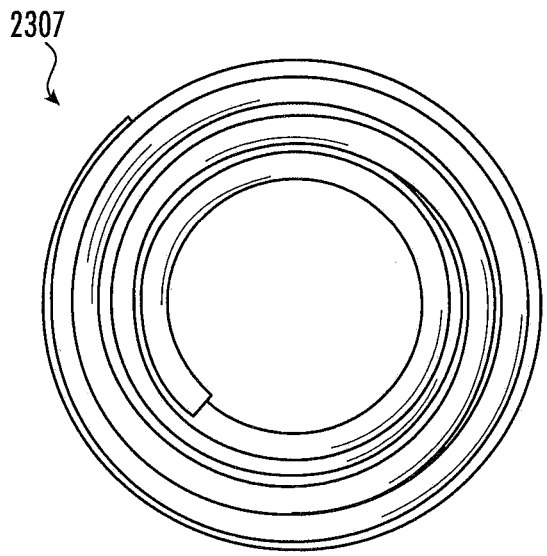
FIG. 23A is a top view of a spring of an alternative fastening device in accordance with the present application.
Figure 23B:
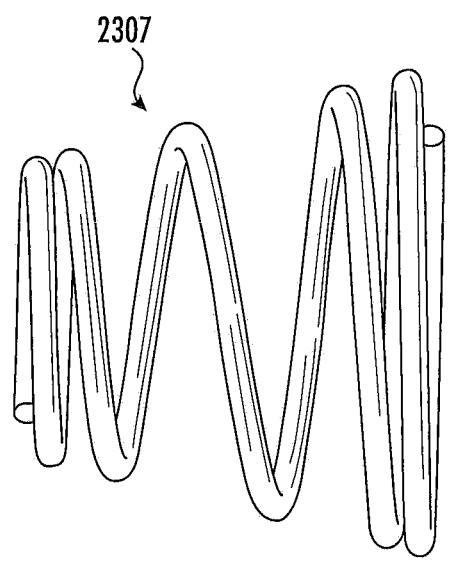
FIG. 23B is an end view the spring of an alternative fastening device in accordance with the present application.
Figure 23C:
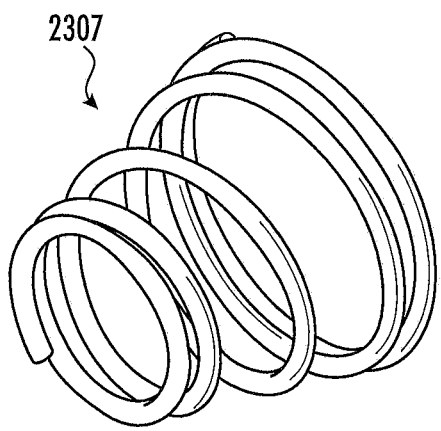
FIG. 23C is a trimetric view the spring of an alternative fastening device in accordance with the present application.

Referring now to FIGS. 21B and 21C in the drawings, the capture inset is depicted in section views. A raised area 2123 is depicted that captures the spring 2307 (FIGS. 23A-23C). Although preferred, raised area 2123 is optional. Although the walls and floor of the capture inset 2025 are shown as thin, they can be any width that facilitates the function of the fastening device. Shoulder 2125 of the capture inset engages shoulder 1910b of housing 1905.

Figure 22A:
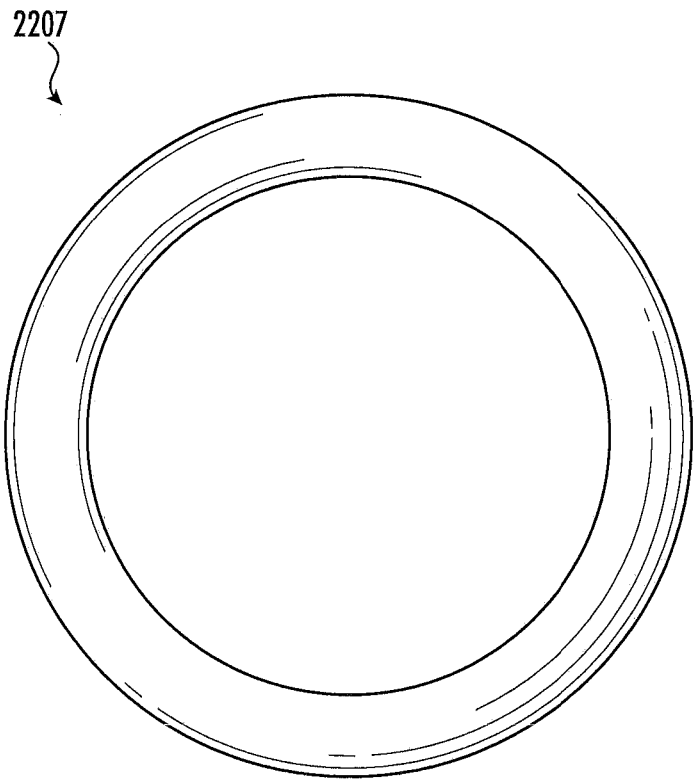
FIG. 22A is a top view of an O-ring of an alternative fastening device in accordance with the present application.
Figure 22B:
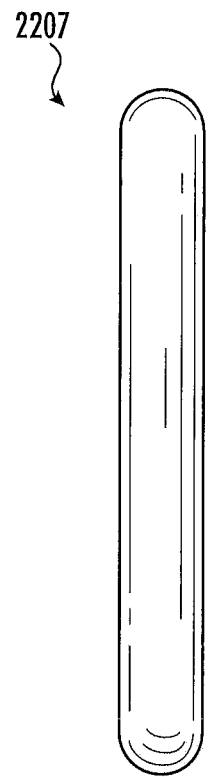
FIG. 22B is an end view of the O-ring of an alternative fastening device in accordance with the present application.
Figure 22C:
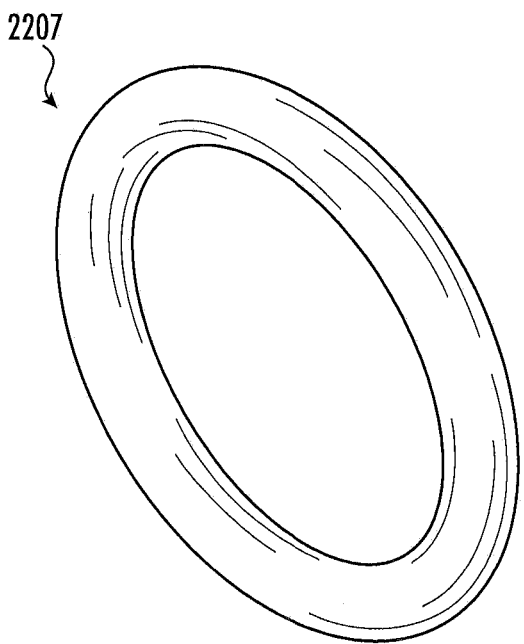
FIG. 22C is a trimetric view of the O-ring of an alternative fastening device in accordance with the present application.

Referring now to FIGS. 22A-22C in the drawings, various views of an O-ring 2207 are depicted. O-ring 2207 is a flexible or semi-flexible device, made of an elastomer or a material having regular or irregularly shaped coils, which are coiled to spring back into position after receiving a biasing force. O-ring 2207 works to dampen the sliding effect into and out of a T-slot, and may also work to prevent debris entering into the T-slot. O-ring 2207 is held within grooved receiving slot 1917b on housing 1905. The O-ring is also used to create friction in the slot. There are specific features of the housing (flats or flat surfaces) that are incorporated to make the O-ring optional by removal. When the O-ring is removed, fastening device 2401 slides easily in the slot, which is a desirable characteristic, at times.

Referring now to FIGS. 23A-23C, various views of spring 2307 are depicted. Spring 2307 is the preferred embodiment since it compresses to an almost flat condition, and is used to bias stud 2009 up and out of the housing. Other spring configurations can also be used, depending upon the configuration of capture inset 2025, housing 1905, and stud 2009.

Figure 24A:
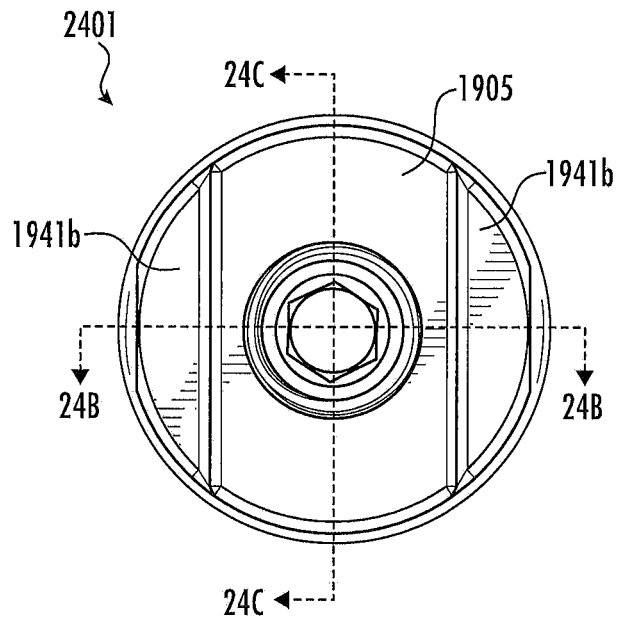
FIG. 24A is a top view of the assembled alternative fastening device of FIGS. 19A-23C.
Figure 24B:
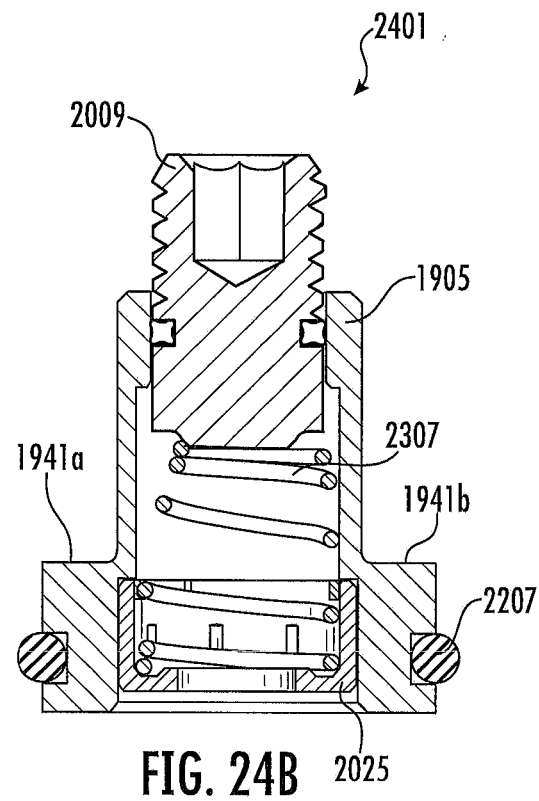
FIG. 24B is a section view of the assembled alternative fastening device of FIGS. 19A-23C taken along Line 24B-24B.
Figure 24C:
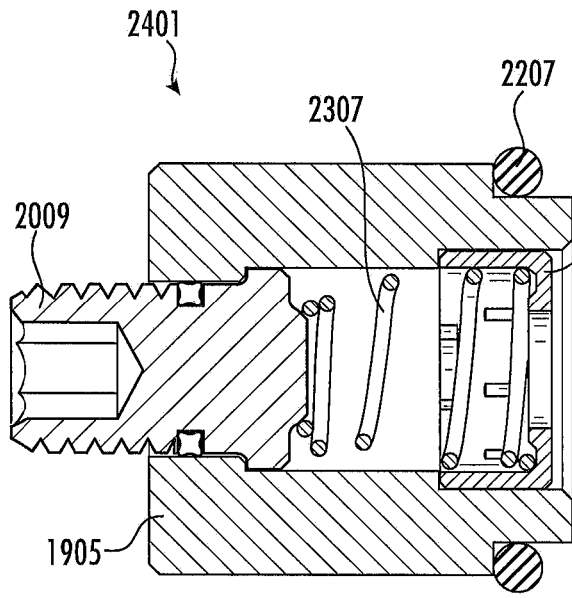
FIG. 24C is a section view of the assembled alternative fastening device of FIGS. 19A-23C taken along Line 24C-24C.
Figure 24D:
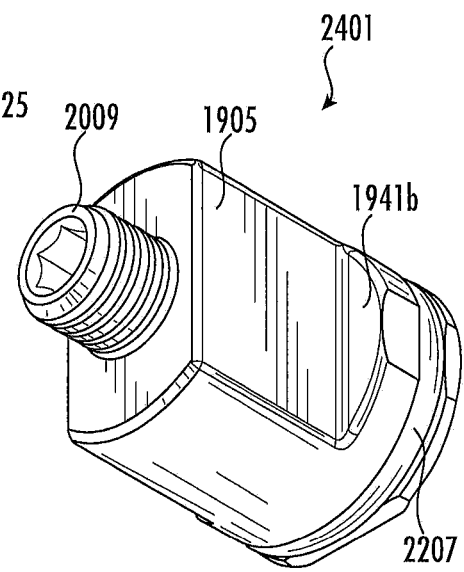

Referring now to FIGS. 24A-24D in the drawings, various views of assembled fastening device 2401 are depicted. In FIG. 24C, housing 1905 is connected to, having a portion thereof adjacent respectively to, each of O-ring 2207, capture inset 2025, and stud 2009. Spring 2307 is adjacent or connected to each of stud 2009 and capture inset 2025.

Referring now to FIGS. 24B and 24C in the drawings, section views of fastening device 2401 are depicted. Shoulders 2125 of the capture inset are adjacent shoulders 1910b of housing 1905, while tangs 2041 of stud 2009 are adjacent shoulders 1910a of the housing.

Referring now to FIGS. 25A-25E a T-Slot type fixture plate 2501 with specific, modular characteristics is depicted. Fixture 2501 is sized, dimensioned, and formed as a precision locating surface, which when used in combination with FIGS. 24A-24D type fasteners, FIGS. 32A-32D type locators, or other fasteners, can accurately and precisely locate as well as hold objects.

Referring now to FIG. 25C, modular T-Slot fixture 2501 is depicted in section view. In this view, it can be observed that the slots 2517 are at specific distances from each other forming a continuous pattern of slots. In the base of slot 2517a is a bored (precise) circular countersink 2519a that is manufactured such that it is identical, or at least precisely located, relative to every other hole 2519a in T-slot 2517a. Preferably, holes 2519b in riser 2523 are also precisely located relative to holes 2519a. Holes 2519b are adjacent to slot 2517a, meaning that they are formed in the next row that is adjacent slot 2517a in the grid-like pattern of fixture 2501. Riser 2523 helps form T-Slot 2517a.

T-Slot 2517a, when used in conjunction with, for example, a FIGS. 32A-32D locator, will precisely locate a second object (e.g., FIGS. 24A-24D) to the first object (FIGS. 32A-32D locator). Counter-bore hole 2519b, when used in conjunction with, for example, a FIGS. 18A-18D fastening device will precisely locate a second object (e.g., FIGS. 7A-7F) to the first object (FIGS. 18A-18D fastener).

Referring now to FIG. 25D, modular T-Slot fixture plate 2513 is depicted in section view. In this view, it can be observed that there are multi-purpose combination holes 2519c consisting of a precise-diameter bored, and/or counter-bored top portion 2513a plus threaded portion 2513b below the counter boar and below a surface of tab 2541a or 2541b. Preferably, both tabs 2541a and 2541b include the multi-purpose holes. Multi-purpose holes 2519c serve as a means to locate and hold first objects using screws, dowels, retractable dowels, shoulder screws, supports, and other means for locating and holding second objects. Preferably, holes 2519c are used together with bores 2513a and a retractable dowel pins, or similar inserts. Alternatively, the insert can be replaced or substituted with hardened inserts, such as precision threaded locator bushings, bushings, threaded inserts, helicoil inserts, screws, bolts and nuts, and other fasteners.

Referring now to FIG. 25E, modular T-Slot fixture plate 2513 is depicted in trimetric view. Any combination of holes 2519, including lower countersunk holes 2519a, raised slot portion holes 2519b, and upper multi-purpose holes 2519c can be used, with the consideration that they are all precisely located to each other and specific, precise distances apart, in a grid type pattern. In addition, there is a precisely dimensioned slot, such as slot 2517b having a precise width in the top of T-Slot riser 2523 that facilitates securing special-use, modular vises, that can benefit from the T-Slot modular fixture plate 2501. For example, vise 701 may be held by one or more T-slot fasteners, and located by one or more retractable dowel pins in the base of the vise, thereby being movably and accurately located with the precision slot features.

Figure 26A:
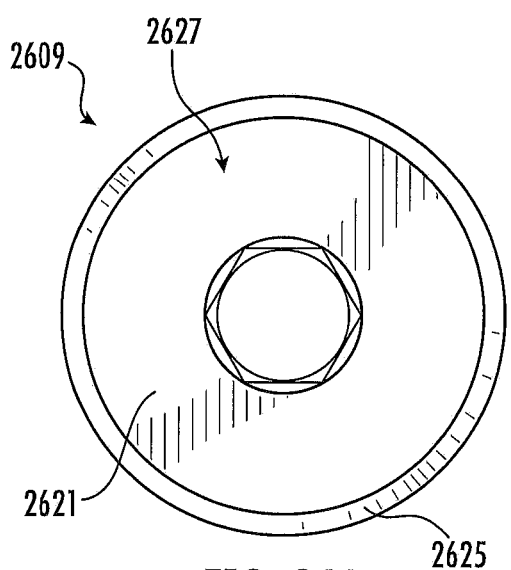

Referring now to FIGS. 26A-29D in the drawings, a novel locating/fastening device, or T-slot locator 2901, is depicted. Locator 2901 consists of a modified housing 2705 (FIGS. 27A-27D) in which the internal features are now adapted to accept at least one, but preferably two, retractable dowel pins (FIGS. 26A-26C).

Figure 26B:
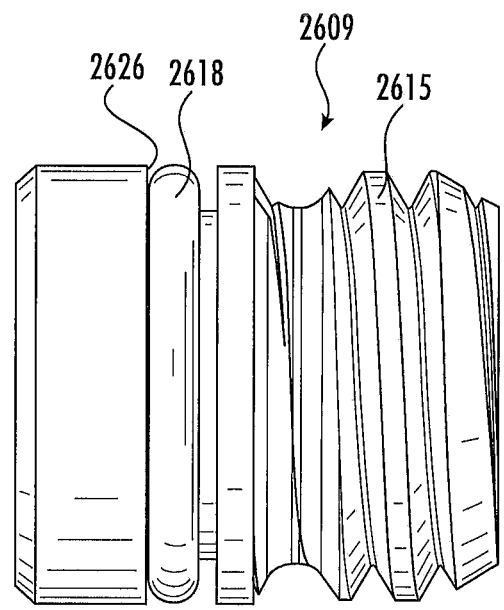
FIG. 26B is an end view of the dowel pin of an alternative fastening device in accordance with the present application.
Figure 26C:
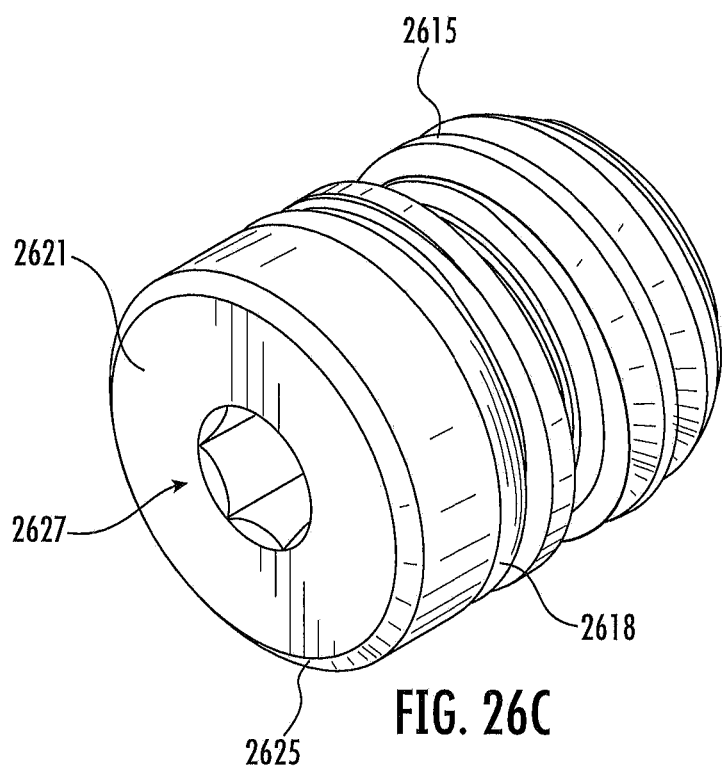
FIG. 26C is a trimetric view of the dowel pin of an alternative fastening device in accordance with the present application.

Referring now to FIGS. 26A-26C in the drawings, various views of a retractable dowel pin 2609 are depicted. Retractable dowel pin 2609 includes a unitary body, an O-ring 2618, a shoulder 2626, a keyed end 2627, and one or more threads 2615. Flat surfaces 2621 on a head of the dowel pin, such as on the top surface and around an outer perimeter of the head, are precision locating surfaces. A locating shoulder 2625 is formed by flat surfaces 2621. A drive feature, or keyed end 2627, is depicted as a hex but may include other types of keys, and may be located on either end, or both ends. The retractable dowel pin, when screwed into a multi-purpose hole, such as hole 2519c, provides exact location to a secondary object.

Referring now to FIGS. 27A-27D in the drawings, various views of housing 2705 for fastening device 2901 are depicted. Housing 2705 includes a first annular gripping ridge or surface 2710a, a second annular gripping ridge or surface 2710b, tabs or tangs 2741a, 2741b and O-ring 2707 for interfacing with a T-slot of a vise, fixture, plate, or another object with a T-slot. Preferably, housing 2705 incorporates flats 2721 to remove the O-ring 2707 or to precisely locate the housing in a T-slot. Alternatively, flats 2721 are excluded from housing 2705. Preferably, housing 2705 incorporates a circular outside diameter, but other shapes may be used and are encompassed herein.

Referring now to FIGS. 27B and 27C in the drawings, section views of the housing are depicted. Housing 2705 incorporates precise counterbores 2719a, 2719b in both ends of the housing, and a threaded portion 2715 between them. Counter-bores 2719 are coincident to each other such that the location of a lower retractable dowel pin is translated to, or aligned with, a top retractable dowel pin. The housing sectional shape, including tabs or tangs 2741, conforms (male to female) to the shape of the T-slot.

Referring now to FIGS. 28A-28C in the drawings, various views of an O-ring 2707 are depicted. Preferably, O-ring 2707 is used to create friction in a slot, such as slot 2517a.

Figure 29A:
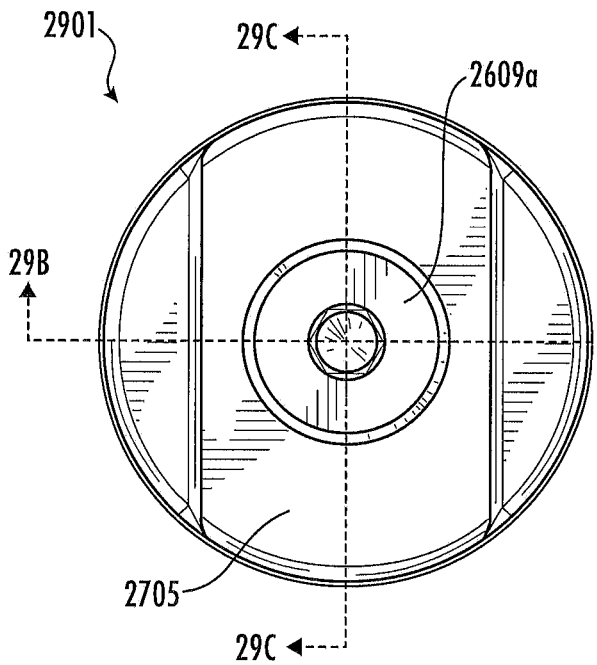
FIG. 29A is a top view of the assembled T-slot locator fastening device of FIGS. 26A-28C.
Figure 29B:
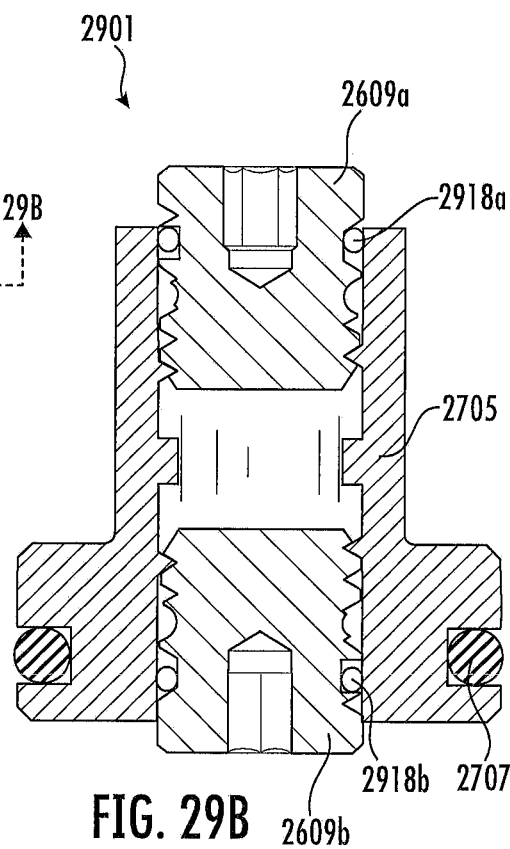
FIG. 29B is a section view of the assembled T-slot locator fastening device of FIGS. 26A-28C taken along Line 29B-29B.
Figure 29C:
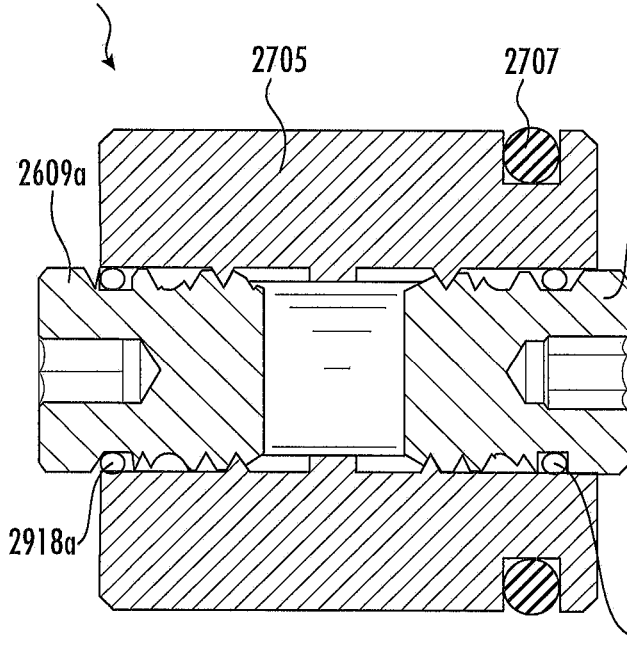
FIG. 29C is a section view of the assembled T-slot locator fastening device of FIGS. 26A-28C taken along Line 29C-29C.
Figure 29D:
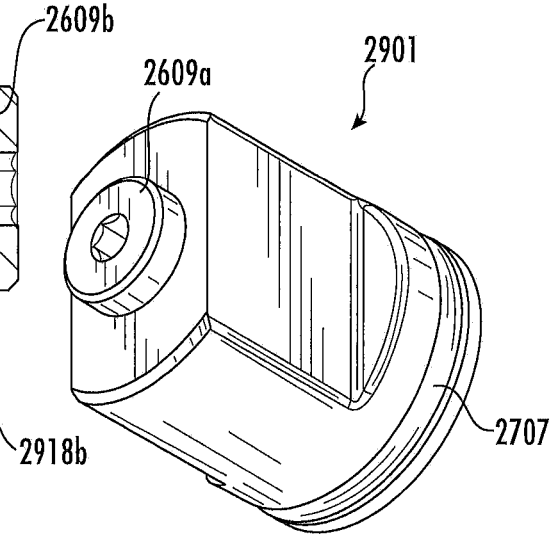

Referring now to FIGS. 29A-29D in the drawings, various views of assembled fastening device 2901 are depicted. In FIGS. 29B and 29C, housing 2705 is connected to, having a portion thereof adjacent respectively to, each of O-ring 2707, and two retractable dowel pins 2609a and 2609b.

Although not shown, flats may be incorporated in housing 2705 to make O-ring 2707 optional by removal. When O-ring 2707 is removed, fastener 2901 slides easily in the slot, which is a desirable characteristic, at times.

One, or both, of retractable dowel pins 2609a, 2609b can be extended and retracted, such that they can be in use, or not. In one embodiment, when a retractable dowel pin is in a retracted position, the retractable dowel pin engages and locates with a counter-bore, e.g., 2513a, in the T-slot fixture 2501. Preferably, there is space enough within housing 2705 for both dowel pins to simultaneously assume a retracted or an extended position. Alternatively, due to close concentricity in housing 2705, the location of lower retractable dowel pin 2609b, after it is advanced to the retracted position, is then made available to the top retractable dowel pin. In an extended position, the upper retractable dowel pin 2609a in turn locates the second object. In the retracted position, lower retractable dowel pin 2609b engages the counter-bore of a fixture plate, which, together with a bias between housing 2705 and the fixture plate, hold the T-slot fastener in place. The respective bottom surfaces of retractable dowel pins 2609a and 2609b rest or stop against respective annular gripping ridge/surface 2710a and 2710b when the dowel pins are in retracted positions. Respective O-rings 2918a and 2918b stop, reduce, or otherwise prevent debris from entering the housing of the fastening device.

Referring now to FIGS. 30A-32D a novel locating device 3201 (assembled in FIGS. 32A-32D), referred to as a T-slot locator slider, is depicted. Locating device 3201 consists of a biasing member and a retractable dowel pin.

Referring now to FIGS. 30A-30E in the drawings, various views of housing 3005 for locating device 3201 are depicted. Housing 3005 includes rounded sides formed as biasing members 3007a, 3007b, a thread or annular ridge 3010, flat surface 3021, a recessed receiving inset end 3023, a capture inset end 3025, and a pair of tabs or tangs 3041a, 3041b. Flat surface 3021 is centered between two angled surfaces, which enables rapid insertion in a slot, such as T-slot 2517a. As depicted in FIGS. 30B and 30C, housing 3005 also includes a threaded portion 3015 for receiving a dowel pin (e.g., FIGS. 31A-31C). Threaded portion 3015 may comprise a shoulder, a stop member, or a ridge to interface with threads of a retractable dowel pin.

Referring now to FIGS. 31A-31C in the drawings, various views of a retractable dowel pin 3109 are depicted. Retractable dowel pin 3109 is similar if not identical to dowel pin 2609, including an O-ring 3118, a shoulder 3126, a keyed end 3127, one or more threads 3115, flat surfaces 3121, and locating shoulder 3125. Dowel pins 3109 and 2609 differ at least with respect to one or more dimensions, such as a length of the stud.

Referring now to FIGS. 32A-32D in the drawings, various views of an assembled locating device 3201 are depicted. Preferably, rounded biasing members 3007 will fit the width of an accepting T-slot. Tabs or tangs 3041a, 3041b supply a radius that matches a radius of the outer diameter of a T-slot fastener, such as fastening device 2901. One purpose of locating device 3201 is to precisely locate the T-slot fastener by engaging tabs/tangs 3041 with the housing of the fastener, and by engaging a precision locating surface 3125 of dowel pin 3109 with a precision locating counter-bored hole, e.g., hole 2519a, in the base of the T-slot. Similar to hole 2519*c* in fixture plate 2501, locating device 3201 incorporates a precise counter-bore and thread combination to facilitate the use of a retractable dowel pin. As dowel pin 3109 is lowered into a hole of a fixture plate, biasing members 3007 contact walls of a T-slot fixture, holding the T-Slot locator 3201 firmly in place. This is not the only embodiment which can serve this purpose. For example, in at least one embodiment, locating device 3201 is formed having two radii locating surfaces, or two receiving insets 3023, thereby facilitating locating two T-slot fasteners at the same time. In this regard, flat surface 3021 is replaced by the second receiving inset end 3023 having a second set of tabs/tangs 3041. Although only a single capture inset end 3025 is depicted, the housing of locating device 3201 may include multiple openings similar if not identical to the opening in capture inset end 3025.

Figure 33A:
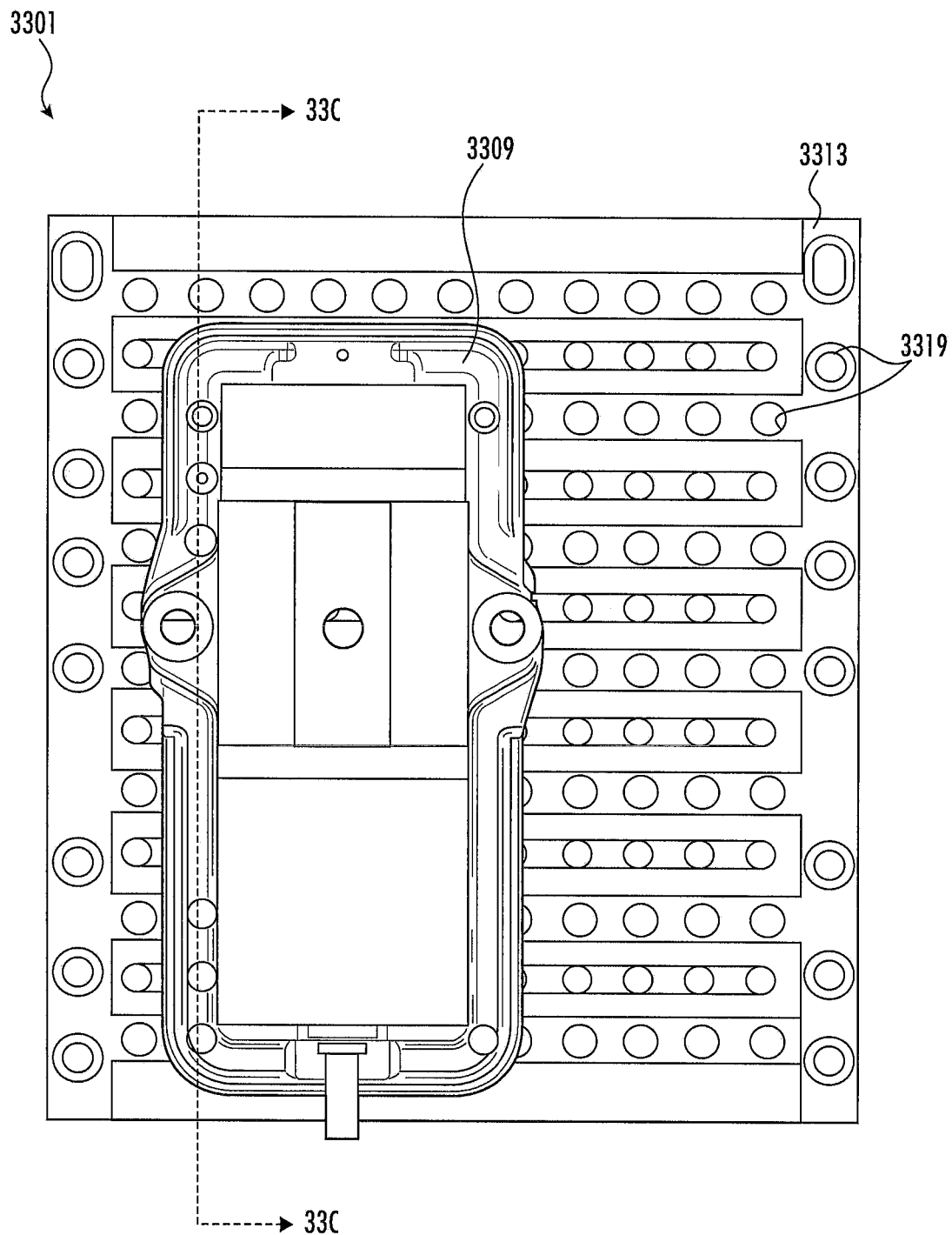
FIG. 33A is a top view of an assembled T-slot locator application in accordance with the present application.

Referring now to FIG. 33A in the drawings, an assembly 3301 having a modular T-slot fixture 3313 and a vise product 3309 incorporated with the fixture plate is depicted. The fixture plate includes multiple holes 3319, such as multi-purpose holes, for securely and precisely locating vise product 3309 onto the fixture plate. For example, multiple fasteners may be positioned throughout and within holes 3319. Preferably, the installation of the vise incorporates one or more T-Slot fasteners and one or more T-Slot locators to locate and hold the vise. The use of T-slot fasteners and locators facilitates the ability to rapidly, repeatedly quick-change the vise, or another object, onto or off of the T-Slot fixture.

Referring now to FIGS. 33B-33F in the drawings, various views of assembly 3301 of FIG. 33A are depicted. Several features of the novel precision locating concepts are visible in these views. For example, referring now to FIG. 33C, a section view depicts the assembled modular T-slot fixture 3313 securing vise 3309 with retractable dowel pins 2609, T-slot fasteners 2401*a*, 2401*b*, a T-slot locator 2901, and a T-slot locator 3201. Referring now to FIGS. 33D and 33E, exploded views depict the tabs/tangs 3041*a*, 3041*b* of T-slot locators 3201 visible as the locators 3201 are positioned behind T-slot fasteners 2401.

Figure 34B:
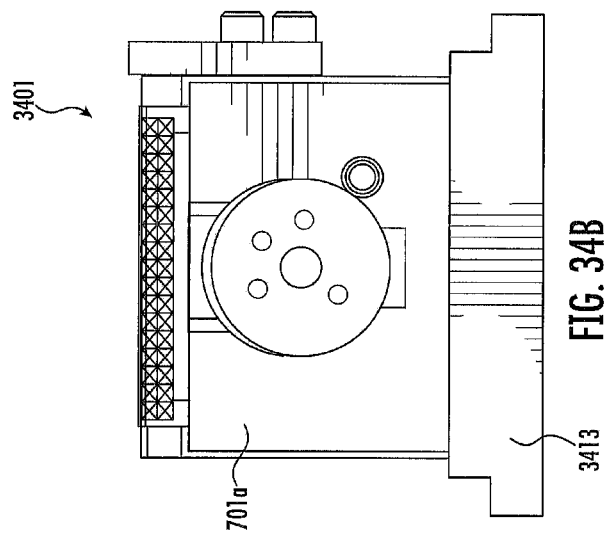
FIG. 34A is a top view of an alternative embodiment of an assembled T-slot locator application in accordance with the present application.
Figure 34A:
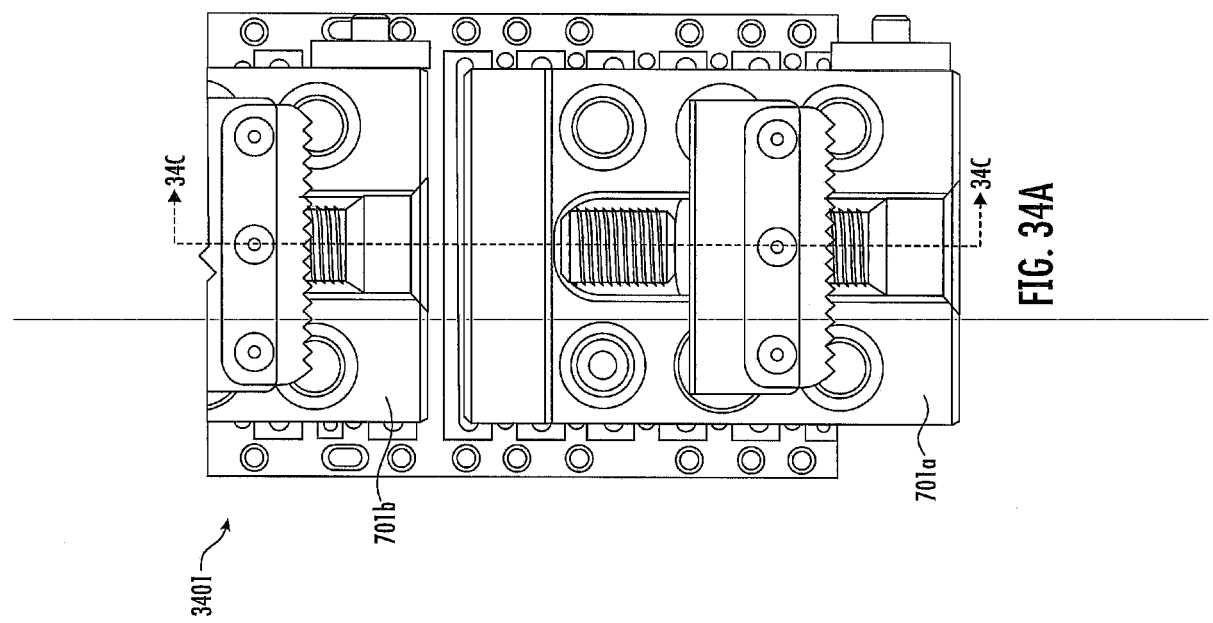
Figure 34D:
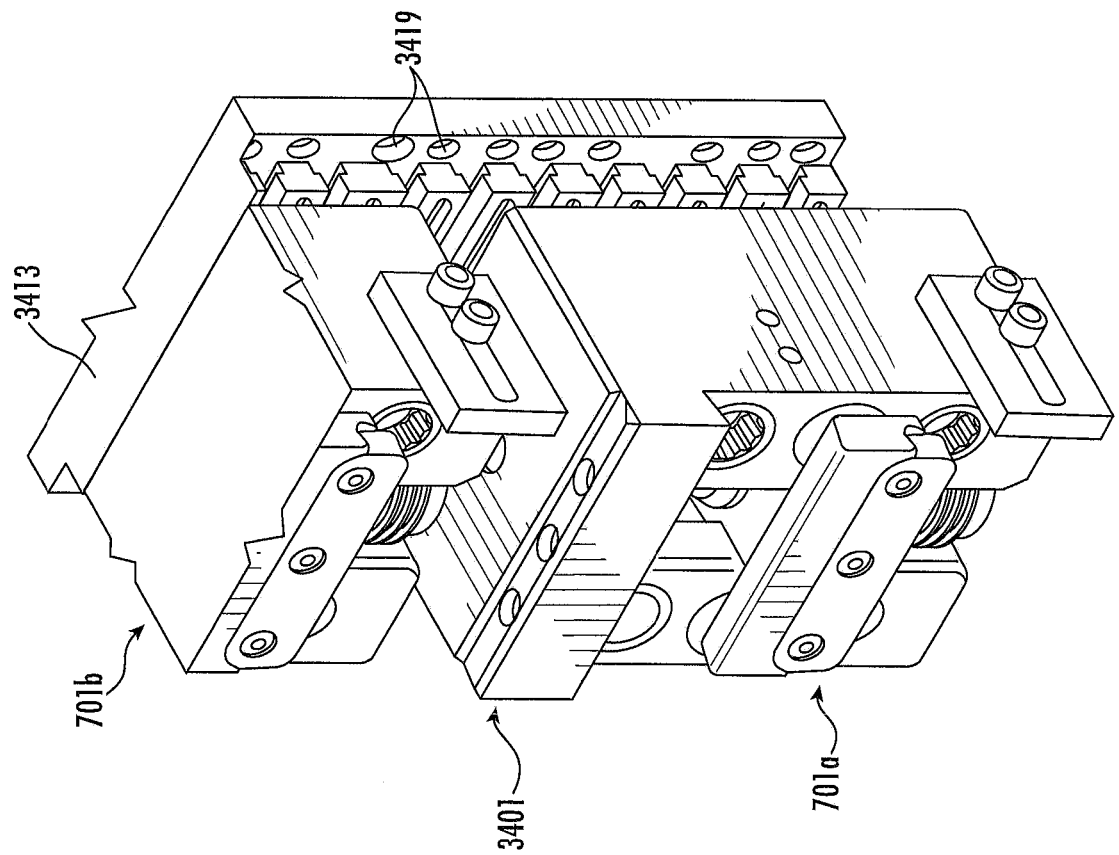
Figure 34C:
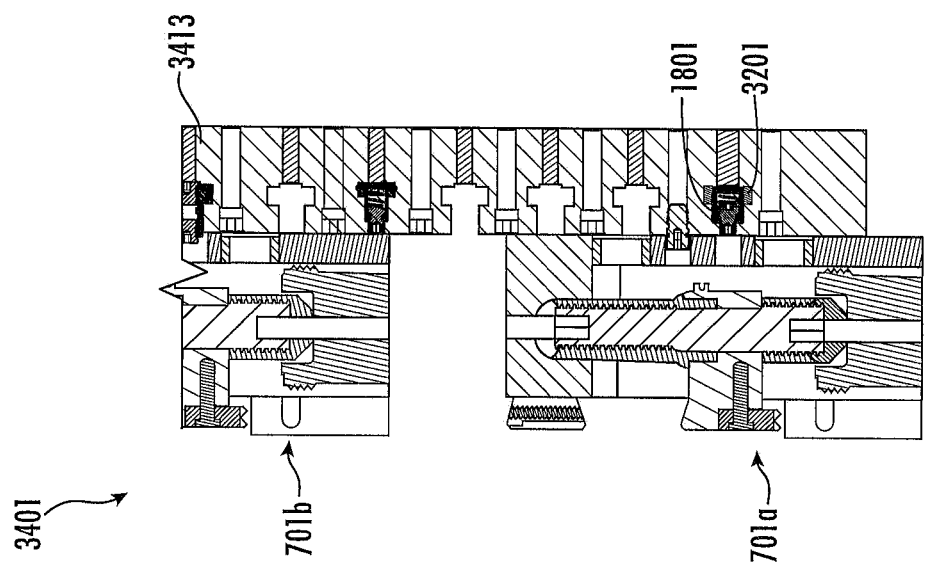

Referring now to FIGS. 34A-34D in the drawings, various views are depicted of an assembly 3401 having a modular T-slot fixture 3413 incorporating the T-Slot fasteners, T-Slot locators, and fastening devices to precisely locate and secure vises 701*a* and 701*b*. The use of the fastening devices and locators facilitates the ability to rapidly, repeatedly quick-change specialized modular vises that use slot 2517*b* in the top of the fixture. The quick-change feature allows users to rapidly and precisely move vises and other objects on/off T-Slot fixture 3413. For example, referring now to FIG. 34C, a section view depicts the assembled modular T-slot fixture 3413 securing vises 701*a*, 701*b* with fastening devices 1801, T-slot fasteners 2401, and T-slot locators 2901. Referring now to FIG. 34D in the drawings, it is important to note that although the dovetail ledge of vise 701*b* is directed towards the keeper assembly of vise 701*a*, the dovetail ledge of vise 701*b* could be repositioned to be directed towards the dovetail ledge of vise 701*a*. Fixture plate 3413 may be of almost any size, sectioned into multiple segments, separated by a large distance, include spacers/supports between the separated portions, or may include multiple additional vises positioned/repositioned in front of, behind, adjacent, and/or to the side of vise 701*a* or vise 701*b*.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A precision locating fastening device for securing a part, comprising:
   an adjustable vise member comprising a unitary body, the unitary body having:
   a first gripping surface for providing a first bias to the part;
   a shoulder; and
   a keyed end;
   wherein the adjustable vise member receives adjustments at the keyed end from a first side or a second side of a fixture plate;
   a fixed vise member comprising a unitary housing, the unitary housing having:
   a second gripping surface for providing a second bias, the second bias opposing the first bias;
   an annular through-hole; and
   opposing first and second ends;
   wherein the annular through-hole defines an opening in at least one of the opposing first and second ends;
   wherein the fixed vise member is releasably fixed to the fixture plate; and
   wherein the annular through-hole is configured to receive an unattached portion of a torque tool to receive a torque for securing the part, the unattached portion being unattached from the unitary housing; and
   a stop member attached to the shoulder of the adjustable vise member;
   wherein the part is retained and located by the adjustable vise member, the fixed vise member, the stop member and the first and second biases.

2. The fastening device according to claim 1, further comprising a first tang and a second tang disposed on opposing sides of a recess and configured for movably interfacing with a T-slot.

3. The fastening device according to claim 1, further comprising a biasing member.

4. The fastening device according to claim 1, further comprising a capture inset and a release inset disposed respectively at each of the opposing first and second ends of the annular through-hole.

5. The fastening device according to claim 1, further comprising a pusher assembly.

6. The fastening device according to claim 5, wherein the pusher assembly comprises:
   a pusher;
   a gripper; and
   a drive screw;
   wherein the drive screw has a rounded cup or a washer attached to an end of the drive screw; and
   wherein the rounded cup or the washer is at least partially housed within the pusher.

7. The fastening device according to claim 1, wherein the fixed vise member further comprises:

a distal end;
a proximal end; and
a dovetail ledge disposed on at least one of the distal end and the proximal end.

8. The fastening device according to claim 1, wherein the stop member is adjustable relative to the shoulder of the adjustable vise member.

9. A precision locating fastening system for securing a part, comprising:
an adjustable vise comprising a unitary body, the unitary body having:
a first gripping surface for providing a first bias to the part;
a shoulder; and
a keyed end;
wherein the adjustable vise receives adjustments at the keyed end from a first side or a second side of a fixture plate;
a fixed vise comprising a unitary housing, the unitary housing having:
a second gripping surface for providing a second bias, the second bias opposing the first bias;
an annular through-hole; and
opposing first and second ends;
wherein the annular through-hole defines an opening in at least one of the opposing first and second ends;
wherein the fixed vise is releasably fixed to the fixture plate; and
wherein the annular through-hole is configured to receive an unattached portion of a torque tool to receive a torque for securing the part, the unattached portion being unattached from the unitary housing; and
a stop member attached to the shoulder of the adjustable vise;
wherein the first gripping surface is movable relative to the fixture plate;
wherein the second gripping surface is releasably fixed relative to the fixture plate; and
wherein the part is retained and located by the adjustable vise, the fixed vise, the stop member and the first and second biases.

10. The fastening system according to claim 9, wherein the fixture plate comprises a T-slot fixture plate having:
a plurality of holes distributed in a grid-like pattern;
a riser; and
at least two slots formed with the riser;
wherein one of the at least two slots comprises a T-slot.

11. The fastening system according to claim 9, further comprising:
at least four studs;
wherein the fixed vise is secured to the fixture plate using the at least four studs.

12. The fastening system according to claim 9, wherein the fixed vise further comprises:
a distal end;
a proximal end; and
a dovetail ledge disposed on the distal end.

13. The fastening system according to claim 9, further comprising a wear pad.

14. The fastening system according to claim 13, wherein the fixed vise is configured to receive one of a ball cup and a Delrin washer; and
wherein the one of the ball cup and the Delrin washer is disposed beneath the wear pad.

15. A precision locating fastening system for retaining a part adjacent a precision locating surface, comprising:
a first fastening device, comprising:
a first adjustable vise member, having a gripping surface, a unitary body, a stop member, and a keyed end connected to the gripping surface;
a fixed vise member having a unitary housing with a proximal end and a distal end;
wherein the keyed end of the first fastening device is disposed at least one of the proximal end and the distal end of the unitary housing of the fixed vise member;
wherein the keyed end receives a torque tool to adjust the first adjustable vise member;
wherein the torque tool is received from either the proximal end or the distal end of the unitary housing; and
wherein the part is retained and located adjacent the precision locating surface by the gripping surface;
a second fastening device, comprising:
a second adjustable vise member; and a fixture plate;
wherein one of the first fastening device and the second fastening device is adjustable relative to the other fastening device to retain and locate the part adjacent the precision locating surface.

16. The fastening system according to claim 15, wherein the fixture plate is a T-slot fixture plate, the second fastening device is a T-slot locator, and the second adjustable vise member is a retractable dowel pin.

17. The fastening system according to claim 15, further comprising:
a first stud of a first retractable dowel pin; and
a second stud of a second retractable dowel pin;
wherein the first stud and the second stud are disposed vertically and concentrically within a single fastening device.

18. The fastening system according to claim 15, wherein the precision locating surface comprises a surface of the fixture plate;
wherein the keyed end is a first keyed end;
wherein the second adjustable vise member has a second keyed end; and
wherein the first keyed end is oriented to receive the torque tool from a first side of the fixture plate and the second keyed end is oriented to receive the torque tool from a second side of the fixture plate to retain and locate the part.

19. The fastening system according to claim 15, further comprising a T-slot fastener having housing threads.

20. The fastening system according to claim 19, further comprising a T-slot locator without outer housing threads.

* * * * *